United States Patent
Obama et al.

(10) Patent No.: US 7,826,143 B2
(45) Date of Patent: *Nov. 2, 2010

(54) OPTICAL SYSTEM WITH WAVELENGTH SELECTING DEVICE

(75) Inventors: Akihiko Obama, Sakura (JP); Kouichi Ohshita, Tokyo (JP); Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/151,224

(22) Filed: Jun. 14, 2005

(65) Prior Publication Data

US 2005/0231816 A1 Oct. 20, 2005

Related U.S. Application Data

(63) Continuation of application No. 10/945,248, filed on Sep. 21, 2004, now abandoned, which is a continuation of application No. 10/316,917, filed on Dec. 12, 2002, now Pat. No. 6,870,687.

(30) Foreign Application Priority Data

| Dec. 12, 2001 | (JP) | ............... 2001-378795 |
| Dec. 13, 2001 | (JP) | ............... 2001-380637 |
| Jun. 19, 2002 | (JP) | ............... 2002-179148 |

(51) Int. Cl.
*G02B 21/02* (2006.01)
*G02B 5/20* (2006.01)
*G02B 5/28* (2006.01)

(52) U.S. Cl. ............... 359/656; 359/361; 359/589; 359/885

(58) Field of Classification Search ......... 359/656–661, 359/361, 589–590

See application file for complete search history.

(56) References Cited

U.S. PATENT DOCUMENTS

| 5,177,605 A | 1/1993 | Takahashi et al. ............... 348/65 |
| 5,710,663 A | 1/1998 | Kawasaki ............... 359/389 |
| 5,954,633 A | 9/1999 | Hirata ............... 600/108 |
| 5,999,327 A | 12/1999 | Nagaoka ............... 359/654 |
| 6,094,274 A * | 7/2000 | Yokoi ............... 356/417 |
| 6,362,923 B1 | 3/2002 | Lange et al. ............... 359/689 |
| 6,476,851 B1 | 11/2002 | Nakamura ............... 348/65 |
| 6,573,950 B1 | 6/2003 | Hirata et al. |
| 6,870,687 B2 * | 3/2005 | Obama et al. ............... 359/656 |
| 7,057,659 B1 | 6/2006 | Mihara et al. |
| 2001/0005278 A1 * | 6/2001 | Onomichi et al. ............... 359/350 |

(Continued)

FOREIGN PATENT DOCUMENTS

JP 57-211170 12/1982

(Continued)

*Primary Examiner*—Jordan M Schwartz
(74) *Attorney, Agent, or Firm*—Miles & Stockbridge P.C.

(57) ABSTRACT

The object is to provide an optical system with a wavelength selecting device. According to one aspect of the present invention, an optical system with a wavelength selecting device includes, in order from an object along an optical axis, an objective optical system composed of optical elements having refractive power and an aperture stop, a no-power optical group composed of optical elements having no refractive power, and an imaging device. The no-power optical group includes the wavelength selecting device for making short wavelength light be selectively substantially non-transparent. The wavelength selecting device preferably satisfies the predetermined conditional expressions.

30 Claims, 37 Drawing Sheets

U.S. PATENT DOCUMENTS

| | | |
|---|---|---|
| 2002/0063955 A1 | 5/2002 | Nishida et al. ............... 359/361 |
| 2003/0165018 A1 | 9/2003 | Mihara ....................... 359/680 |
| 2004/0051962 A1* | 3/2004 | Mihara ....................... 359/686 |
| 2004/0215060 A1* | 10/2004 | Ueno et al. ................. 600/160 |

FOREIGN PATENT DOCUMENTS

| | | |
|---|---|---|
| JP | 06-337350 | 12/1994 |
| JP | 09-243935 A | 9/1997 |
| JP | 10-010423 | 1/1998 |
| JP | 2000-214527 A | 8/2000 |
| JP | 2001-21805 A | 1/2001 |
| JP | 2001-042230 A | 2/2001 |
| JP | 2001-314367 A | 11/2001 |
| JP | 2002-153414 A | 5/2002 |

\* cited by examiner

OPTICAL SYSTEM WITH WAVELENGTH SELECTING DEVICE

CROSS REFERENCE TO RELATED APPLICATION

This application is a continuation of application Ser. No. 10/945,248 filed Sep. 21, 2004 now abandoned, which is a continuation of application Ser. No. 10/316,917 filed Dec. 12, 2002 now U.S. Pat. No. 6,870,687.

INCORPORATION BY REFERENCE

The disclosures of the following priority applications are herein incorporated by reference:

Japanese Patent Application, No. 2001-378795 filed Dec. 12, 2001,

Japanese Patent Application No. 2001-380637 filed Dec. 13, 2001, and

Japanese Patent Application No. 2002-179148 filed Jun. 19, 2002.

BACKGROUND OF THE INVENTION

1. Field of the Invention

The present invention relates to an optical system with a wavelength selecting device having high optical performance over the entire image field suitable for video cameras and electronic still cameras equipped with a solid state imaging device.

2. Related Background Art

An imaging device such as a solid state imaging device, which is different from a conventional silver-halide film, has high sensitivity not only visible light but also infrared light having a longer wavelength than visible light. Accordingly, in order to accomplish good color rendition and to remove flare caused by chromatic aberration of long wavelength light, it is necessary to cut off light having a long wavelength of 700 nm or more. So, in conventional video cameras and electronic still cameras using an imaging device such as a solid state imaging device, an infrared-cut filter for cutting off infrared light having a wavelength of 700 nm or more has been arranged at an object side of the imaging device.

With the diffusion of video cameras and electronic still cameras, these cameras are demanded to be compact and light weighted. On the other hand, with getting a pixel of an imaging device such as a solid state imaging device finer and denser year by year, optical performance is demanded to be higher.

Since an aspherical lens can be used freely with recent increase of aspherical surface manufacturing technology, it becomes easy to correct monochromatic aberration such as spherical aberration and coma. So, with increasing optical performance, the optical system can be compact and light weighted by reducing the number of lens elements.

On the other hand, chromatic aberration cannot be satisfactory corrected without increasing the number of lens elements. So, it is not possible to improve optical performance. Accordingly, chromatic aberration becomes an obstacle to improving optical performance of an optical system. In particular, since the light from violet to ultraviolet is liable to be conspicuous, how to suppress this chromatic aberration is the key point to make the optical system have high optical performance. An optical system using the extra-low dispersion glass, fluorite, or the like has been known as a solution. However, since these glass materials have low refractive index, it is liable to incur increase in the thickness of lens and in the number of lens elements. As a result, not only the optical system becomes large, but also it becomes difficult to lower the cost because the material is expensive.

As an alternative way to reduce chromatic aberration in the optical system, it is thought that an ultraviolet-cut filter for removing the most conspicuous range of ultraviolet ray (340 nm to 420 nm) as a chromatic aberration is equipped with the optical system. Wherever it is arranged, the total lens length increases by the amount of the thickness of the filter and an increase in the cost is inevitable.

SUMMARY OF THE INVENTION

The present invention is made in view of the aforementioned problems and has an object to provide an optical system with a wavelength selecting device having inconspicuous chromatic aberration and high optical performance over the entire image field suitable for video cameras and electronic still cameras equipped with a solid state imaging device and being low manufacturing cost, compact, and light weighted.

According to one aspect of the first embodiment of the present invention, an optical system with a wavelength selecting device includes, in order from an object along an optical axis, an objective optical system composed of optical elements having refractive power and an aperture stop, a no-power optical group composed of optical elements having no refractive power, and an imaging device. The no-power optical group includes the wavelength selecting device which is, with respect to short wavelength light, selectively substantially non-transparent. The wavelength selecting device SC satisfies the following conditional expression (1):

$$390 < \lambda_{V50} < 430 \quad (1)$$

where $\lambda_{V50}$ denotes the wavelength (unit: nm) of short wavelength light of whose transmittance of the wavelength selecting device is 50%.

In one preferred embodiment, the wavelength selecting device SC is an absorption filter which absorbs short wavelength light and is, with respect to the short wavelength light, selectively substantially non-transparent. It is desirable to satisfy the following conditional expression (2):

$$10 < \lambda_{V80} - \lambda_{V10} < 40 \quad (2)$$

where $\lambda_{V10}$ denotes the wavelength (unit: nm) the short wavelength light whose transmittance through the wavelength selecting device SC is 10%, and $\lambda_{V80}$ denotes the wavelength (unit: nm) of the short wavelength light whose transmittance through the wavelength selecting device SC is 80%.

In one preferred embodiment, the wavelength selecting device SC is an interference filter which is, with respect to the short wavelength light, selectively substantially non-transparent by an interference film UVC arranged on a surface of an optical element in the no-power optical group PL. The following conditional expression (3) is preferably satisfied:

$$D/PY < 1.1 \times 10^2 \quad (3)$$

where D denotes an air-reduced optical path length (unit: mm) from the position of the interference film UVC to the imaging device I, P denotes the pitch (unit: mm) of a pixel of the imaging device I measured in the shortest direction, and Y denotes the diagonal length (unit: mm) of the imaging device I.

In one preferred embodiment, the following conditional expression (4) is preferably satisfied:

$$|Y/P_0| < 0.55 \quad (4)$$

where $P_0$ denotes the position of the exit pupil of the objective optical system OB measured from the most object side optical surface of the no-power optical group PL (unit: mm, positive in the image direction).

In one preferred embodiment, the following conditional expression (5) is preferably satisfied:

$$5<\lambda_{V90}-\lambda_{V10}\leq40 \quad (5)$$

where $\lambda_{V90}$ denotes the wavelength (unit: nm) of the short wavelength light whose transmittance of the wavelength selecting device SC is 90%.

In one preferred embodiment, the wavelength selecting device SC transmits only useful visible light and is, with respect to the long wavelength light, selectively substantially non-transparent. It is desirable to satisfy the following conditional expression (6):

$$650<\lambda_{R10}<750 \quad (6)$$

where $\lambda_{R10}$ denotes the wavelength (unit: nm) of the long wavelength light whose transmittance of the wavelength selecting device SC is 10%.

In one preferred embodiment, the following conditional expression (7) is preferably satisfied:

$$5<\lambda_{R10}-\lambda_{R80}<60 \quad (7)$$

where $\lambda_{R80}$ denotes the wavelength (unit: nm) of the long wavelength light whose transmittance of the wavelength selecting device SC is 80%.

In one preferred embodiment, the wavelength selecting device SC preferably has the function of cutting off a higher spatial frequency than the resolution limit of the imaging device I.

In one preferred embodiment, the following conditional expressions (8) and (9) are preferably satisfied:

$$D_L/Y<0.2 \quad (8)$$

$$D_L>0.5 \quad (9)$$

where $D_L$ denotes the thickness (unit: mm) along the optical axis of the wavelength selecting device having the function of cutting off a higher spatial frequency than the resolution limit of the imaging device I.

In one preferred embodiment, the wavelength selecting device SC preferably has a function of protecting the surface of the imaging device I.

According to another aspect of the first embodiment of the present invention, an optical system with a wavelength selecting device includes, in order from an object along the optical axis, an objective optical system composed of an optical element having refractive power and an aperture stop, a no-power optical group composed of optical elements having no refractive power, and an imaging device. The no-power optical group includes a wavelength selecting device which is, with respect to short wavelength light, selectively substantially non-transparent. The wavelength selecting device is an interference filter which is, with respect to the short wavelength light, selectively substantially non-transparent by the interference film formed only on the surface of the no-power optical group.

In one preferred embodiment, it is desirable that the optical element locating at the most image side of the objective optical system OB has positive refractive power.

In one preferred embodiment, the following conditional expression (10) is preferably satisfied:

$$\lambda_{V50}D/PY<4.5\times10^4 \quad (10).$$

According to one aspect of the second embodiment of the present invention, an optical system includes a plurality of lens elements, and an optical member having wavelength selecting characteristic. The optical member is composed of an interference film formed on a lens surface of the lens elements. The following conditional expressions are preferably satisfied;

$$0<|\Phi/R|<0.8$$

$$0°\leq|B|<13°$$

where $\Phi$ denotes the effective diameter of the lens surface, R denotes the radius of curvature of the lens surface, and B denotes an angle of the principal ray passing through the lens surface relative to the optical axis at the lens surface in the air side.

In one preferred embodiment, the following conditional expression is preferably satisfied;

$$0°\leq|C|<18°$$

where C denotes an angle of the rand ray relative to the optical axis at the lens surface in the air side, and where the rand ray is a ray coming out from an on-axis object passing on the periphery of the aperture stop to form an image.

In one preferred embodiment, the optical member may have any one of those characteristics that having substantially low transmittance with respect to the infrared light, that having substantially low transmittance with respect to the ultraviolet light, or that having high transmittance with respect to the visible light and substantially low transmittance with respect to both infrared light and ultraviolet light.

According to another aspect of the second embodiment of the present invention, an optical system includes a plurality of lens elements and an optical member having wavelength selecting characteristic. The optical member is composed of an interference film formed on a lens surface of the lens elements. The optical system is composed of a negative lens group and a positive lens group adjoining to the negative lens group. The negative lens group includes three lens elements of a first negative lens element, a second negative lens element, and a positive lens element. The optical member is formed on the image side surface of the second negative lens element.

According to another aspect of the second embodiment of the present invention, an optical system includes a plurality of lens elements and an optical member having wavelength selecting characteristic. The optical member is composed of an interference film formed on a lens surface of the lens elements. The optical system is composed of a negative lens group and a positive lens group adjoining to the negative lens group. The positive lens group is composed of a positive lens element locating to the most object side of the positive lens group. The optical member is formed on the image side surface of the positive lens element.

According to another aspect of the second embodiment of the present invention, an optical system includes a plurality of lens elements and an optical member having wavelength selecting characteristic. The optical member is composed of an interference film formed on a lens surface of the lens elements. The optical system is composed of a negative lens group, a fist positive lens group adjoining to the negative lens group, and a second positive lens group locating to the most image side of the optical system. The optical member is formed on the most image side surface of the second positive lens group.

BRIEF DESCRIPTION OF THE DRAWINGS

FIG. 25 graphically shows a spectral transmittance of the absorption filter UVCF of the wavelength selecting device SC, which is, with respect to short wavelength light, selectively substantially non-transparent, according to Example 4 of the first embodiment of the present invention in.

DESCRIPTION OF THE PREFERRED EMBODIMENTS

First Embodiment

Figure 1:
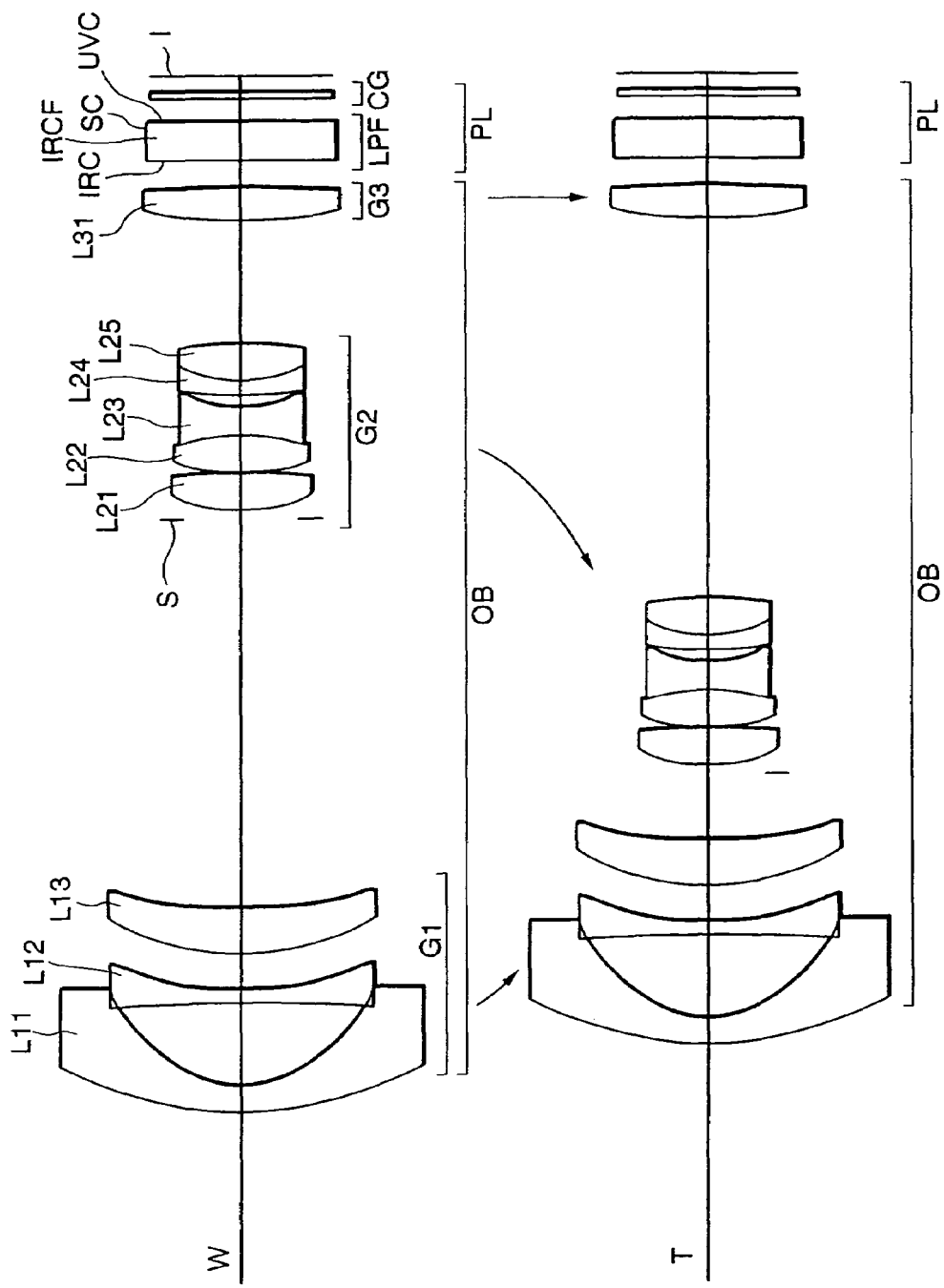
FIG. 1 is a sectional view showing the lens arrangement of an optical system according to Example 1 of a first embodiment of the present invention in a wide-angle end state W and in a telephoto end state T.
Figure 2:
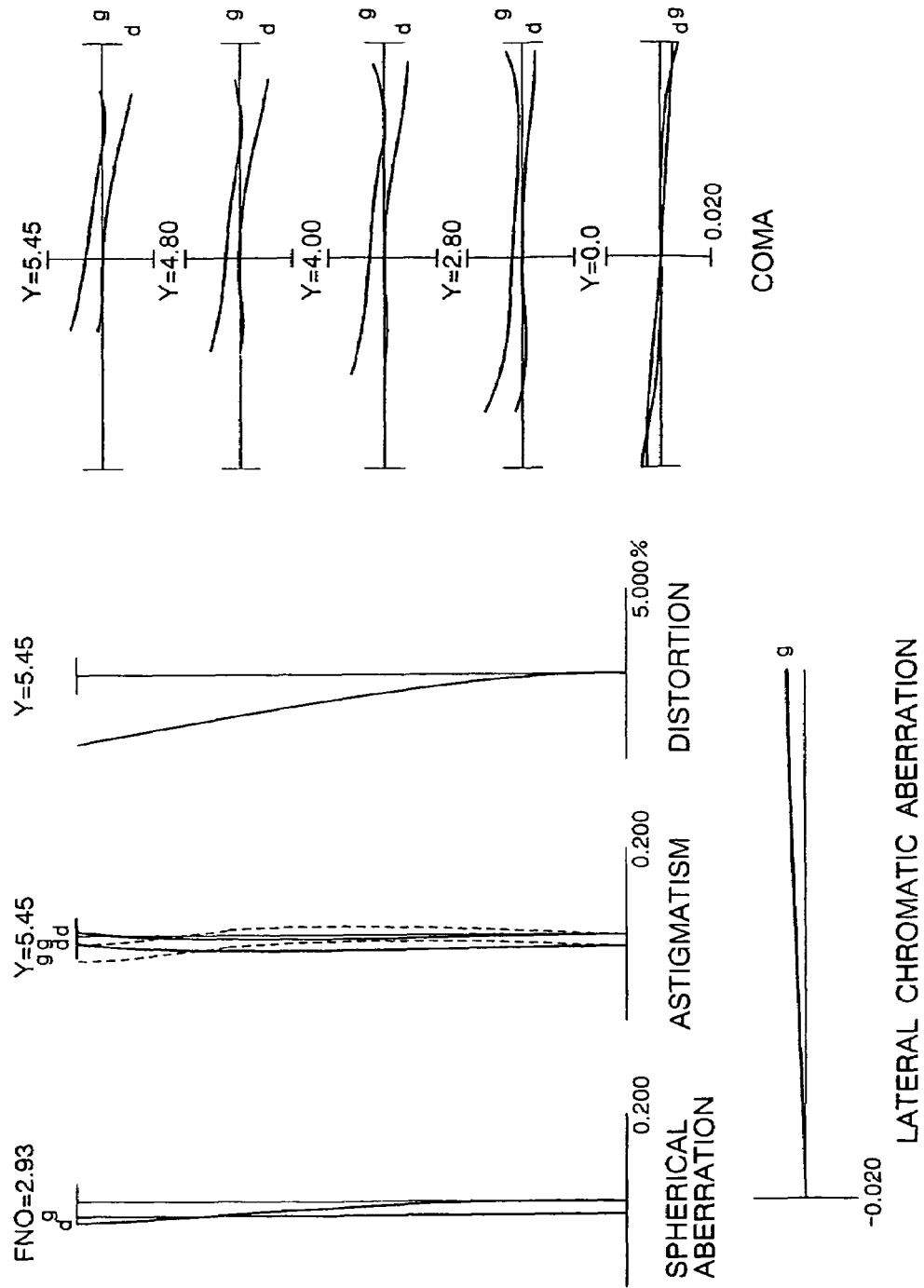
FIG. 2 graphically shows various aberrations of an objective optical system OB in the optical system according to Examples 1 and 2 of the first embodiment in the wide-angle end state W.
Figure 3:
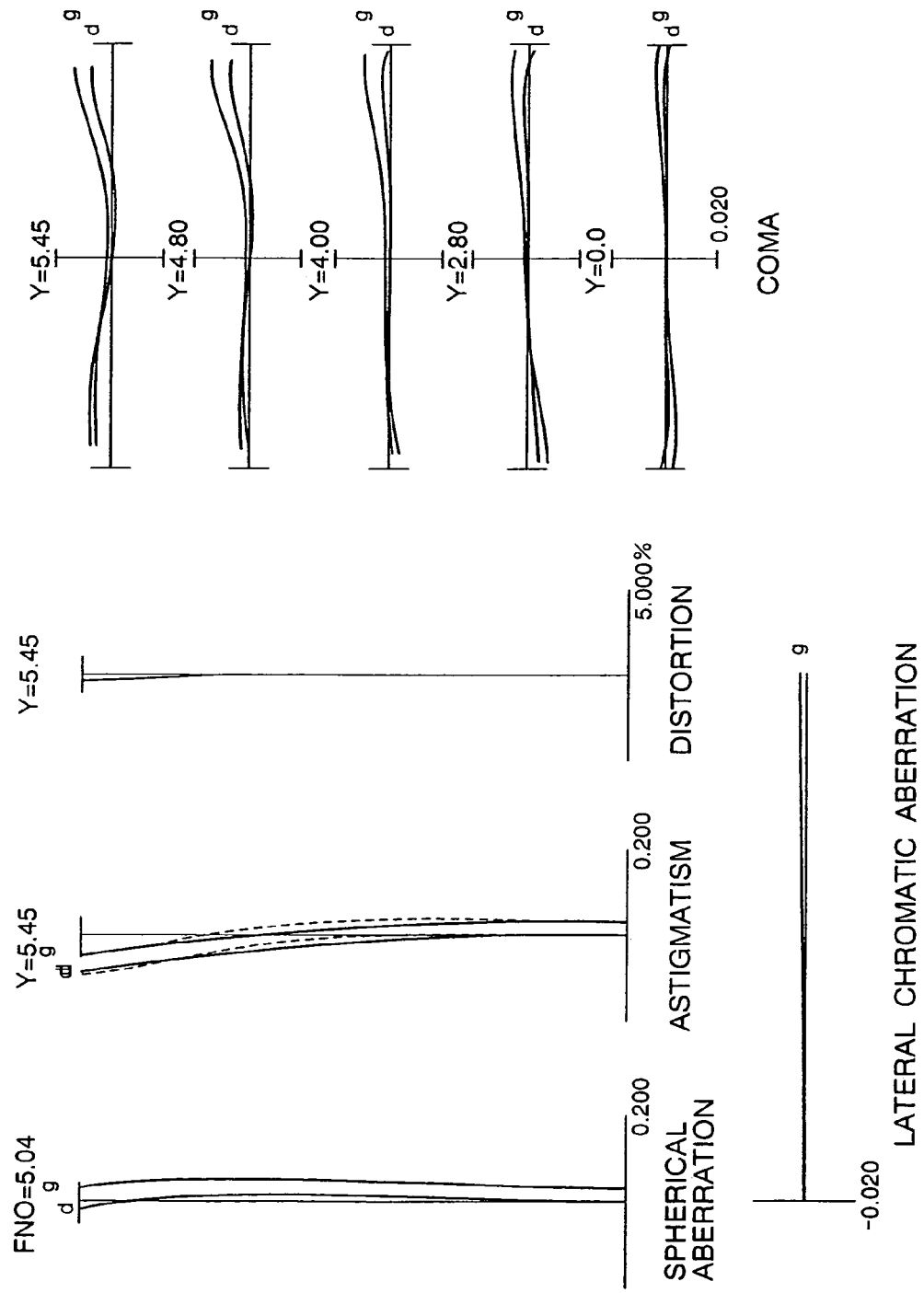
FIG. 3 graphically shows various aberrations of the objective optical system OB in the optical system according to Examples 1 and 2 of the first embodiment in the telephoto end state T.
Figure 4:
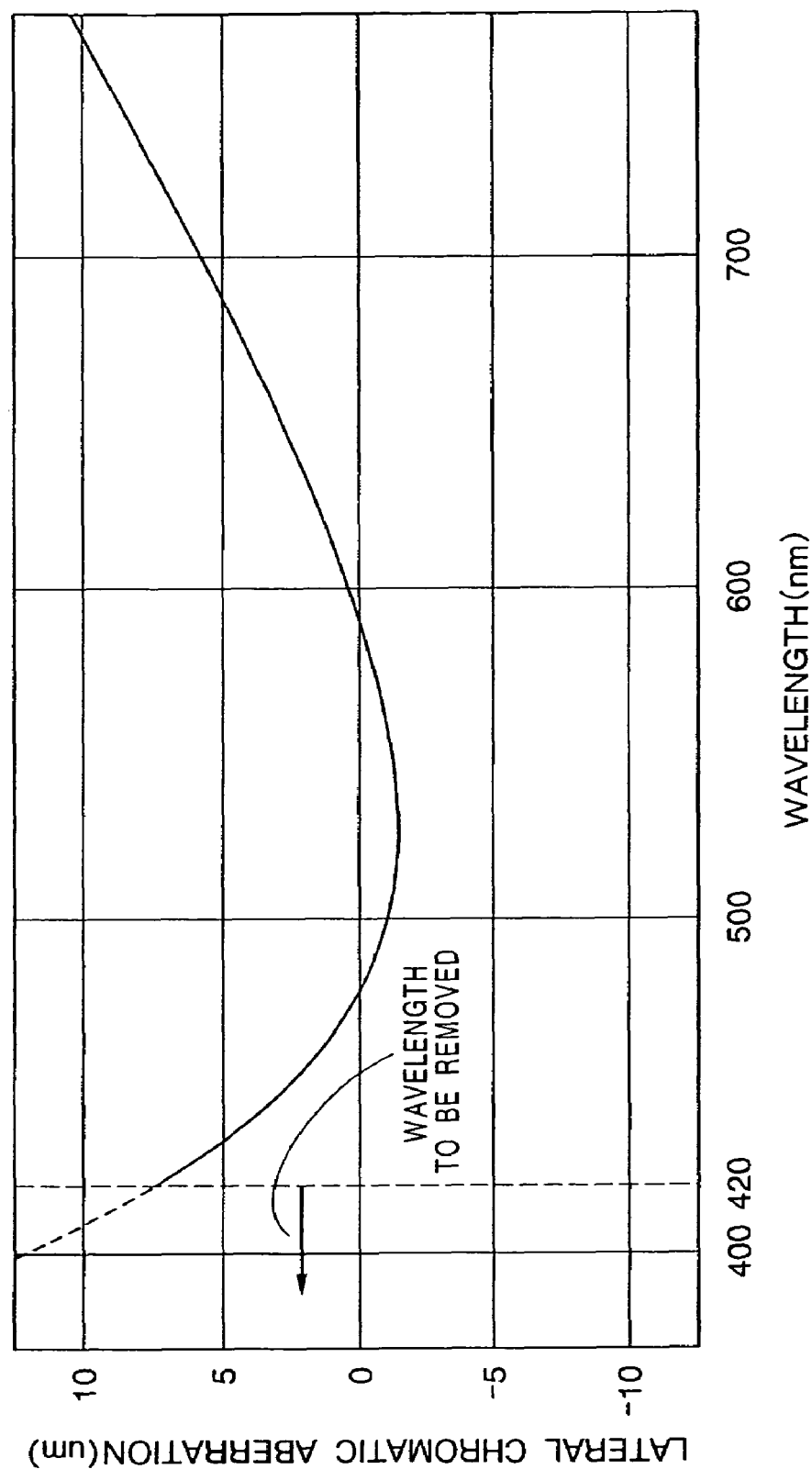
FIG. 4 graphically shows lateral chromatic aberration relative to wavelength at image height of 4 mm in the wide-angle end state W of the optical system together with the lateral-chromatic-aberration-removing effect of a wavelength selecting device SC according to Example 1 of the first embodiment.
Figure 5:
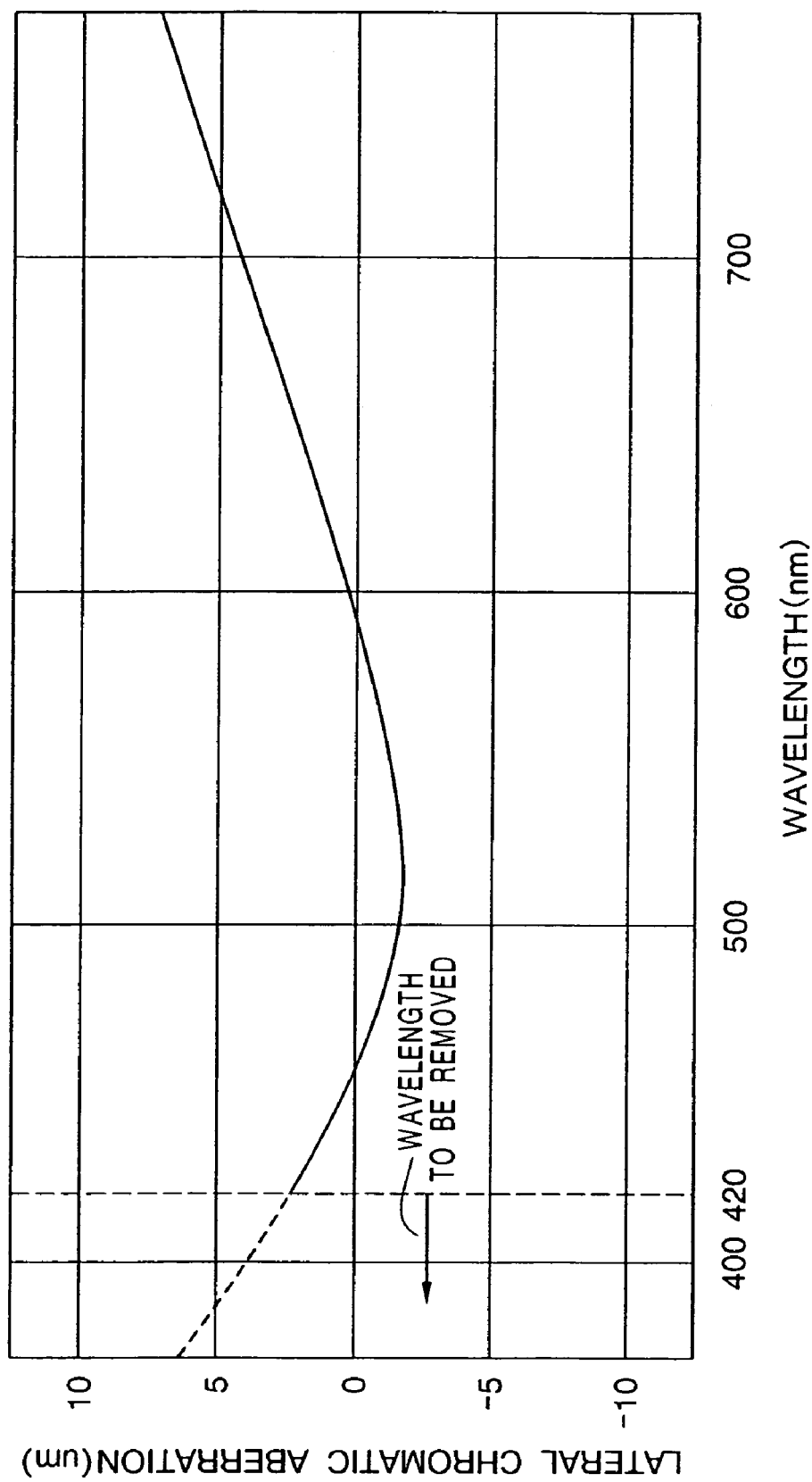
FIG. 5 graphically shows lateral chromatic aberration relative to wavelength at image height of 4 mm in the telephoto end state T of the optical system together with the lateral-chromatic-aberration-removing effect of the wavelength selecting device SC according to Example 1 of the first embodiment.

At first, a first embodiment of the present invention having a wavelength selecting device, precisely described later, is explained below with reference to accompanying drawings. FIG. 1 is a sectional view showing the lens arrangement of an optical system according to Example 1 of a first embodiment of the present invention in a wide-angle end state W and in a telephoto end state T. Various aberrations of the objective optical system OB according to Example 1 of a first embodiment in the wide-angle end state and in the telephoto end state are shown in FIGS. 2 and 3, respectively. As is shown in FIGS. 2 and 3, monochromatic aberrations are satisfactorily corrected, but lateral chromatic aberration is somewhat remained. This lateral chromatic aberration written in the form relative to the wavelength is shown in FIGS. 4 and 5. According to the graphs, since a large amount of lateral chromatic aberration is produced in a short wavelength side, if this portion of aberration can be removed, the same effect as the major portion of chromatic aberration is removed can be obtained consequently.

In order to remove a short wavelength light, a wavelength selecting device SC which is, with respect to short wavelength light, selectively substantially non-transparent is arranged in a no-power optical group PL located between the objective optical system OB and the imaging device I. Here, substantially non-transparent means that the transmittance is substantially 0%. Accordingly, the short wavelength light coming out from the objective optical system OB can be removed by the no-power optical group PL. The shortest wavelength of the light to be removed is sufficient at 340 nm because glass materials naturally transmit a light merely longer than 340 nm.

The optical system with a wavelength selecting device according to the first embodiment of the present invention includes, in order from an object along the optical axis, an objective optical system OB having optical elements with refractive power and an aperture stop, a no-power optical group PL composed of no-power optical elements, and an imaging device I. The no-power optical group PL has the wavelength selecting device SC which is, with respect to short wavelength light, selectively substantially non-transparent. The wavelength selecting device SC preferably satisfies the following conditional expression (1):

$$390 < \lambda_{V50} < 430 \tag{1}$$

where $\lambda_{V50}$ denotes the wavelength (unit: nm) of the short wavelength light whose transmittance of wavelength of the wavelength selecting device SC is 50%.

Conditional expression (1) defines an appropriate range of characteristic of the wavelength selecting device SC which is, with respect to short wavelength light, selectively substantially non-transparent. When the value $\lambda_{V50}$ exceeds the upper limit of conditional expression (1), in order to suppress lateral chromatic aberration of the light from violet to ultraviolet which is liable to be conspicuous, the light wavelengths not only from violet to ultraviolet but also blue may be removed. As a result, the light transmitting through the wavelength selecting device SC and being detected by the imaging device I cannot properly reproduce the color because the light loses blue light among the three primary colors of blue, green and red, which are indispensable for color reproduction. So, an optical system with high optical performance cannot be obtained. On the other hand, when the value $\lambda_{V50}$ falls below the lower limit of the conditional expression (1), in order to suppress lateral chromatic aberration of the light from violet to ultraviolet which is liable to be conspicuous, the light from violet to ultraviolet cannot be sufficiently removed by the wavelength selecting device SC. Accordingly, an optical system with high optical performance cannot be accomplished.

Moreover, according to the first embodiment of the present invention, the wavelength selecting device SC is an absorption filter which absorbs short wavelength light and is, with respect to short wavelength light, selectively substantially non-transparent. It is desirable to satisfy the following conditional expression (2):

$$10 < \lambda_{V80} - \lambda_{V10} < 40 \tag{2}$$

where $\lambda_{V10}$ denotes the wavelength (unit: nm) of the short wavelength light whose transmittance of the wavelength selecting device SC is 10%, and $\lambda_{V80}$ denotes the wavelength (unit: nm) of the short wavelength light whose transmittance of the wavelength selecting device SC is 80%.

In an absorption filter, when the optical path length of the medium composing the absorption filter changes, the wavelength of the light to be absorbed changes in accordance with the change in the optical path length.

In the no-power optical group, when a light substantially parallel to the optical axis is incident to the no-power optical group, the optical path length is substantially the same regardless of the distance from the optical axis.

Accordingly, if the absorption filter is made to be no-power optical element, the optical path length of the light incident to the absorption filter substantially parallel to the optical axis can be made substantially the same regardless of the distance from the optical axis. As a result, the optical characteristics of the light to be absorbed by the absorption filter can be substantially the same regardless of the distance from the optical axis.

In video cameras and electronic still cameras using an imaging device such as a solid state imaging device, the position of the exit pupil of the objective optical system OB is located far from the image plane in accordance with the requirement of the optical characteristics of the solid state imaging device. In other words, the light come out from the objective optical system OB becomes substantially parallel to the optical axis.

As described above, in the first embodiment of the present invention, it is desirable that the absorption filter as the wavelength selecting device SC is located between the objective optical system OB and the imaging device I. Accordingly, in the first embodiment, characteristics of the light incident to the center of the imaging device I and that to the periphery of the imaging device I are made to be uniform, and the light incident to the imaging device I is made to have the uniform characteristics all over the image field, so that the optical system is made to have high optical performance.

Conditional expression (2) defines an appropriate range of the characteristics of the absorption filter as the wavelength selecting device SC. When the value $\lambda_{V80}-\lambda_{V10}$ exceeds the upper limit of conditional expression (2), the shape of the graph showing absorption characteristic of the absorption filter shows that the amount of absorption gradually increases as the wavelength becomes shorter. Accordingly, under the conditional expression (1), transmittance in the short wavelength side becomes relatively large, so that the light from violet to ultraviolet cannot be sufficiently removed by the wavelength selecting device SC. Moreover, transmittance in the long wavelength side becomes relatively small, in other words, a portion of blue light may be removed. Accordingly, proper color reproduction cannot be carried out because the light loses a portion of blue light among the three primary colors of blue, green and red, which are indispensable for color reproduction. So, an optical system with high optical performance cannot be obtained. On the other hand, the value $\lambda_{V80}-\lambda_{V10}$ falls below the lower limit of the conditional expression (2), the shape of the graph showing absorption characteristic of the absorption filter shows that the absorption increases quickly as the wavelength becomes shorter. However, an absorption filter having such characteristic is difficult to manufacture. As a result, because of the manufacturing cost, the purpose of the first embodiment of the present invention to provide a low cost optical system cannot be accomplished.

Furthermore, in the first embodiment of the present invention, the wavelength selecting device SC is an interference filter which is selectively substantially non-transparent with respect to the short wavelength light by an interference film UVC arranged on a surface of an optical element in the no-power optical group PL. The following conditional expression (3) is preferably satisfied:

$$D/PY<1.1\times 10^2 \qquad (3)$$

where D denotes an air-reduced optical path length (unit: mm) from the position of the interference film UVC to the imaging device I, P denotes the pitch (unit: mm) of a pixel of the imaging device I measured in the shortest direction, and Y denotes the diagonal length (unit: mm) of the imaging device I.

The interference filter is manufactured by forming an interference film on a surface of an optical element by means of evaporation. The interference filter can control the ratio of transmission to reflection wavelength by wavelength by transmitting a predetermined wavelength of light and reflecting the wavelength of light other than the predetermined one. In comparison with the absorption filter absorbing light in accordance with the wavelength, the interference filter differs in reflecting light in accordance with the wavelength, but the two are the same at this point that transmit light in accordance with the wavelength. From the point of selecting wavelength, the two have the same effect.

Because of its manufacturing method of evaporation, when the film-forming surface has a curvature, the characteristic of the interference filter becomes different between the center and the periphery of the surface. Accordingly, the surface on which the interference film UVC is formed is preferably a plane having no power.

Moreover, since the interference filter obtains the characteristics by optical interference due to thin films, the characteristics of the interference filter theoretically differ between normal incidence and oblique incidence of the light. Accordingly, in order to obtain uniform characteristics all over the image field, it is desirable that the incident angle to the interference filter of the on-axis ray is substantially the same as that of off-axis ray. In order to realize this, it is desirable that the on-axis ray and the off-axis ray are substantially parallel to the optical axis.

As described above, in video cameras and electronic still cameras having an imaging device such as a solid state imaging device, the ray coming out from the objective optical system OB is almost parallel to the optical axis.

Therefore, in the first embodiment of the present invention, it is preferable that an interference filter as the wavelength selecting device SC is arranged at the no-power optical group PL locating between the objective optical system OB and the imaging device I. Accordingly, in the first embodiment, characteristics of the light incident to the center of the imaging device and that to the periphery of the imaging device are made to be uniform, and the light incident to the imaging device I is made to have the uniform characteristics all over the image field, so that the optical system is made to have high optical performance.

Then, regarding ghost images accompanying with the interference filter, the following three cases of wavelength are explained.

Light having the first wavelength is the light reflected by the interference filter without transmitting therethrough. The light with the wavelength is reflected to the object side by the surface formed the interference film UVC (hereinafter called an interference film surface). It can be thought that the reflected light is reflected again by the lens surface located to the object side of the film to be become a ghost light. However, since this light has the wavelength because of which the light cannot actually transmit through the interference film surface, the light does not reach the imaging device I.

Light having the second wavelength is the light transmitting through the interference film substantially not being reflected thereby. Since the light is substantially not reflected by the interference film surface, the light does not cause a ghost image.

Figure 6:
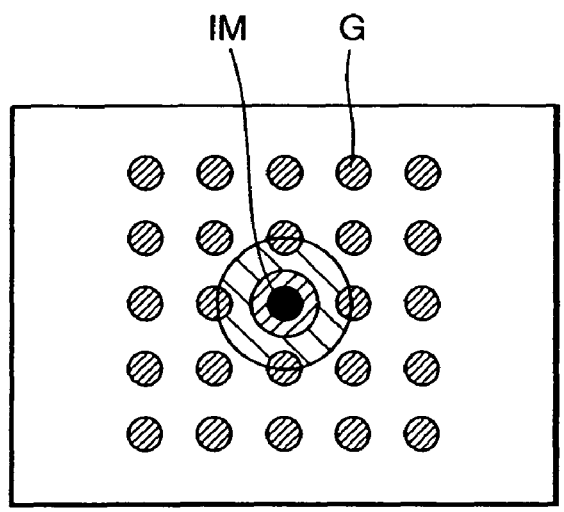
FIG. 6 is a diagram showing periodical ghost images on the imaging device I generated between the interference film UVC surface of the wavelength selecting device SC and the imaging device I caused by transmitting light and reflecting light at the interference film of the wavelength selecting device.
Figure 7:
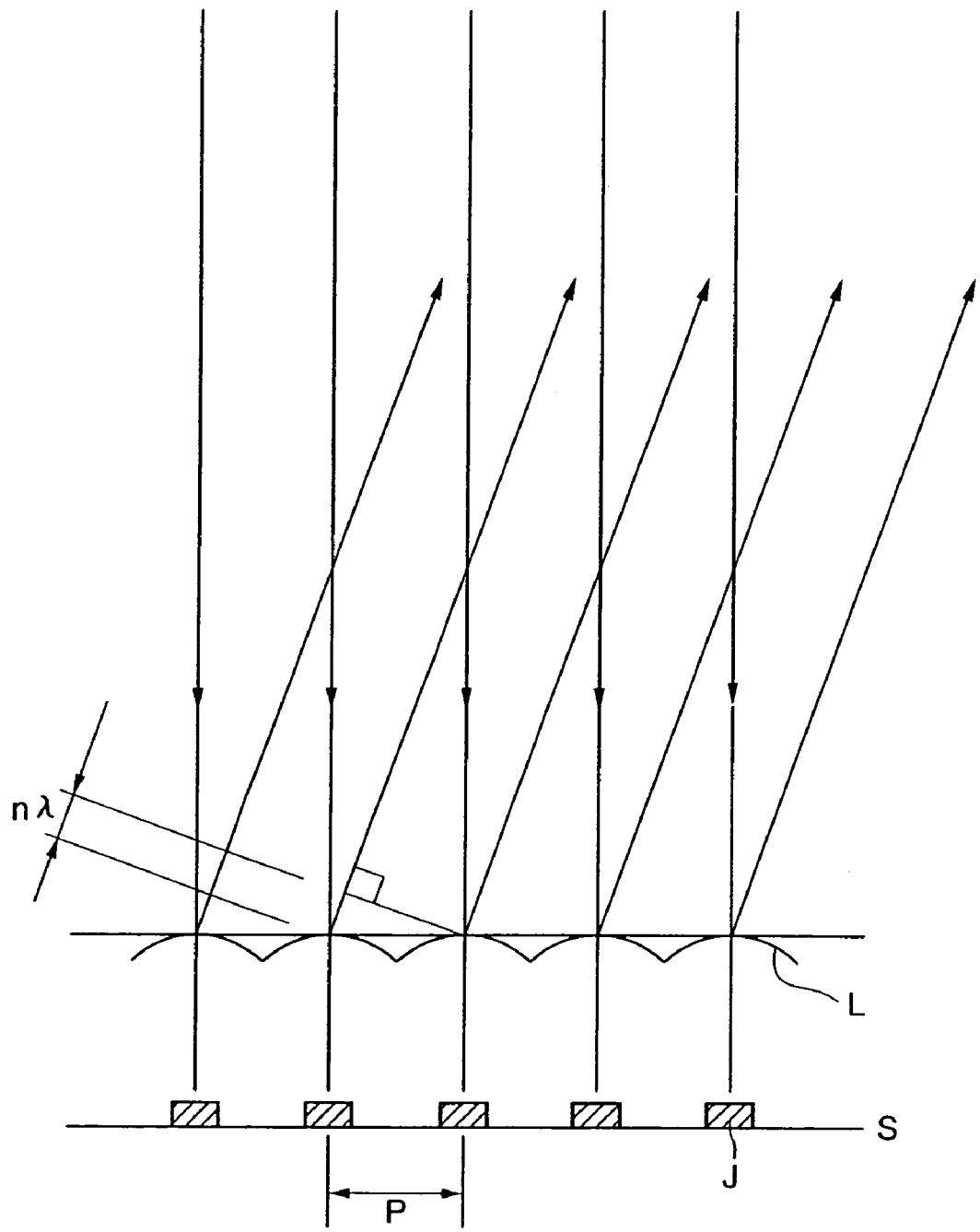
FIG. 7 is a diagram showing interference caused by the minute periodical pattern on the surface of the imaging device I.
Figure 8:
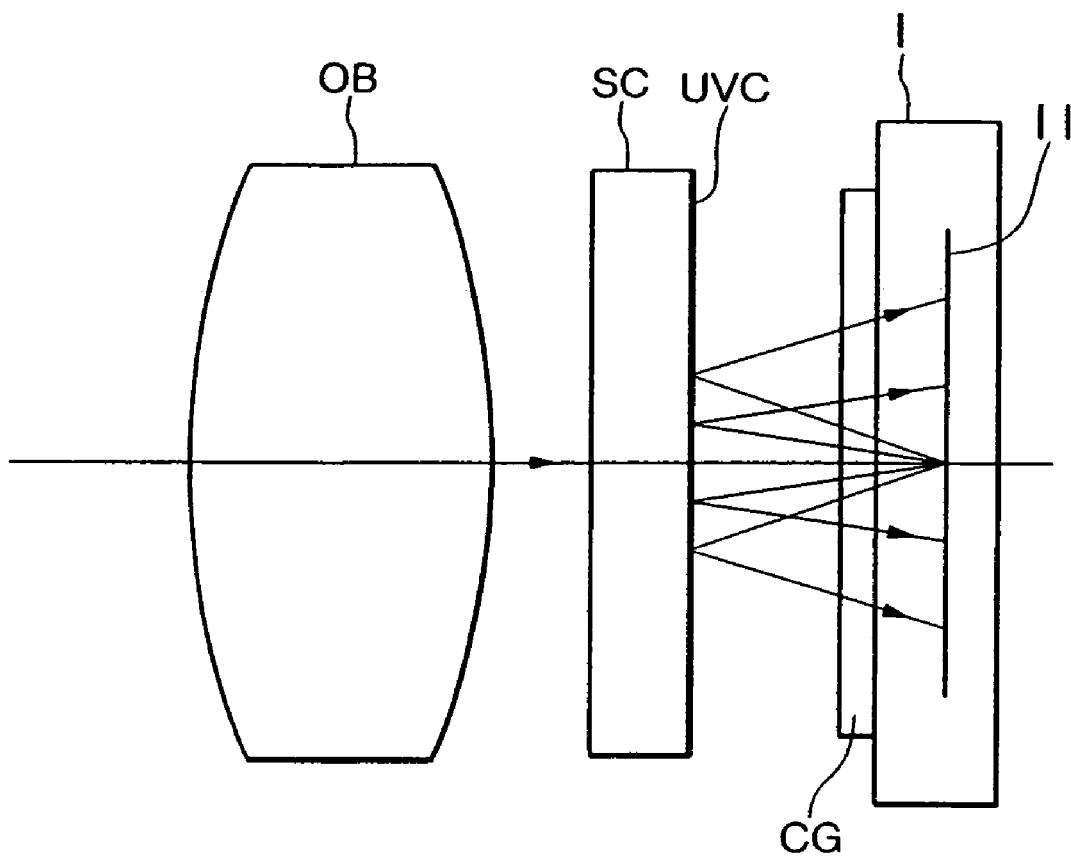
FIG. 8 is a diagram showing mechanism of the periodical ghost images generated between the interference film UVC surface of the wavelength selecting device SC and the imaging device I caused by transmitting light and reflecting light at the interference film of the wavelength selecting device.

Light having the third wavelength is the light having a wavelength between the two wavelengths described above (that is, the light reflected by the interference film with not transmitting through the interference film and the light transmitting through the interference film not reflected substantially), in other words, the third wavelength light is the light reflected by and transmitting through the interference film. This light may produce periodic ghost images as shown in FIG. 6 between the wavelength selecting device SC and the imaging device I. By the way, FIG. 6 is a diagram showing periodical ghost images on the imaging device I generated between the interference film UVC surface of the wavelength selecting device SC and the imaging device I. The periodical ghost images are produced because a ghost image is originally liable to be produced between the interference film surface and the imaging device since the reflectivity of the imaging device I is high and the reflectivity of the interference film surface is high with respect to this wavelength; and because the surface of the imaging device I has a minute periodical pattern as shown in FIG. 7. At this point, FIG. 7 is a diagram showing interference caused by the minute periodical pattern on the surface of the imaging device I. FIG. 8 is a diagram showing mechanism of the periodical ghost images generated between the interference film surface UVC of the wavelength selecting device SC and the imaging device I caused by the transmitting light and the reflected light at the interference film of the wavelength selecting device.

The mechanism to generate periodical ghost images is explained below. The light coming out from the object having this wavelength (the light reflected by and transmitting through the interference film UVC of the wavelength selecting device SC) is incident to the no-power optical group PL having the wavelength selecting device SC through the objective optical system OB. Then, the light having this wavelength partially transmits through the interference film UVC formed on the wavelength selecting device SC to be incident to the imaging device I. Since the surface of the imaging device I has the minute periodic pattern as shown in FIG. 7, the light incident to the imaging device I is not only regularly reflected on the surface but also reflected in the direction forming the optical path difference of $n\lambda$ (n: integer, $\lambda$: wavelength) caused by interference. The light reflected in the direction forming the optical path difference of $n\lambda$ is partially reflected on the interference film UVC of the wavelength selecting device SC to be incident to the imaging device I again as shown in FIG. 8. However, since the light incident to the imaging device I is discrete, the resultant image becomes ghost images having periodical pattern (periodical ghost images).

Conditional expression (3) defines an appropriate range of the position where the interference film UVC is arranged in order to prevent periodical ghost images from becoming conspicuous. When the ratio D/PY exceeds the upper limit of conditional expression (3), coherent length becomes excessively longer than that under conditional expression (1), so that the intensity of periodical ghost images becomes excessively strong. Moreover, the periodical ghost images becomes so large relative to the size of the image frame, so that the image becomes dirty. As a result, the purpose of the first embodiment of the present invention which is to provide an optical system with high optical performance cannot be accomplished.

In addition, it is more preferable that the lower limit of the conditional expression (3) is set to 2×10. When the ratio D/PY falls below the lower limit of conditional expression (3), the surface of the optical element on which the interference film UVC is formed comes near to the imaging device I, so that dust or the like stuck on the interference film is liable to cast the shadow on the imaging device I. Accordingly, since the shadow of dust or the like is liable to be imaged, it becomes difficult to obtain high image quality. As a result, the purpose of the first embodiment of the present invention which is to provide an optical system with high optical performance cannot be accomplished.

Furthermore, in the first embodiment of the present invention, the following conditional expression (4) is preferably satisfied:

$$|Y/P_0|<0.55 \qquad (4)$$

where Y denotes the diagonal length (unit: mm) of the imaging device I, and $P_0$ denotes the position of the exit pupil of the objective optical system OB measured from the most object side optical surface of the no-power optical group PL (unit: mm, positive in the image direction).

Conditional expression (4) defines an appropriate range of the position of the exit pupil of the objective optical system OB. When the ratio $|Y/P0|$ exceeds the upper limit of conditional expression (4), the off-axis ray incident to the no-power optical group PL having the wavelength selecting device SC forming the interference film UVC locating to the exit side of the objective optical system becomes excessively non-parallel to the optical axis. Accordingly, the characteristics of the interference film becomes largely different between on-axis ray and off-axis ray as described above, so that uniform characteristics cannot be obtained all over the image frame. As a result, the purpose of the first embodiment of the present invention to provide an optical system with high optical performance cannot be accomplished.

Furthermore, in the first embodiment of the present invention, the following conditional expression (5) is preferably satisfied:

$$5<\lambda_{V90}-\lambda_{V10}\leq 40 \qquad (5)$$

where $\lambda_{V10}$ denotes the wavelength (unit: nm) of the short wavelength light whose transmittance of the wavelength selecting device SC is 10%, and $\lambda_{V90}$ denotes the wavelength (unit: nm) of the short wavelength light whose transmittance of the wavelength selecting device SC is 90%.

Conditional expression (5) defines an appropriate range of characteristics of the interference filter as the wavelength selecting device SC. When the value $\lambda_{V90}-\lambda_{V10}$ exceeds the upper limit of conditional expression (5), the shape of the graph sowing transmittance characteristic of the interference filter shows that the transmittance gradually decreases to the short wavelength side. Accordingly, under the conditional expression (1), transmittance in the short wavelength side becomes relatively large, so that the light from violet to ultraviolet cannot be sufficiently removed by the wavelength selecting device SC. Moreover, transmittance in the long wavelength side becomes relatively small, in other words, a portion of blue light may be removed. Accordingly, proper color reproduction cannot be carried out because the light looses a portion of blue light among the three primary colors of blue, green and red, which are indispensable for color reproduction. So, an optical system with high optical performance cannot be obtained. On the other hand, the value $\lambda_{V90}-\lambda_{V10}$ falls below the lower limit of the conditional expression (5), the shape of the graph showing transmittance characteristic of the interference filter shows that the transmittance increases quickly to the short wavelength side. However, an interference filter having such characteristic requires an excessively large number of films to increase manufacturing cost. As a result, because of the manufacturing cost, the purpose of the first embodiment of the present invention which is to provide a low cost optical system cannot be accomplished.

Furthermore, in the first embodiment of the present invention, the wavelength selecting device SC transmits only useful visible light and is selectively substantially non-transparent with respect to the long wavelength light. It is desirable to satisfy the following conditional expression (6):

$$650 < \lambda_{R10} < 750 \tag{6}$$

where $\lambda_{R10}$ denotes the wavelength (unit: nm) of the long wavelength light whose transmittance of the wavelength selecting device SC is 10%.

An effect for transmitting only a useful visible light by making selectively substantially non-transparent with respect to the long wavelength light, in other words, an effect of an infrared-cut filter is added to the wavelength selecting device SC which is selectively substantially non-transparent with respect to the short wavelength light, so that the number of optical elements can be reduced by one in comparison with the case that an infrared-cut filter is arranged separately. Accordingly, it is possible to accomplish low cost and compactness.

Conditional expression (6) defines an appropriate range of the effect of the infrared-cut filter. When the value $\lambda_{R10}$ exceeds the upper limit of conditional expression (6), the infrared-cut filter transmits the major part of infrared light. Accordingly, excellent color reproduction or removal of flare caused by chromatic aberration of the infrared light cannot be accomplished. On the other hand, when the value $\lambda_{R10}$ falls below the lower limit of the conditional expression (6), a portion of red light is removed. As a result, the light transmitted through the wavelength selecting device SC and received by the imaging device I loses a portion of red light. Accordingly, proper color reproduction cannot be carried out because the light loses a portion of red light among the three primary colors of blue, green and red, which are indispensable for color reproduction. So, an optical system with high optical performance cannot be obtained.

Furthermore, in the first embodiment of the present invention, the wavelength selecting device SC preferably includes, in a body or integrally an absorption filter IRCF which transmits only useful visible light and, with respect to the long wavelength light, is selectively substantially non-transparent and an interference film IRC which transmits only useful visible light and is, with respect to the long wavelength light, selectively substantially non-transparent. The interference film IRC is located to the object side of the absorption filter IRCF. The above-described conditional expression (6) is preferably satisfied.

As described above, by adding an absorption filter IRCF which transmits only useful visible light and is, with respect to the long wavelength light, selectively substantially non-transparent and an interference film IRC which transmits only useful visible light and is, with respect to the long wavelength light, selectively substantially non-transparent, to the wavelength selecting device SC which is, with respect to the short wavelength light, selectively substantially non-transparent, in other words, since an infrared-cut filter and an infrared-cut interference film are added to the wavelength reflecting device SC, the number of optical elements can be reduced by one in comparison with the case that an infrared-cut filter is arranged separately. Accordingly, it is possible to accomplish low cost and compactness.

Figure 9:
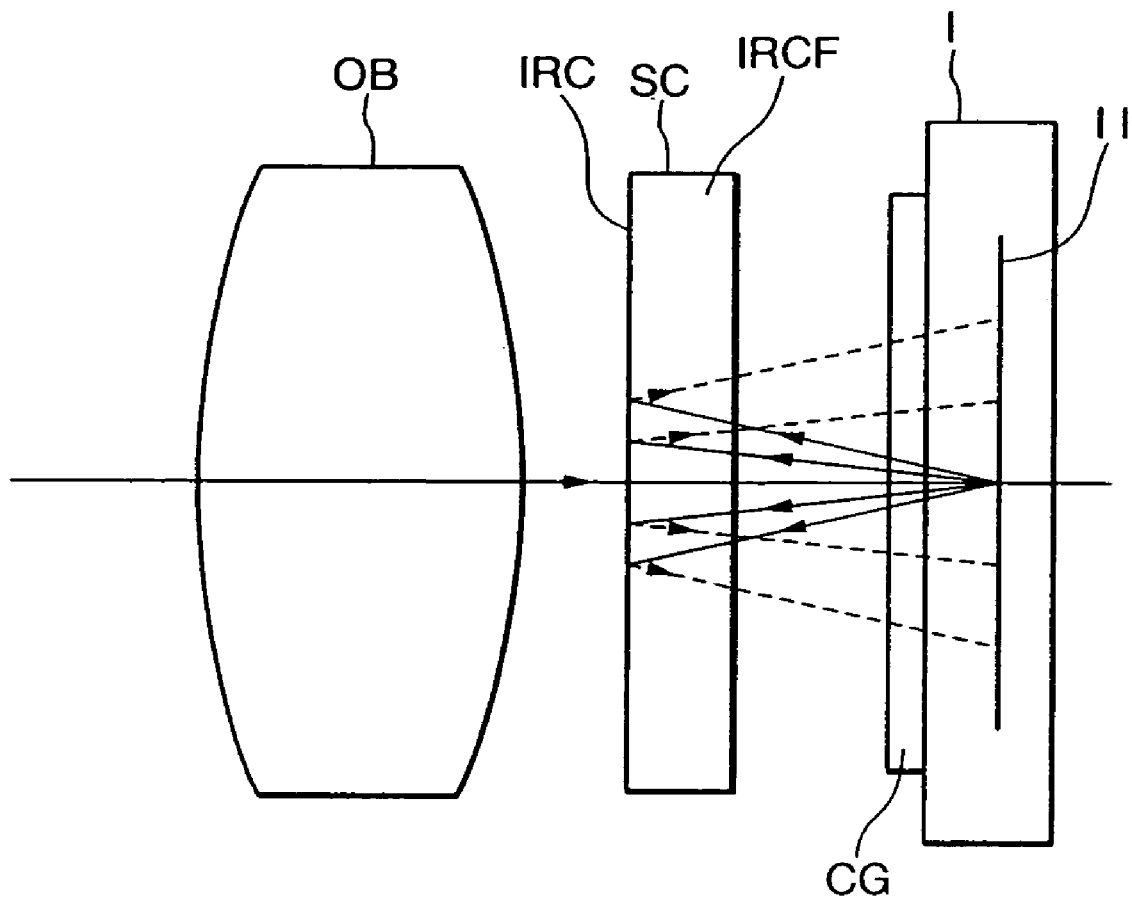
FIG. 9 is a diagram showing mechanism of suppressing the periodical ghost images by using the absorption filter IRCF, the ghost images being generated between the interference film IRC surface of the wavelength selecting device SC and the imaging device I caused by transmitting light and reflecting light at the interference film IRC and the absorption filter IRCF of the wavelength selecting device SC.

When the effect for transmitting only useful visible light by making selectively substantially non-transparent with respect to the long wavelength light is to be obtained by only the interference film IRC, periodical ghost images are generated between the interference film IRC and the imaging device I, so that an optical system with high optical performance cannot be accomplished for the same reason as above-described regarding the interference film UVC of the interference filter which is selectively substantially non-transparent with respect to the short wavelength light. As shown in FIG. 9, it is desirable that the interference film IRC is arranged to the object side of the absorption filter IRCF. The arrangement makes it possible to suppress generation of periodical ghost images. FIG. 9 is a diagram showing a mechanism of suppressing the periodical ghost images generated between the interference film IRC surface of the wavelength selecting device SC and the imaging device I, the ghost images being caused by the light transmitting through and reflected by the interference film IRC and the absorption filter IRCF of the wavelength selecting device SC.

The mechanism of suppressing the periodical ghost images is described below. The light liable to be a ghost image at the interference film IRC of the wavelength selecting device SC has the wavelength between the wavelength of the light reflected on the interference film IRC without transmitting therethrough and the wavelength of the light transmitting through the interference film IRC substantially not reflected thereon, in other words, the wavelength of the light transmitting and reflected on the interference film IRC. The light is incident to the no-power optical group PL having the wavelength selecting device SC through the objective optical system OB. Then, the light having this wavelength partially transmits through the interference film IRC formed on the wavelength selecting device SC. The light having transmitted through the interference film IRC is partially absorbed by the absorption filter IRCF arranged to the image side of the interference film IRC and a portion of light having transmitted through the absorption filter IRCF is incident to the imaging device I. Since the surface of the imaging device I has the minute periodic pattern, the light incident to the imaging device I is not only regularly reflected on the surface but also reflected in the direction forming the optical path difference of $n\lambda$ (n: integer, $\lambda$: wavelength) caused by interference. The light reflected in the direction forming the optical path difference of $n\lambda$ is incident again to the absorption filter IRCF in the wavelength selecting device SC, and is partially absorbed by the absorption filter IRCF. And only a portion of light transmits through the absorption filter IRCF. Then, the light having transmitted through the absorption filter IRCF is incident to the interference film IRC and is partially reflected by the interference film IRC. Then, the light reflected by the interference film IRC is absorbed again by the absorption filter IRCF. And only a portion of light is incident to the imaging device I. However, the light incident to the imaging device I as ghost images has already passed through the absorption filter three times, so that almost all light has been absorbed and resultant weak periodical ghost images have been inconspicuous.

Furthermore, in the first embodiment of the present invention, the following conditional expression (7) is preferably satisfied:

$$5 < \lambda_{R10} - \lambda_{R80} < 60 \tag{7}$$

where $\lambda_{R10}$ denotes the wavelength (unit: nm) of the long wavelength light whose transmittance of the wavelength selecting device SC is 10%, and $\lambda_{R80}$ denotes the wavelength (unit: nm) of the long wavelength light whose transmittance of the wavelength selecting device SC is 80%.

Conditional expression (7) defines an appropriate range of the characteristics of the infrared-cut filter. When the value $\lambda_{R10}-\lambda_{R80}$ exceeds the upper limit of conditional expression (7), the shape of the graph showing transmittance characteristic of the infrared-cut filter shows that the transmittance gradually decreases to the long wavelength side. Accordingly, a portion of red light is removed by the wavelength selecting device SC. As a result, proper color reproduction cannot be carried out because the light loses a portion of red light among the three primary colors of blue, green and red, which are indispensable for color reproduction. So, an optical system with high optical performance cannot be obtained.

Moreover, when the effect of the infrared-cut filter is obtained by the interference film IRC, the range of the wavelengths where both transmission and reflection take place in the interference film IRC becomes excessively broad. As a result, the above-described periodical ghost images become conspicuous. So, an optical system with high optical performance cannot be obtained.

On the other hand, when the value $\lambda_{R10}-\lambda_{R80}$ falls below the lower limit of the conditional expression (7), the shape of the graph showing transmittance characteristic of the effect of the infrared-cut filter shows that the transmittance decreases quickly to the long wavelength side. However, an interference filter having such characteristic requires an excessively large number of films to increase manufacturing cost. As a result, because of the manufacturing cost, the purpose of the first embodiment of the present invention which is to provide a low cost optical system cannot be accomplished.

Furthermore, in the first embodiment of the present invention, the wavelength selecting device SC preferably has the function of cutting off a higher spatial frequency than the resolution limit of the imaging device I. Accordingly, the number of optical elements can be reduced by one in comparison with the case that a low-pass filter is arranged separately. Accordingly, it is possible to accomplish low cost, compactness, and lightweight caused by reducing the number of optical elements.

Furthermore, in the first embodiment of the present invention, the following conditional expressions (8) and (9) are preferably satisfied:

$$D_L/Y < 0.2 \qquad (8)$$

$$D_L > 0.5 \qquad (9)$$

where $D_L$ denotes the thickness (unit: mm) along the optical axis of the wavelength selecting device SC having the function of cutting off a higher spatial frequency than the resolution limit of the imaging device I, and Y denotes the diagonal length (unit: mm) of the imaging device I.

Conditional expression (8) defines an upper limit of the thickness along the optical axis (thickness in the direction parallel to the optical axis) of the wavelength selecting device SC for cutting off a higher spatial frequency than the resolution limit of the imaging device I. When the ratio $D_L/Y$ exceeds the upper limit of the conditional expression (8), the weight of the wavelength selecting device SC becomes heavy because the thickness of the wavelength selecting device SC along the optical axis becomes excessively large. As a result, the purpose of the present invention which is to provide an optical system with a lightweight cannot be accomplished.

Conditional expression (9) defines the lower limit of the thickness along the optical axis of the wavelength selecting device SC having the function of cutting off a higher spatial frequency than the resolution limit of the imaging device I. When the value $D_L$ falls below the lower limit of the conditional expression (9), the strength as a component cannot be maintained because the thickness along the optical axis of the wavelength selecting device SC becomes excessively thin. As a result, since the wavelength selecting device SC is easily broken by a small impact, it becomes necessary to repair. As a result, the purpose of the first embodiment of the present invention which is to provide a low cost optical system cannot be accomplished.

Furthermore, in the first embodiment of the present invention, the wavelength selecting device SC preferably has a function of protecting the surface of the imaging device I. Because of this function, the number of optical elements can be reduced by one in comparison with the case that a cover glass is arranged separately. Accordingly, it is possible to accomplish low cost, compactness, and lightweight caused by reducing the number of optical elements.

Then, the first embodiment viewed from a different point regarding the present invention is going to be explained According to another aspect of the first embodiment of the present invention, an optical system with a wavelength selecting device includes, in order from an object along the optical axis, an objective optical system OB composed of an optical element having refractive power and an aperture stop, a no-power optical group PL composed of optical elements having no refractive power, and an imaging device I. The no-power optical group PL has a wavelength selecting device SC which is, with respect to short wavelength light, selectively substantially non-transparent. The wavelength selecting device SC is preferably an interference filter which is, with respect to the short wavelength light, selectively substantially non-transparent by the interference film formed on the surface only of the no-power optical group PL.

The first embodiment viewed from the different point is the same as the first embodiment with respect to the following point; lateral chromatic aberration remained in the short wavelength side is removed by removing the short wavelength light to obtain the same effect as aberration correction; and the wavelength selecting device SC which is, with respect to the short wavelength light, selectively substantially non-transparent is placed in the no-power optical group PL located between the objective optical system OB and the imaging device I.

The wavelength selecting device SC is preferably an interference filter which is, with respect to the short wavelength light, selectively substantially non-transparent by the interference film formed on the surface only of the no-power optical group PL.

Because of the interference-film-manufacturing method such as evaporation, when the surface on which the film is formed has a curvature, the characteristic of the interference filter becomes different between the center and the periphery of the surface. Accordingly, the surface on which the interference film UVC is formed is preferably a plane having no power.

Moreover, since the interference filter obtains the characteristics by optical interference due to thin films, the characteristics of the interference filter theoretically differ between normal incidence and oblique incidence of a light. Accordingly, in order to obtain uniform characteristics all over the image field, it is desirable that the incident angle to the interference filter of the on-axis ray is substantially the same as that of off-axis ray. In order to realize this, it is desirable that the on-axis ray and the off-axis ray are substantially parallel to the optical axis.

As described above, in video cameras and electronic still cameras having an imaging device such as a solid state imaging device, the ray coming out from an objective optical system OB is almost parallel to the optical axis.

Therefore, in the first embodiment of the present invention, it is preferable that an interference filter as the wavelength selecting device SC is arranged at the no-power optical group PL locating between the objective optical system OB and the imaging device I. Accordingly, in the first embodiment, characteristics of the light incident to the center of the imaging device and that to the periphery of the imaging device are made to be uniform, and the light incident to the imaging device I is made to have the uniform characteristics all over the image field, so that the optical system is made to have high optical performance.

Moreover, in the first embodiment of the present invention, it is desirable that the optical element locating at the most image side of the objective optical system OB has positive refractive power.

When the optical element locating at the most image side of the objective optical system OB has positive refractive power, the ray coming out from the objective optical system OB approaches to the parallel relative to the optical axis. As a result, the uniformity of the incident angle to the interference film increases. Accordingly, characteristics of the film can be made more uniform all over the image frame, so that higher optical performance can be obtained.

Furthermore, in the first embodiment of the present invention, the following conditional expression (10) is preferably satisfied:

$$\lambda_{V50} D/PY < 4.5 \times 10^4 \qquad (10)$$

where $\lambda_{V50}$ denotes the wavelength (unit: nm) of the short wavelength light whose transmittance of the wavelength selecting device SC is 50%, D denotes an air-reduced optical path length (unit: mm) from the position of the interference film UVC to the imaging device I, P denotes the pitch (unit: mm) of a pixel of the imaging device I measured in the shortest direction, and Y denotes the diagonal length (unit: mm) of the imaging device I.

Conditional expression (10) defines an appropriate position of the interference film for preventing periodical ghost images generated by the aforementioned third wavelength light from being conspicuous. The conditional expression (10) is a modification of the condition expression (3) for the first embodiment. When the ratio $\lambda_{V50} D/PY$ exceeds the upper limit of the conditional expression (10), coherent length becomes far larger than that at wavelength λ, so that the intensity of periodical ghost images becomes excessively strong. Moreover, the periodical ghost images become so large relative to the size of the image frame, so that the image becomes dirty. As a result, the purpose of the first embodiment of the present invention to provide an optical system with high optical performance cannot be accomplished.

In addition, it is more preferable that the lower limit of the conditional expression (10) is set to $8.2 \times 10^3$. When the ratio $\lambda_{V50} D/PY$ falls below the lower limit of conditional expression (10), the surface of the optical element on which the interference film UVC is formed comes near to the imaging device I, so that dust or the like stuck on the interference film is liable to cast the shadow on the imaging device I. Accordingly, since the shadow of dust or the like is liable to be imaged, it becomes difficult to obtain high image quality. As a result, the purpose of the first embodiment of the present invention which is to provide an optical system with high optical performance cannot be accomplished.

Furthermore, in the first embodiment of the present invention, the above-described conditional expression (4) is preferably satisfied. The conditional expression (4) has already been explained above.

Furthermore, in the first embodiment of the present invention, the above-described conditional expression (5) is preferably satisfied. The conditional expression (5) has already been explained above.

Furthermore, in the first embodiment of the present invention, the wavelength selecting device SC preferably satisfies the above-described conditional expression (1). The conditional expression (1) has already been explained above.

Furthermore, in the first embodiment of the present invention, the wavelength selecting device SC transmits only useful visible light and is, with respect to the long wavelength light, selectively substantially non-transparent. It is desirable to satisfy the above-described conditional expression (6). The conditional expression (6) has already been explained above.

Moreover, the effect of transmitting only useful visible light by making, with respect to the long wavelength light, selectively substantially non-transparent may be obtained by an absorption filter type, an interference filter type, or both types. When the interference filter type is used, it may be possible to construct such that a wavelength selecting device SC which is, with respect to the short wavelength light, selectively substantially non-transparent is formed on a surface of an optical element and an interference filter which is, with respect to the long wavelength light, selectively substantially non-transparent is formed on the other surface of the optical element. Alternatively, it may be possible to construct such that a wavelength selecting device SC has an effect that it is, with respect to the short wavelength light, selectively substantially non-transparent as well as an effect that it is, with respect to the long wavelength light, selectively substantially non-transparent.

Furthermore, in the first embodiment of the present invention, the wavelength selecting device SC includes in a body or integrally an absorption filter IRCF which transmits only useful visible light and is, with respect to the long wavelength light, selectively substantially non-transparent and an interference film IRC which transmits only useful visible light and is, with respect to the long wavelength light, selectively substantially non-transparent. The interference film IRC is located to the object side of the absorption filter IRCF. The above-described conditional expression (6) is preferably satisfied. The conditional expression (6) has already been explained above.

Furthermore, in the first embodiment of the present invention, the wavelength selecting device SC preferably has the function of cutting off a higher spatial frequency than the resolution limit of the imaging device I.

Furthermore, in the first embodiment of the present invention, the above-described conditional expressions (8) and (9) are preferably satisfied. The conditional expressions (8) and (9) have already been explained above.

Furthermore, in the first embodiment of the present invention, the wavelength selecting device SC preferably has a function of protecting the surface of the imaging device I. This function has already been explained.

Each numerical example of an optical system with a wavelength selecting device according to the first embodiment of the present invention is explained below with reference to accompanying drawings.

In each example, an aspherical surface is expressed by the following expression:

$$x = cy^2/\{1+(1-\kappa c^2 y^2)^{1/2}\} + C4y^4 + C6y^6 +$$

where y denotes the height in a vertical direction relative to the optical axis, x denotes a sag amount, c denotes a reference radius of curvature, κ denotes the conical coefficient, and C4, C6 . . . denote aspherical coefficients.

In aspherical data, E-n denotes "×10⁻ⁿ". For example, 1.234E-05 denotes $1.234 \times 10^{-5}$.

EXAMPLE 1

FIG. 1 is a sectional view showing the lens arrangement of an optical system according to Example 1 of a first embodiment of the present invention in a wide-angle end state W and a telephoto end state T.

The optical system with a wavelength selecting device according to Example 1 is composed of, in order from an object side along the optical axis, an objective optical system OB, a no-power optical group PL, and an imaging device I.

The objective optical system OB is composed, in order from the object along the optical axis, a first lens group G1, a second lens group G2 including an aperture stop S, and a third lens group G3.

The first lens group G1 having negative refractive power as a whole is composed of, in order from the object, a negative meniscus lens L11 having a convex surface facing to the object and an aspherical surface facing to an image, a double concave negative lens L12 having a stronger concave surface facing to the image, and a positive meniscus lens L13 having a convex surface facing to the object.

The second lens group G2 having positive refractive power as a whole is composed of, in order from the object, an aperture stop S, a double convex positive lens L21 having a stronger convex surface facing to the object which is an aspherical surface, a cemented negative lens constructed by a double convex positive lens L22 cemented with a double concave negative lens L23, and a cemented positive lens constructed by a negative meniscus lens L24 having a convex surface facing to the object cemented with a double convex positive lens L25.

The third lens group G3 being the most image side optical element of the objective optical system OB having positive refractive power as a whole is composed of a double convex positive lens L31 having a stronger convex surface facing to the object which is an aspherical surface.

When the state of lens group positions varies from a wide-angle end state W to a telephoto end state T, the distance between the first lens group G1 and the second lens group G2 decreases and the third lens group G3 is substantially fixed relative to the image plane.

The no-power optical group PL arranged to the image side of the objective optical system OB is composed of, in order from the object, a low-pass filter LPF having a plane-parallel shape with no refractive power, and a cover glass CG for protecting the surface of the imaging device I.

The low-pass filter LPF constructed in a body or integrally with an absorption filter IRCF which is, with respect to the long wavelength light, selectively substantially non-transparent, has a function of the absorption filter IRCF. Moreover, an interference film IRC which is, with respect to the long wavelength light, selectively substantially non-transparent is formed on the object side surface of the low-pass filter LPF, and an interference film UVC which is, with respect to the short wavelength light, selectively substantially non-transparent is formed on the image side surface of the low-pass filter LPF. The low-pass filter LPF having this construction is the wavelength selecting device SC according to Example 1.

Figure 10:
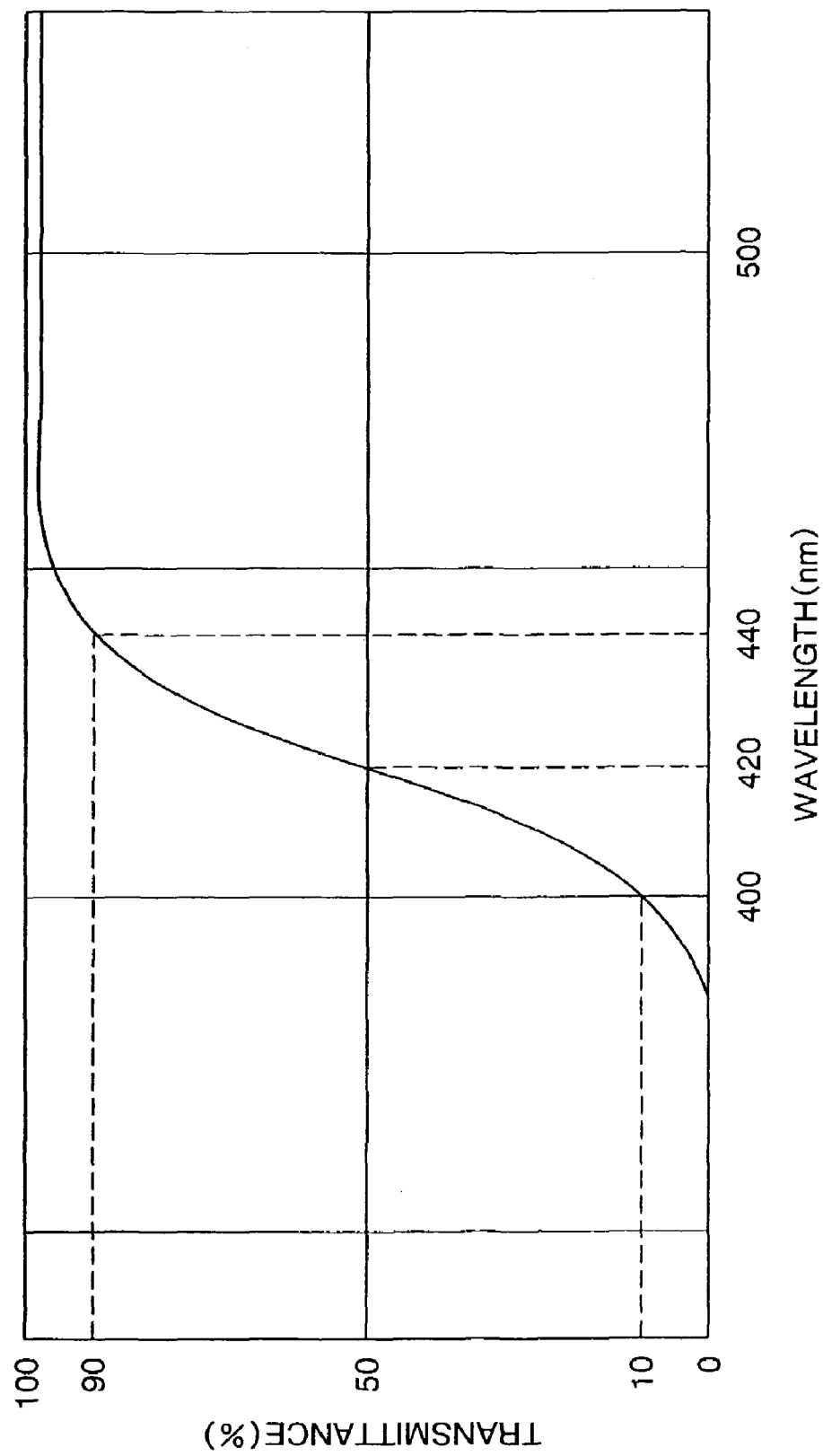
FIG. 10 graphically shows a spectral transmittance of the interference film UVC of the wavelength selecting device SC according to Example 1 of the first embodiment of the present invention which is, with respect to short wavelength light, selectively substantially non-transparent.

FIG. 10 graphically shows a spectral transmittance of the interference film UVC of the wavelength selecting device SC which is, with respect to the short wavelength light, selectively substantially non-transparent.

Figure 11:
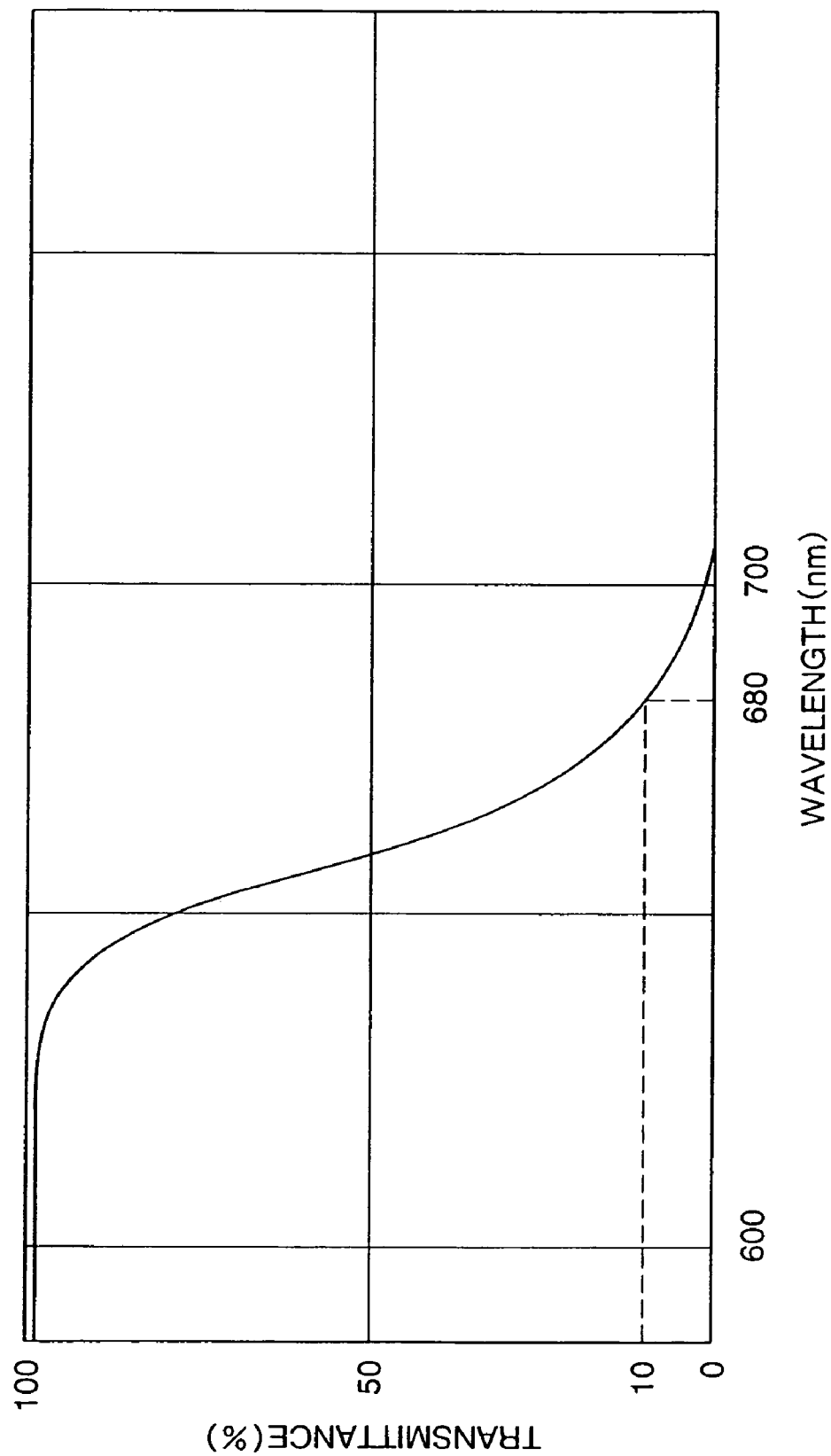
FIG. 11 graphically shows an overall spectral transmittance of the absorption filter IRCF and the interference film IRC which are, with respect to long wavelength light, selectively substantially non-transparent, according to Example 1 of the first embodiment of the present invention.

FIG. 11 graphically shows an overall spectral transmittance of the absorption filter IRCF and the interference film IRC which are, with respect to the long wavelength light, selectively substantially non-transparent.

Various values associated with Example 1 are listed in Table 1. In Table 1, f denotes the focal length of the whole optical system, FNO denotes the f-number, and ω denotes a half angle of view (maximum angle of incidence) as a unit of degree [°]. In Lens Data, nd denotes refractive index at d-line (λ=587.6 nm), and ν denotes Abbe number. Refractive index of the air (n=1.00000) is abbreviated.

In lens data, UVC denotes the surface of the interference film UVC which is, with respect to short wavelength light, selectively substantially non-transparent, UVCF denotes the surface of the absorption filter UVCF which is, with respect to short wavelength light, selectively substantially non-transparent, IRC denotes the surface of the interference film IRC which is, with respect to long wavelength light, selectively substantially non-transparent, IRCF denotes the surface of the absorption filter IRCF which is, with respect to the long wavelength light, selectively substantially non-transparent, LPF denotes the low-pass filter, and CG denotes the cover glass for protecting the surface of the imaging device I.

In the tables of the following numerical examples, the symbols and aspherical expression are the same as this example. In the table for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

TABLE 1

| (Specifications) | | |
|---|---|---|
| focal length | wide-angle end | telephoto end |
| f | 7.40 | 21.30 |
| FNO | 2.9 | 5.0 |
| ω | 37.4 | 14.4 |

| (Lens Data) | | | | |
|---|---|---|---|---|
| surface number | radius of curvature | surface distance | nd | ν |
| 1 | 26.3278 | 1.700 | 1.74001 | 48.16 |
| 2 | 8.1533 | 5.750 | | |
| 3 | −174.3801 | 0.900 | 1.48749 | 70.24 |
| 4 | 23.4928 | 2.400 | | |
| 5 | 17.9444 | 3.200 | 1.84666 | 23.78 |
| 6 | 33.9654 | (D6) | | |
| 7 | ∞ | 0.500 | Aperture Stop S | |
| 8 | 10.3019 | 2.550 | 1.66547 | 55.18 |
| 9 | −69.6160 | 0.100 | | |
| 10 | 14.8088 | 2.550 | 1.60562 | 43.73 |
| 11 | −14.8001 | 2.000 | 1.80100 | 34.96 |
| 12 | 7.8543 | 0.900 | | |
| 13 | 27.6364 | 0.900 | 1.80100 | 34.96 |
| 14 | 8.6622 | 2.700 | 1.61272 | 58.75 |
| 15 | −25.3313 | (D15) | | |
| 16 | 29.5916 | 2.300 | 1.66547 | 55.18 |
| 17 | −258.5473 | 1.922 | | |
| 18 | ∞ IRC | 2.760 | 1.45850 | 68.00 LPF, IRCF |
| 19 | ∞ UVC | 1.441 | | |
| 20 | ∞ | 0.500 | 1.51680 | 64.20 CG |
| 21 | ∞ | (BF) | | |

(Aspherical Data)

Surface Number 2

TABLE 1-continued

κ = 0.1000
C4 = +1.18060E−04
C6 = +7.93980E−07
C8 = −2.26350E−09
C10 = +7.95490E−11
Surface Number 8

κ = 1.0000
C4 = −6.65950E−05
C6 = −3.23530E−07
C8 = +3.34640E−09
C10 = −1.01760E−10
Surface Number 16

κ = 1.0000
C4 = −1.16570E−05
C6 = +1.10140E−06
C8 = −2.62900E−08
C10 = +2.73560E−10

(Variable Intervals upon Zooming)

|     | W       | T       |
| --- | ------- | ------- |
| f   | 7.40    | 21.30   |
| D6  | 27.4238 | 4.8711  |
| D15 | 8.5310  | 26.8626 |
| BF  | 1.0300  | 0.9880  |

(Values for the conditional expressions)

| D = 2.80 | W |
| = 2.76 | T |
| P = 3.4 × 10$^{-3}$ | |
| Y = 10.9 | |
| P$_0$ = −29.3 | W |
| = −254 | T |
| (1) λ$_{V50}$ = 420 | |
| (3) D/PY = 7.56 × 10$^1$ | W |
| 7.45 × 10$^1$ | T |
| (4) Y/P$_0$ = −0.37 | W |
| −0.04 | T |
| (5) λ$_{V90}$ − λ$_{V10}$ = 40 | |
| (6) λ$_{R10}$ = 680 | |
| (10) λ$_{V50}$D/PY = 3.17 × 10$^4$ | W |
| 3.13 × 10$^4$ | T |

FIGS. 2 and 3 graphically show various aberrations of an objective optical system OB in the optical system according to Examples 1 and 2 of the first embodiment in the wide-angle end state W and the telephoto end state T, respectively. In aberration graphs of all examples, Y denotes image height (unit: mm), in particular, and in the graphs showing spherical aberration, astigmatism, and distortion, Y denotes the maximum value of the image height. FNO denotes the f-number. In the graphs showing astigmatism, a solid line indicates a sagittal image plane, and a broken line indicates a meridional image plane. In graphs showing coma, value of coma with respect to each image height is shown. In respective graphs, d denotes an aberration curve at d-line (λ=587.6 nm), and g denote that at g-line (λ=435.8 nm).

In graphs showing various aberrations according to each example, the same notation as Example 1 is applied.

As is apparent from the respective graphs showing various aberrations, the optical system with a wavelength selecting device according to Example 1 shows very small monochromatic aberrations and has high optical performance.

FIGS. 4 and 5 graphically show lateral chromatic aberration relative to wavelength at image height of 4 mm in the wide-angle end state W and the telephoto end state T, respectively. As shown in respective graphs, although lateral chromatic aberration becomes large in short wavelength side, chromatic aberration component of the wavelength shorter than 420 nm is removed by the wavelength selecting device SC, so that the same effect as lateral chromatic aberration is corrected is finally obtained.

It is possible that the above-described low-pass filter LPF also has a function of the cover glass CG.

As described above, it is apparent that the optical system with a wavelength selecting device according to Example 1 has high optical performance.

EXAMPLE 2

Figure 12:
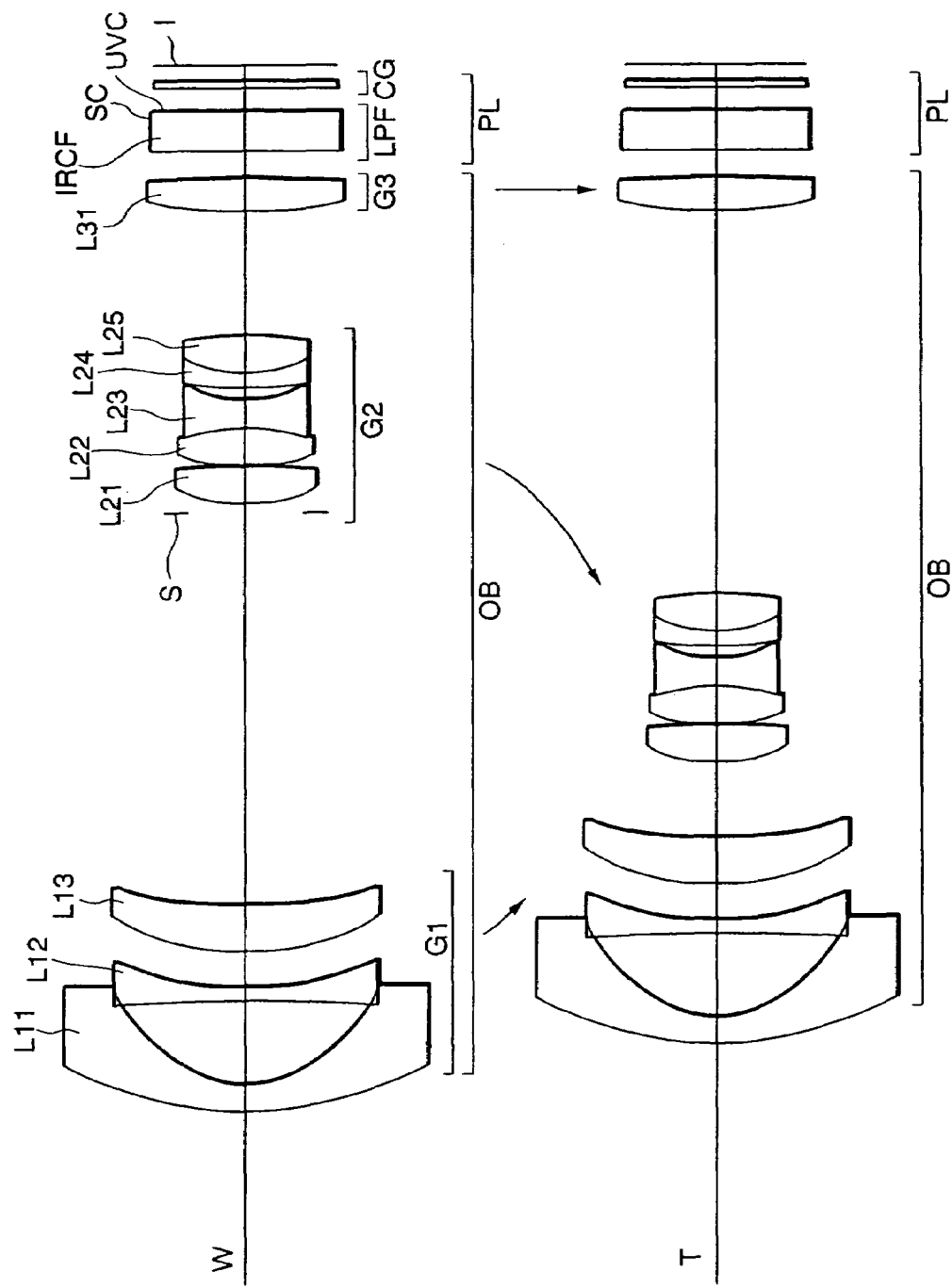
FIG. 12 is a sectional view showing the lens arrangement of an optical system according to Example 2 of the first embodiment of the present invention in a wide-angle end state W and in a telephoto end state T.

FIG. 12 is a sectional view showing the lens arrangement of an optical system according to Example 2 of the first embodiment of the present invention in a wide-angle end state W and in a telephoto end state T.

The optical system with a wavelength selecting device according to Example 2 is composed of, in order from an object side along the optical axis, an objective optical system OB, a no-power optical group PL, and an imaging device I.

The objective optical system OB is composed, in order from the object along the optical axis, a first lens group G1, a second lens group G2 including an aperture stop S, and a third lens group G3. The objective optical system OB according to Example 2 is the same as that of Example 1, so that a duplicated explanation is abbreviated.

The no-power optical group PL arranged to the image side of the objective optical system OB is composed of, in order from the object, a low-pass filter LPF having a plane-parallel shape with no refractive power, and a cover glass CG for protecting the surface of the imaging device I.

The low-pass filter LPF is constructed integrally with an absorption filter IRCF which is, with respect to the long wavelength light, selectively substantially non-transparent, and has a function of the absorption filter IRCF. Moreover, an interference film UVC which is, with respect to the short wavelength light, selectively substantially non-transparent, is formed on the image side surface of the low-pass filter LPF. The low-pass filter LPF having such a construction is the wavelength selecting device SC according to Example 2.

Various values associated with Example 2 are listed in Table 2.

TABLE 2

(Specifications)

| focal length | wide-angle end | telephoto end |
| --- | --- | --- |
| f   | 7.40 | 21.30 |
| FNO | 2.9  | 5.0 |
| ω   | 37.4 | 14.4 |

(Lens Data)

| surface number | radius of curvature | surface distance | nd | ν |
| --- | --- | --- | --- | --- |
| 1  | 26.3278   | 1.700 | 1.74001 | 48.16 |
| 2  | 8.1533    | 5.750 |         |       |
| 3  | −174.3801 | 0.900 | 1.48749 | 70.24 |
| 4  | 23.4928   | 2.400 |         |       |
| 5  | 17.9444   | 3.200 | 1.84666 | 23.78 |
| 6  | 33.9654   | (D6)  |         |       |
| 7  | ∞         | 0.500 | Aperture Stop S | |
| 8  | 10.3019   | 2.550 | 1.66547 | 55.18 |
| 9  | −69.6160  | 0.100 |         |       |
| 10 | 14.8088   | 2.550 | 1.60562 | 43.73 |
| 11 | −14.8001  | 2.000 | 1.80100 | 34.96 |
| 12 | 7.8543    | 0.900 |         |       |
| 13 | 27.6364   | 0.900 | 1.80100 | 34.96 |
| 14 | 8.6622    | 2.700 | 1.61272 | 58.75 |

TABLE 2-continued

| 15 | −25.3313 | (D15) | | | |
|---|---|---|---|---|---|
| 16 | 29.5916 | 2.300 | 1.66547 | 55.18 | |
| 17 | −258.5473 | 1.922 | | | |
| 18 | ∞ | 2.760 | 1.45850 | 68.00 | LPF, IRCF |
| 19 | ∞ UVC | 1.441 | | | |
| 20 | ∞ | 0.500 | 1.51680 | 64.20 | CG |
| 21 | ∞ | (BF) | | | |

(Aspherical Data)

Surface Number 2

$\kappa = 0.1000$
$C4 = +1.18060E−04$
$C6 = +7.93980E−07$
$C8 = −2.26350E−09$
$C10 = +7.95490E−11$ Surface Number 8

$\kappa = 1.0000$
$C4 = −6.65950E−05$
$C6 = −3.23530E−07$
$C8 = +3.34640E−09$
$C10 = −1.01760E−10$ Surface Number 16

$\kappa = 1.0000$
$C4 = −1.16570E−05$
$C6 = +1.10140E−06$
$C8 = −2.62900E−08$
$C10 = +2.73560E−10$ (Variable Intervals upon Zooming)

| | W | T |
|---|---|---|
| f | 7.40 | 21.30 |
| D6 | 27.4238 | 4.8711 |
| D15 | 8.5310 | 26.8626 |
| BF | 1.0300 | 0.9880 |

(Values for the conditional expressions)

| | |
|---|---|
| D = 2.80 | W |
| = 2.76 | T |
| $P = 3.4 \times 10^{-3}$ | |
| Y = 10.9 | |
| $P_0 = −29.3$ | W |
| = −254 | T |
| (1) $\lambda_{V50} = 410$ | |
| (3) $D/PY = 7.56 \times 10^1$ | W |
| $7.45 \times 10^1$ | T |
| (4) $Y/P_0 = −0.37$ | W |
| −0.04 | T |
| (5) $\lambda_{V90} − \lambda_{V10} = 25$ | |
| (6) $\lambda_{R10} = 720$ | |
| (10) $\lambda_{V50}D/PY = 3.10 \times 10^4$ | W |
| $3.05 \times 10^4$ | T |

FIGS. 2 and 3 graphically show various aberrations of an objective optical system OB in the optical system according to Example 2 of the first embodiment in the wide-angle end state W and the telephoto end state T, respectively. Since Example 2 uses the same objective optical system OB as Example 1, various aberrations are the same as that of Example 1.

As is apparent from the respective graphs showing various aberrations, the optical system with a wavelength selecting device according to Example 2 shows very small monochromatic aberrations and has high optical performance.

Figure 13:
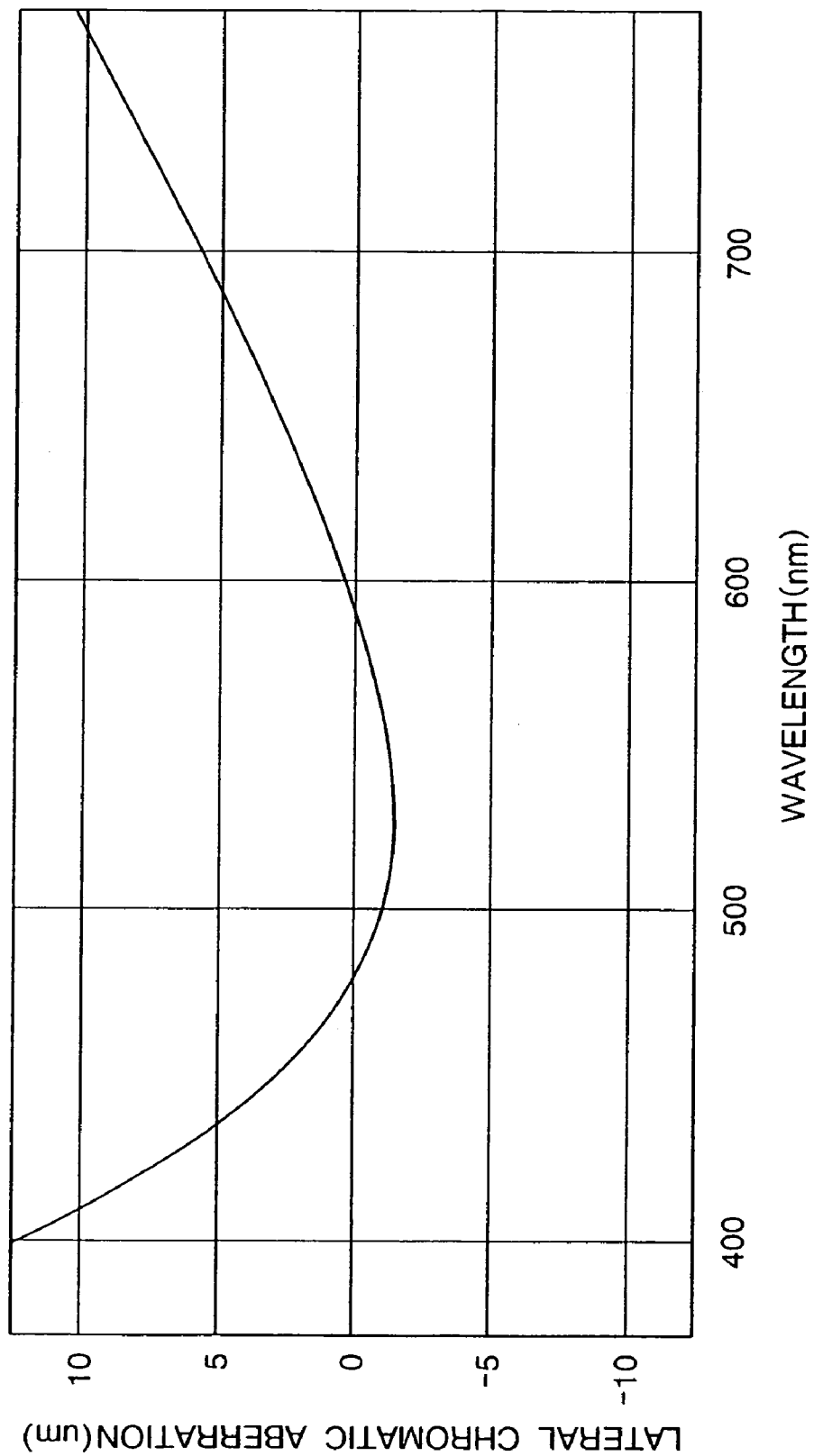
FIG. 13 graphically shows lateral chromatic aberration relative to wavelength at image height of 4 mm in the wide-angle end state W of the optical system according to Example 2 of the first embodiment.
Figure 14:
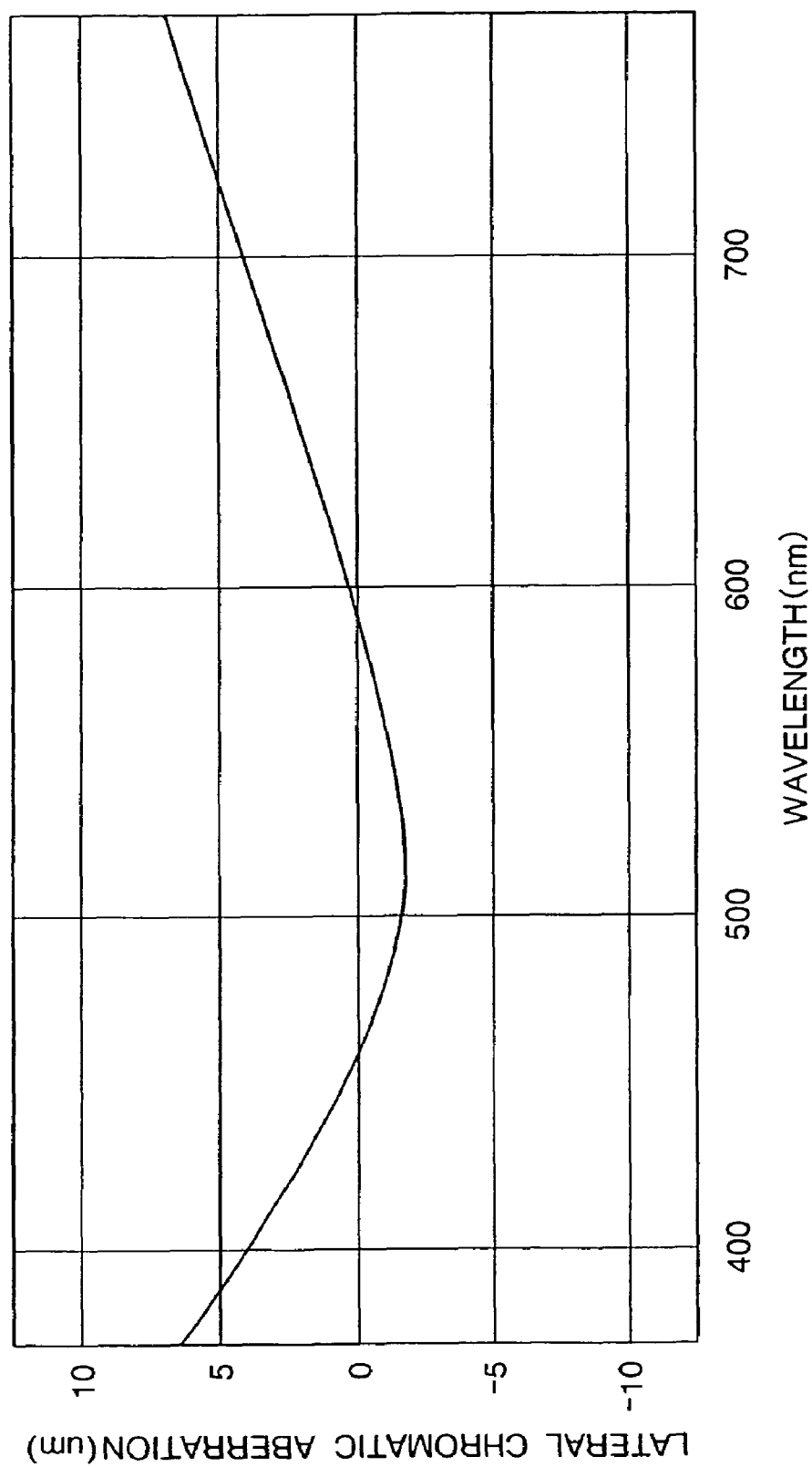
FIG. 14 graphically shows lateral chromatic aberration relative to wavelength at image height of 4 mm in the telephoto end state T of the optical system according to Example 2 of the first embodiment.
Figure 15:
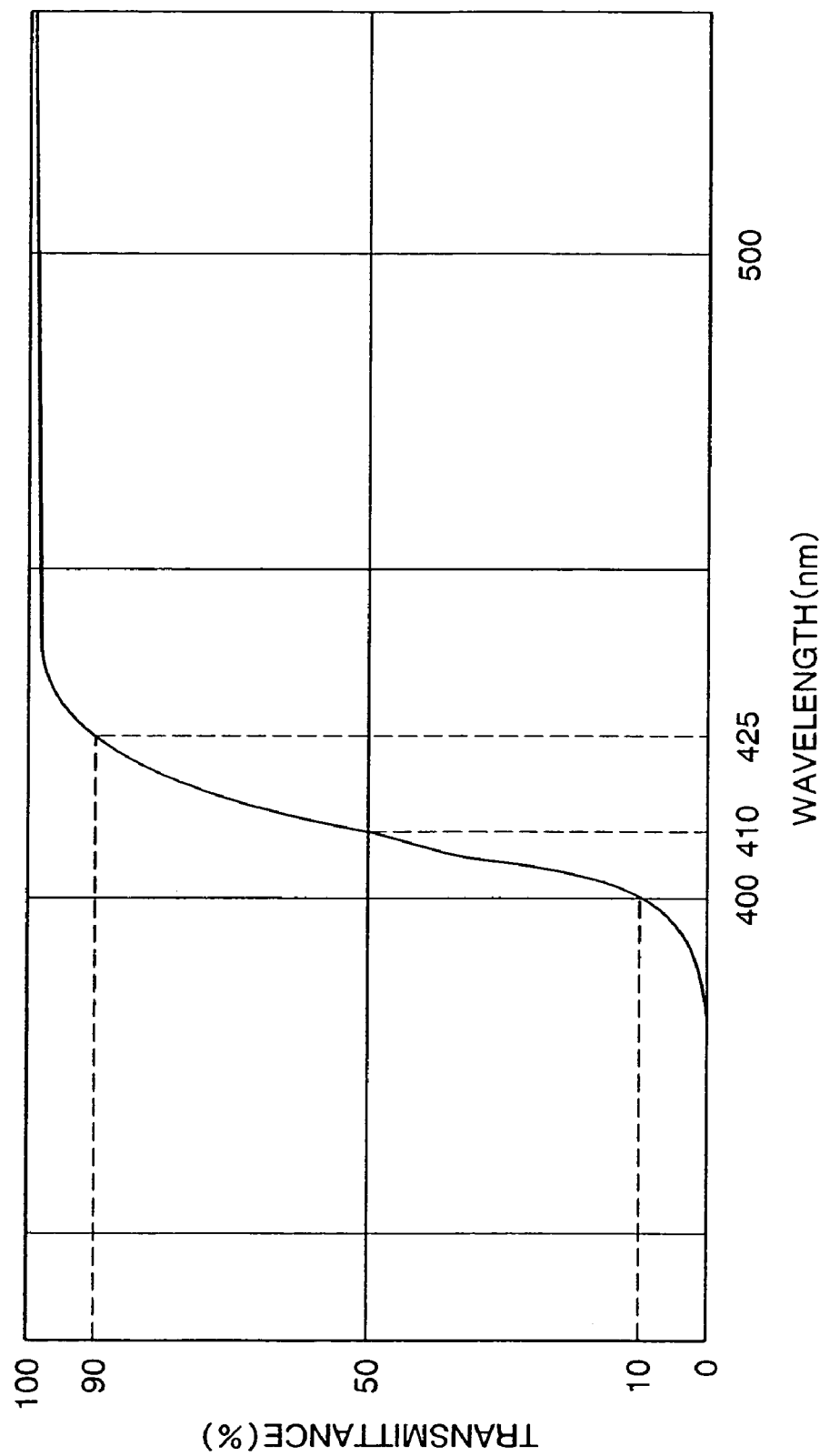
FIG. 15 graphically shows a spectral transmittance of the interference film UVC of the wavelength selecting device SC according to Example 2 of the first embodiment of the present invention, which film UVC is, with respect to short wavelength light, selectively substantially non-transparent.
Figure 16:
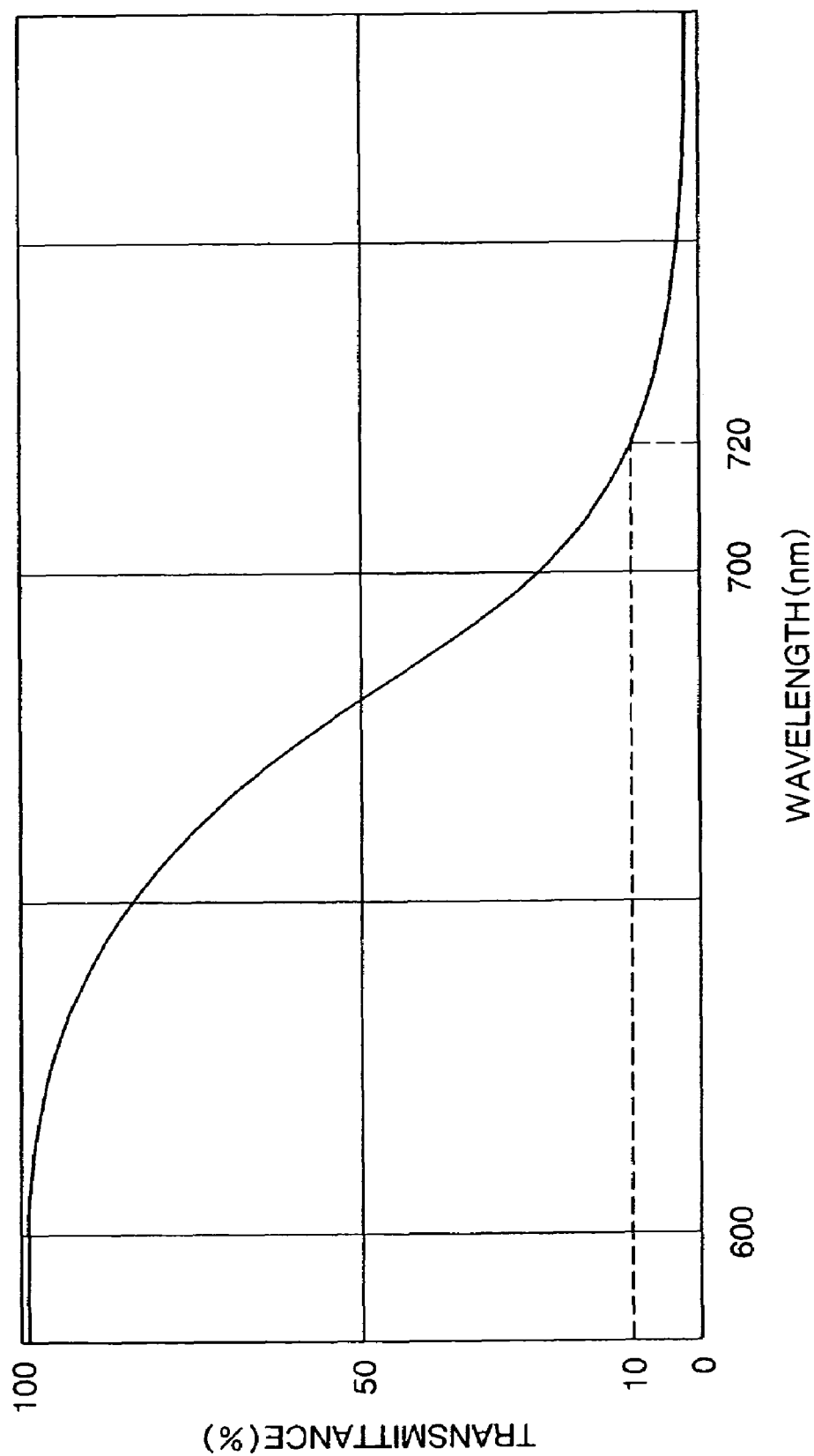
FIG. 16 graphically shows an overall spectral transmittance of the absorption filter IRCF which is, with respect to long wavelength light, selectively substantially non-transparent, according to Example 2 of the first embodiment of the present invention.

FIGS. 13 and 14 graphically show lateral chromatic aberration relative to wavelength at image height of 4 mm in the wide-angle end state W and the telephoto end state T, respectively. As shown in respective graphs, although lateral chromatic aberration becomes large in short wavelength side, chromatic aberration component of the wavelength shorter than 410 nm is removed by the wavelength selecting device SC, so that the same effect as lateral chromatic aberration is corrected is finally obtained.

As described above, it is apparent that the optical system with a wavelength selecting device according to Example 2 has high optical performance.

EXAMPLE 3

Figure 17:
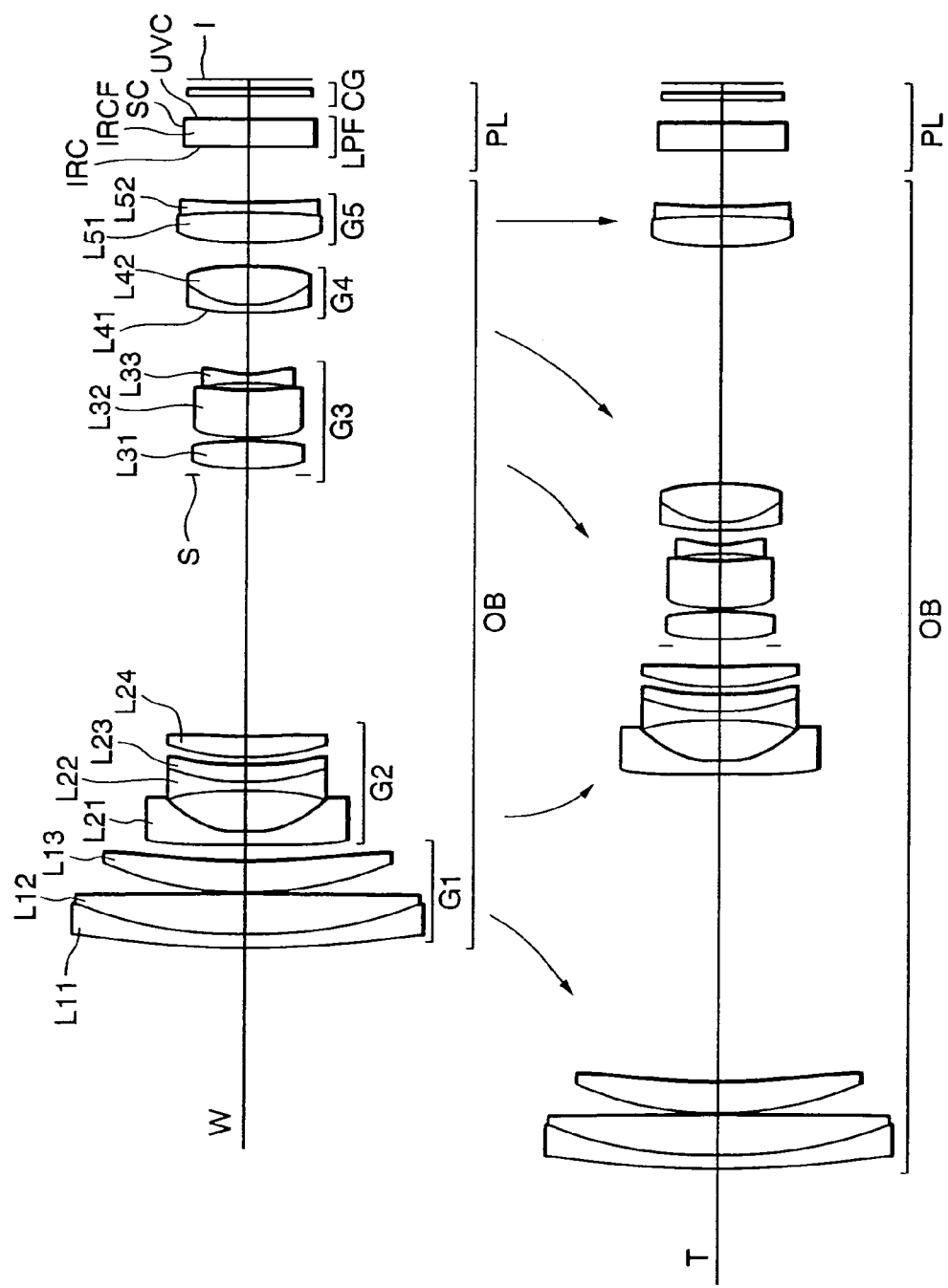
FIG. 17 is a sectional view showing the lens arrangement of an optical system according to Example 3 of the first embodiment of the present invention in a wide-angle end state W and in a telephoto end state T.

FIG. 17 is a sectional view showing the lens arrangement of an optical system according to Example 3 of the first embodiment of the present invention in a wide-angle end state W and in a telephoto end state T.

The optical system with a wavelength selecting device according to Example 3 is composed of, in order from an object side along the optical axis, an objective optical system OB, a-no-power optical group PL, and an imaging device I.

The objective optical system OB is composed, in order from the object along the optical axis, a first lens group G1, a second lens group G2, a third lens group G3 including an aperture stop S, a fourth lens group G4, and a fifth lens group G5.

The first lens group G1 having positive refractive power as a whole is composed of, in order from the object, a cemented positive lens constructed by a negative meniscus lens L11 having a convex surface facing to the object cemented with a double convex positive lens L12 having a stronger convex surface facing to the object, and a positive meniscus lens L13 having a convex surface facing to the object.

The second lens group G2 having negative refractive power as a whole is composed of, in order from the object, a negative meniscus lens L21 having a convex surface facing to the object, a cemented negative lens constructed by a double concave negative lens L22 having a stronger concave surface facing to the image cemented with a positive meniscus lens L23 having a concave surface facing to the image, and a positive meniscus lens L24 having a convex surface facing to the object.

The third lens group G3, having positive refractive power as a whole is composed of, in order from the object, an aperture stop S, a double convex positive lens L31 having a stronger convex surface facing to the object, a positive meniscus lens L32 having convex surfaces facing to the object, and a double concave negative lens L33 having a stronger concave surface facing to the image.

The fourth lens group G4 is composed of, in order from the object, a cemented positive lens constructed by a negative meniscus lens L41 having a convex surface facing to the object cemented with a double convex positive lens L42 having a stronger convex surface facing to the object.

The fifth lens group G5 is composed of a cemented positive lens constructed by a double convex positive lens L51 having a stronger convex surface facing to the object cemented with a double concave negative lens L52 having a stronger concave surface facing to the object.

When the state of lens group positions varies from the wide-angle end state to the telephoto end state, a distance between the first lens group G1 and the second lens group G2 increases, a distance between the second lens group G2 and the third lens group G3 decreases, a distance between the third lens group G3 and the fourth lens group G4 decreases, and a distance between the fourth lens group G4 the fifth lens group G5 increases, the fifth lens group is substantially fixed relative to the image plane.

The no-power optical group PL arranged to the image side of the objective optical system OB is composed of, in order from the object, a low-pass filter LPF having a plane-parallel shape with no refractive power, and a cover glass CG for protecting the surface of the imaging device I.

The low-pass filter LPF is constructed integrally with an absorption filter IRCF which is, with the respect to the long wavelength light, selectively substantially non-transparent, and has a function of the absorption filter IRCF. Moreover, an interference film IRC which is, with respect to the long wavelength light, selectively substantially non-transparent is formed on the object side surface of the low-pass filter LPF, and an interference film UVC for making the short wavelength light be selectively substantially non-transparent is formed on the image side surface of the low-pass filter LPF. The low-pass filter LPF having such a construction is the wavelength selecting device SC according to Example 3.

Figure 22:
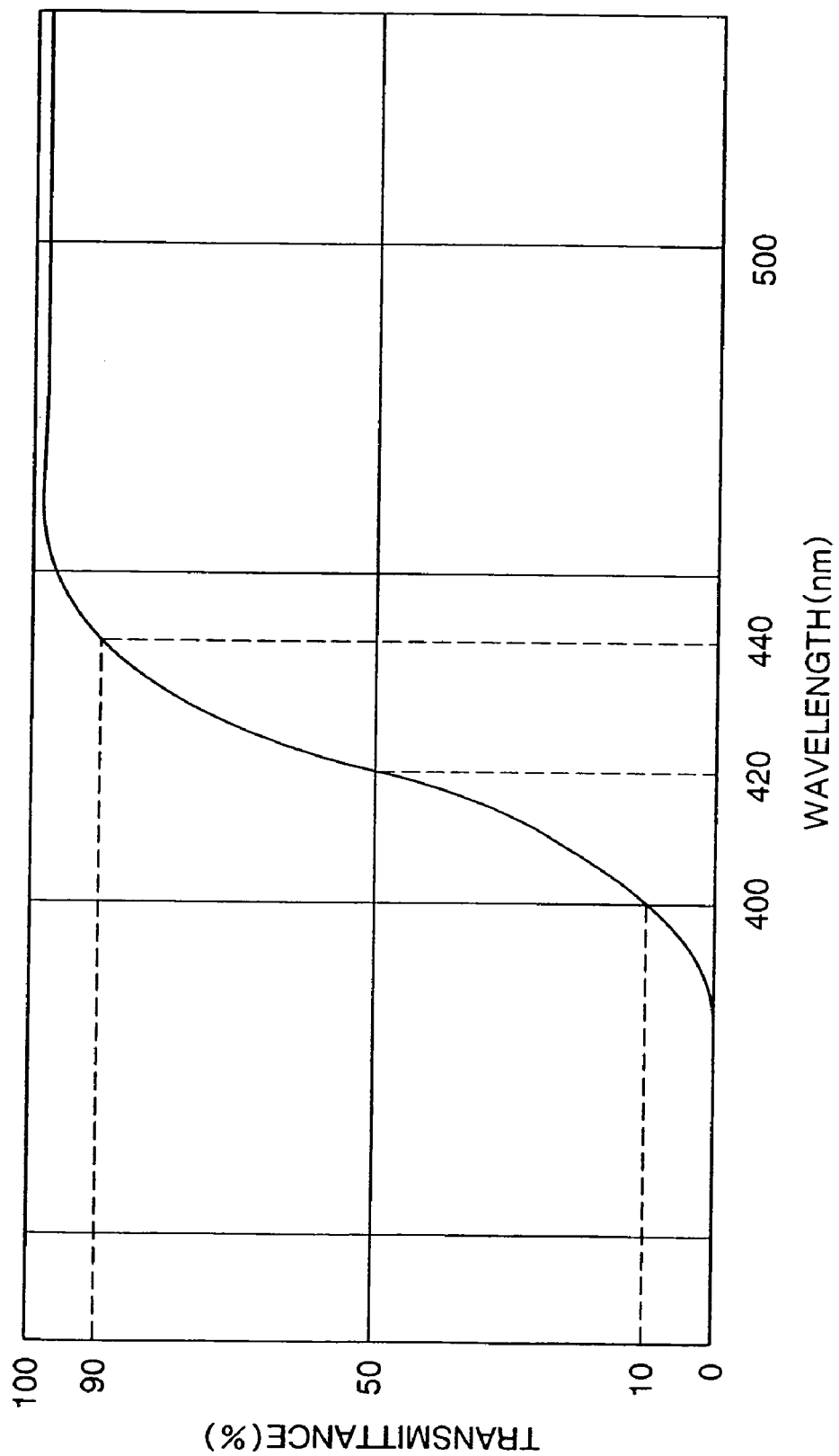
FIG. 22 graphically shows a spectral transmittance of the interference film UVC of the wavelength selecting device SC according to Example 3 of the first embodiment of the present invention, which film UVC is, with respect to short wavelength light, selectively substantially non-transparent.
Figure 23:
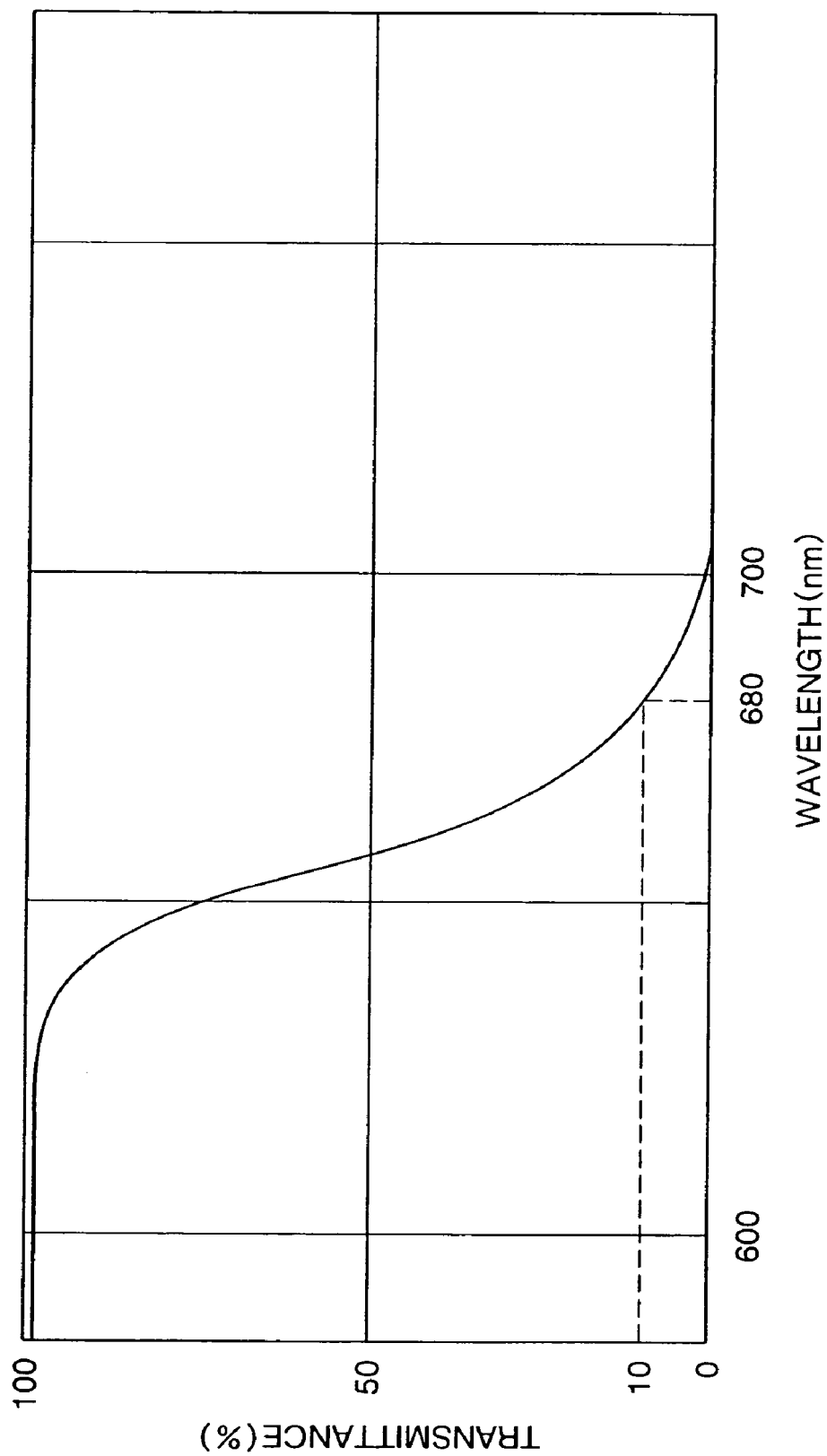
FIG. 23 graphically shows an overall spectral transmittance of the absorption filter IRCF and the interference film IRC which are, with respect to long wavelength light, selectively substantially non-transparent, according to Example 3 of the first embodiment of the present invention.

A spectral transmittance of the interference film UVC which is, with respect to short wavelength light, selectively substantially non-transparent, is shown in FIG. 22. An overall spectral transmittance of the absorption filter IRCF and the interference film IRC which are, with respect to long wavelength light, selectively substantially non-transparent is shown in FIG. 23.

Various values associated with Example 3 are listed in Table 3.

TABLE 3

(Specifications)

| focal length | wide-angle end | telephoto end |
|---|---|---|
| f | 9.17 | 69.07 |
| FNO | 2.9 | 4.4 |
| ω | 31.9 | 4.5 |

(Lens Data)

| surface number | radius of curvature | surface distance | nd | ν |
|---|---|---|---|---|
| 1 | 26.3278 | 1.700 | 1.74001 | 48.16 |
| 2 | 112.4351 | 1.300 | 1.84666 | 23.78 |
| 3 | 46.6040 | 4.100 | 1.78800 | 47.38 |
| 4 | −1133.2893 | 0.100 | | |
| 5 | 33.8557 | 3.150 | 1.49782 | 82.52 |
| 6 | 95.7487 | (D6) | | |
| 7 | 108.3076 | 1.200 | 1.80400 | 46.58 |
| 8 | 10.0068 | 4.300 | | |
| 9 | −29.0221 | 0.900 | 1.72916 | 54.66 |
| 10 | 21.5697 | 1.700 | 1.84666 | 23.78 |
| 11 | 36.0418 | 0.700 | | |
| 12 | 22.2130 | 2.100 | 1.84666 | 23.78 |
| 13 | 133.9390 | (D13) | | |
| 14 | ∞ | 0.500 | Aperture Stop S | |
| 15 | 19.0286 | 3.050 | 1.49782 | 82.52 |
| 16 | −26.3022 | 0.200 | | |
| 17 | 14.4696 | 4.900 | 1.75700 | 47.82 |
| 18 | 43.2842 | 0.750 | | |
| 19 | −27.1397 | 0.900 | 1.68893 | 31.09 |
| 20 | 15.2385 | (D20) | | |
| 21 | 28.7363 | 0.900 | 1.83481 | 42.72 |
| 22 | 10.1303 | 3.850 | 1.51823 | 58.96 |
| 23 | −21.2189 | (D23) | | |
| 24 | 27.6733 | 3.000 | 1.80400 | 46.58 |
| 25 | −78.3460 | 1.000 | 1.84666 | 23.78 |
| 26 | 103.6796 | (D26) | | |
| 27 | ∞ IRC | 2.760 | 1.51633 | 64.22 LPF, IRCF |
| 28 | ∞ UVC | 2.470 | | |
| 29 | ∞ | 0.500 | 1.51633 | 64.22 CG |
| 30 | ∞ | (BF) | | |

(Variable Intervals upon Zooming)

| | W | T |
|---|---|---|
| f | 9.17 | 69.07 |

TABLE 3-continued

| D6 | 1.6978 | 30.9448 |
|---|---|---|
| D13 | 27.1095 | 2.5720 |
| D20 | 6.2411 | 1.4085 |
| D23 | 2.3722 | 24.4561 |
| D26 | 5.5636 | 5.5636 |
| BF | 1.0326 | 1.0328 |

(Values for the conditional expressions)

| | |
|---|---|
| D = 3.83 | W |
| = 3.84 | T |
| P = 3.4 × 10⁻³ | |
| Y = 10.9 | |
| P₀ = −46.5 | W |
| = −136 | T |
| (1) $\lambda_{V50} = 420$ | |
| (3) D/PY = 1.03 × 10² | W |
| 1.04 × 10² | T |
| (4) Y/P₀ = −0.23 | W |
| −0.08 | T |
| (5) $\lambda_{V90} - \lambda_{V10} = 40$ | |
| (6) $\lambda_{R10} = 680$ | |
| (10) $\lambda_{V50}$D/PY = 4.34 × 10⁴ | W |
| 4.35 × 10⁴ | T |

Figure 18:
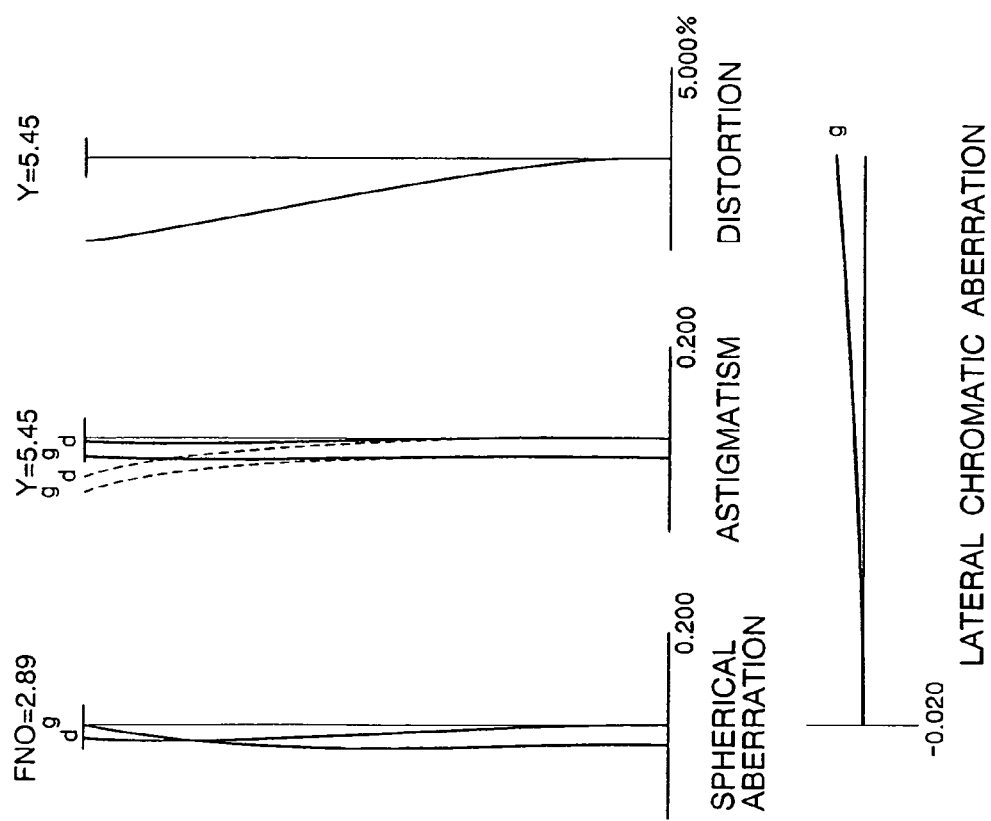
FIG. 18 graphically shows various aberrations of an objective optical system OB in the optical system according to Examples 3 and 4 of the first embodiment in the wide-angle end state W.
Figure 19:
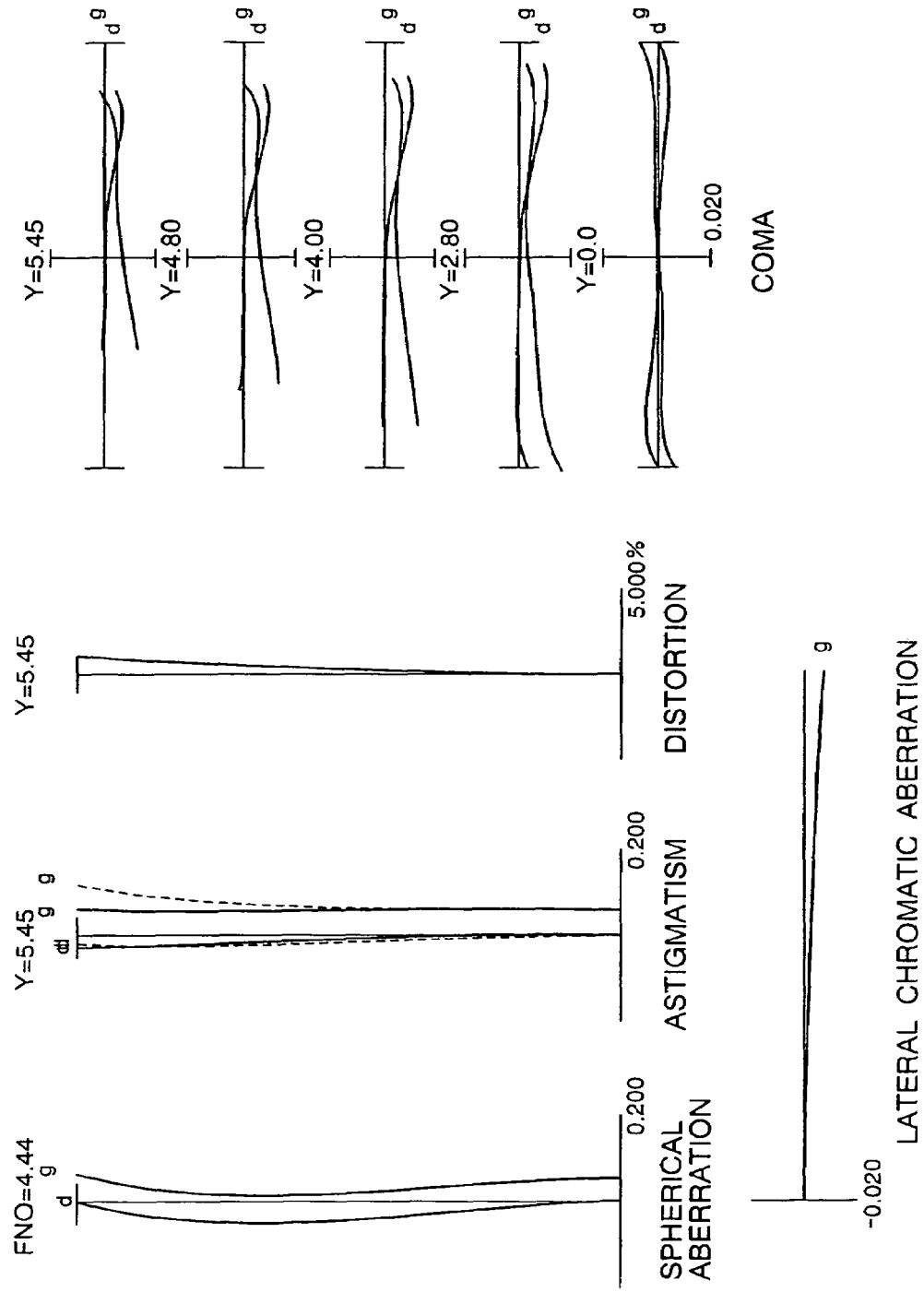
FIG. 19 graphically shows various aberrations of the objective optical system OB in the optical system according to Examples 3 and 4 of the first embodiment in the telephoto end state T.

FIGS. 18 and 19 graphically show various aberrations of an objective optical system OB in the optical system according to Example 3 of the first embodiment in the wide-angle end state W and the telephoto end state T, respectively.

As is apparent from the respective graphs showing various aberrations, the optical system with a wavelength selecting device according to Example 3 shows very small monochromatic aberrations and has high optical performance.

Figure 20:
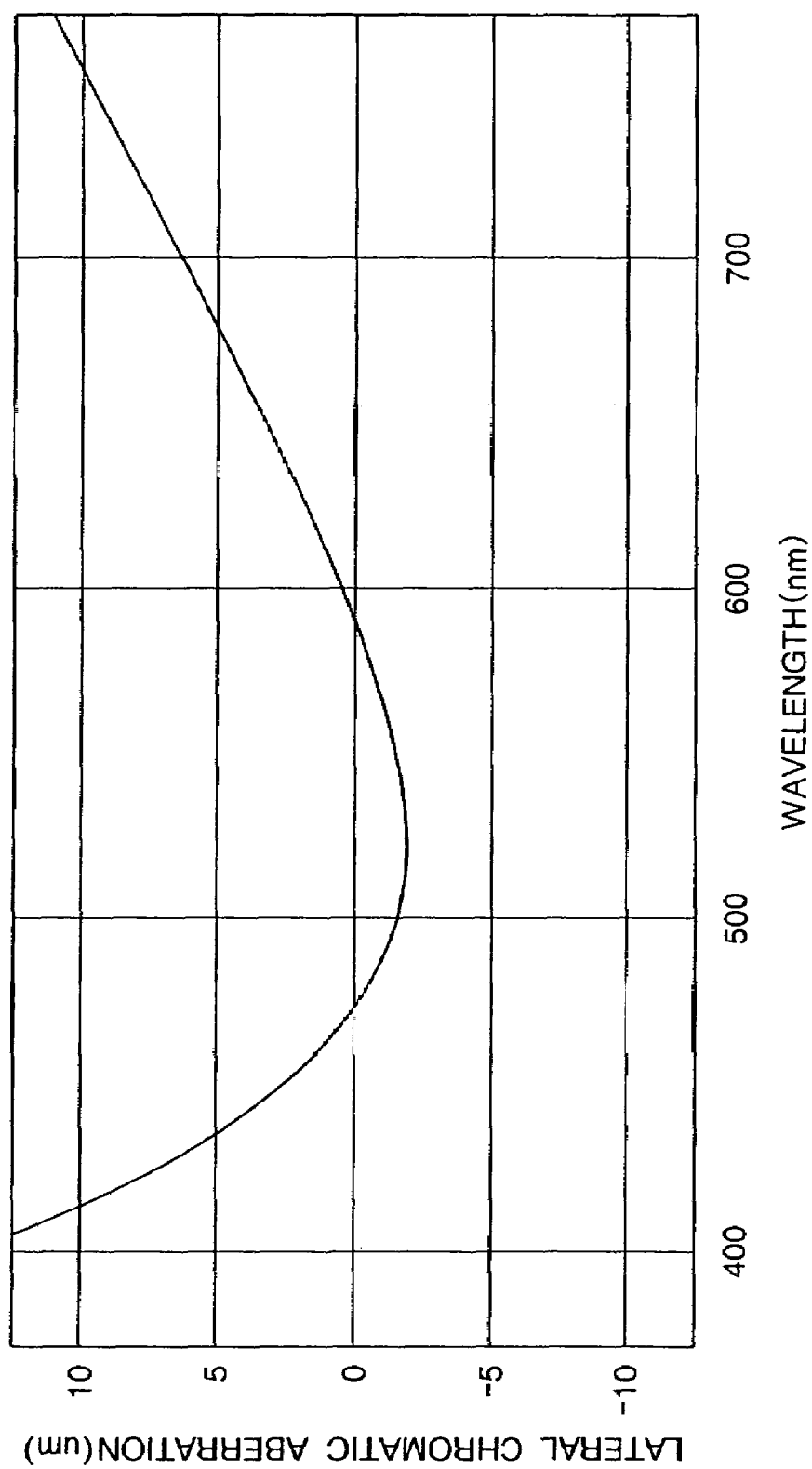
FIG. 20 graphically shows lateral chromatic aberration relative to wavelength at image height of 4 mm in the wide-angle end state W of the optical system according to Examples 3 and 4 of the first embodiment.
Figure 21:
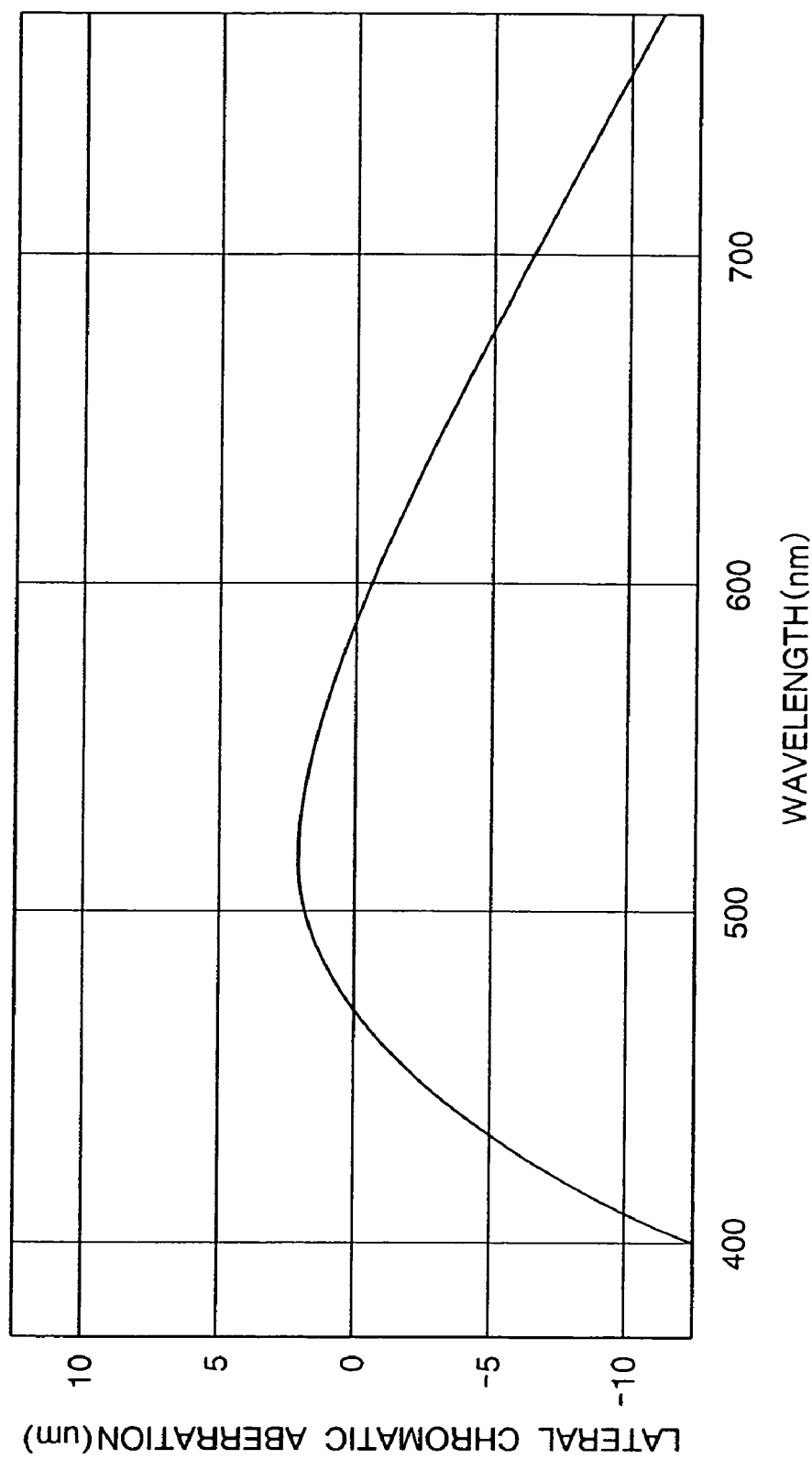
FIG. 21 graphically shows lateral chromatic aberration relative to wavelength at image height of 4 mm in the telephoto end state T of the optical system according to Examples 3 and 4 of the first embodiment.

FIGS. 20 and 21 graphically show lateral chromatic aberration relative to wavelength at image height of 4 mm in the wide-angle end state W and the telephoto end state T, respectively. As shown in respective graphs, although lateral chromatic aberration becomes large in short wavelength side, chromatic aberration component of the wavelength shorter than 420 nm is removed by the wavelength selecting device SC, so that the same effect as lateral chromatic aberration is corrected is finally obtained.

As described above, it is apparent that the optical system with a wavelength selecting device according to Example 3 has high optical performance.

EXAMPLE 4

Figure 24:
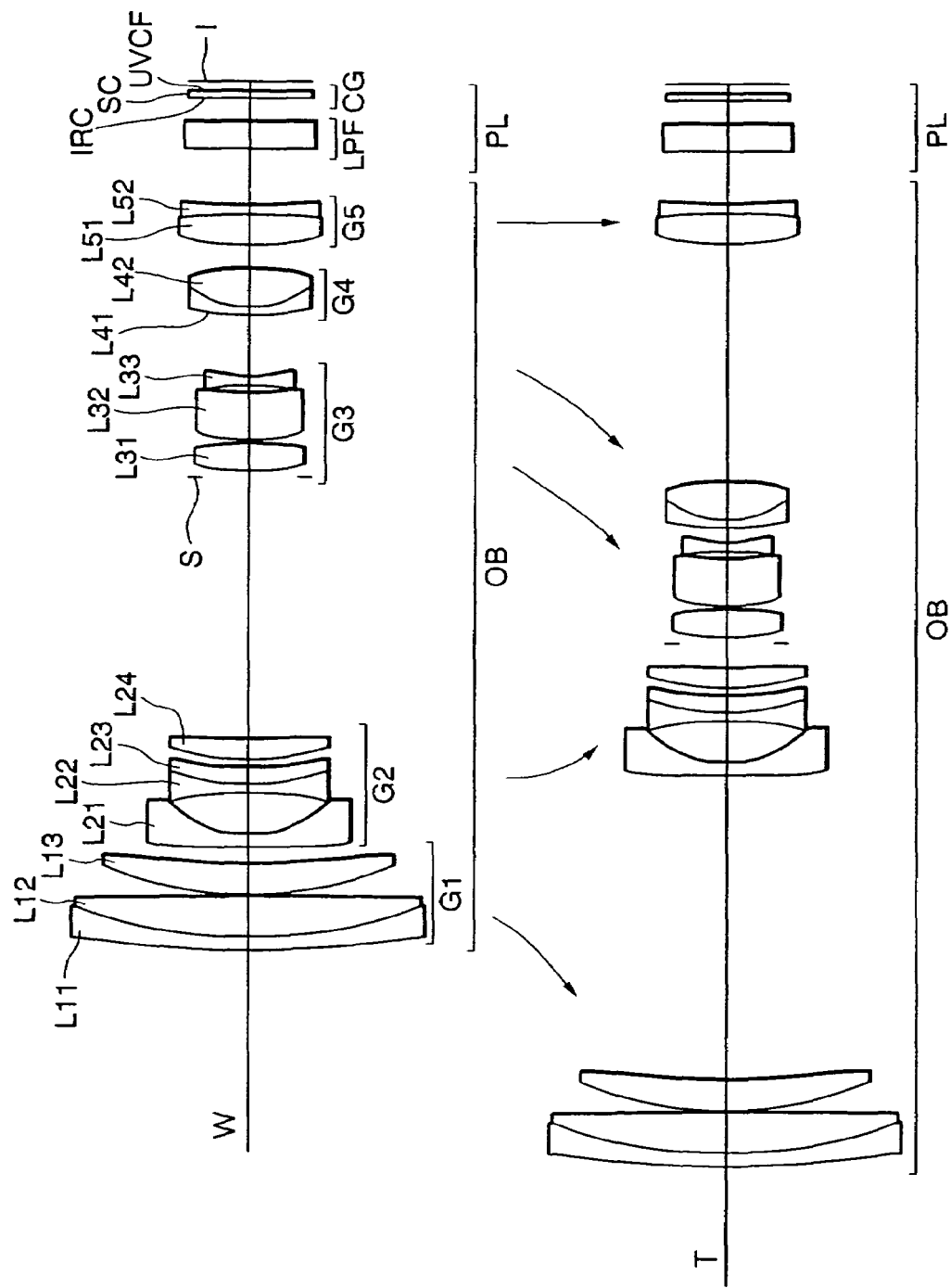
FIG. 24 is a sectional view showing the lens arrangement of an optical system according to Example 4 of the first embodiment of the present invention in a wide-angle end state W and in a telephoto end state T.

FIG. 24 is a sectional view showing the lens arrangement of an optical system according to Example 4 of the first embodiment of the present invention in a wide-angle end state W and in a telephoto end state T.

The optical system with a wavelength selecting device according to Example 4 is composed of, in order from an object side along the optical axis, an objective optical system OB, a no-power optical group PL, and an imaging device I.

The objective optical system OB is composed of, in order from the object along the optical axis, a first lens group G1, a second lens group G2, a third lens group G3 including an aperture stop S, a fourth lens group G4, and a fifth lens group G5.

The objective optical system OB according to Example 4 is the same as that of Example 3, so that a duplicated explanation is abbreviated.

The no-power optical group PL arranged to the image side of the objective optical system OB is composed of, in order from the object, a low-pass filter LPF having a plane-parallel shape with no refractive power, and a cover glass CG for protecting the surface of the imaging device I.

The cover glass CG is constructed integrally with an absorption filter UVCF which is, with respect to short wavelength light, selectively substantially non-transparent, and has a function of the absorption filter UVCF. Moreover, an interference film IRC which is, with respect to long wavelength light, selectively substantially non-transparent is formed on the object side surface of the cover glass CG. The cover glass CG having this construction is the wavelength selecting device SC according to Example 4.

Figure 25:
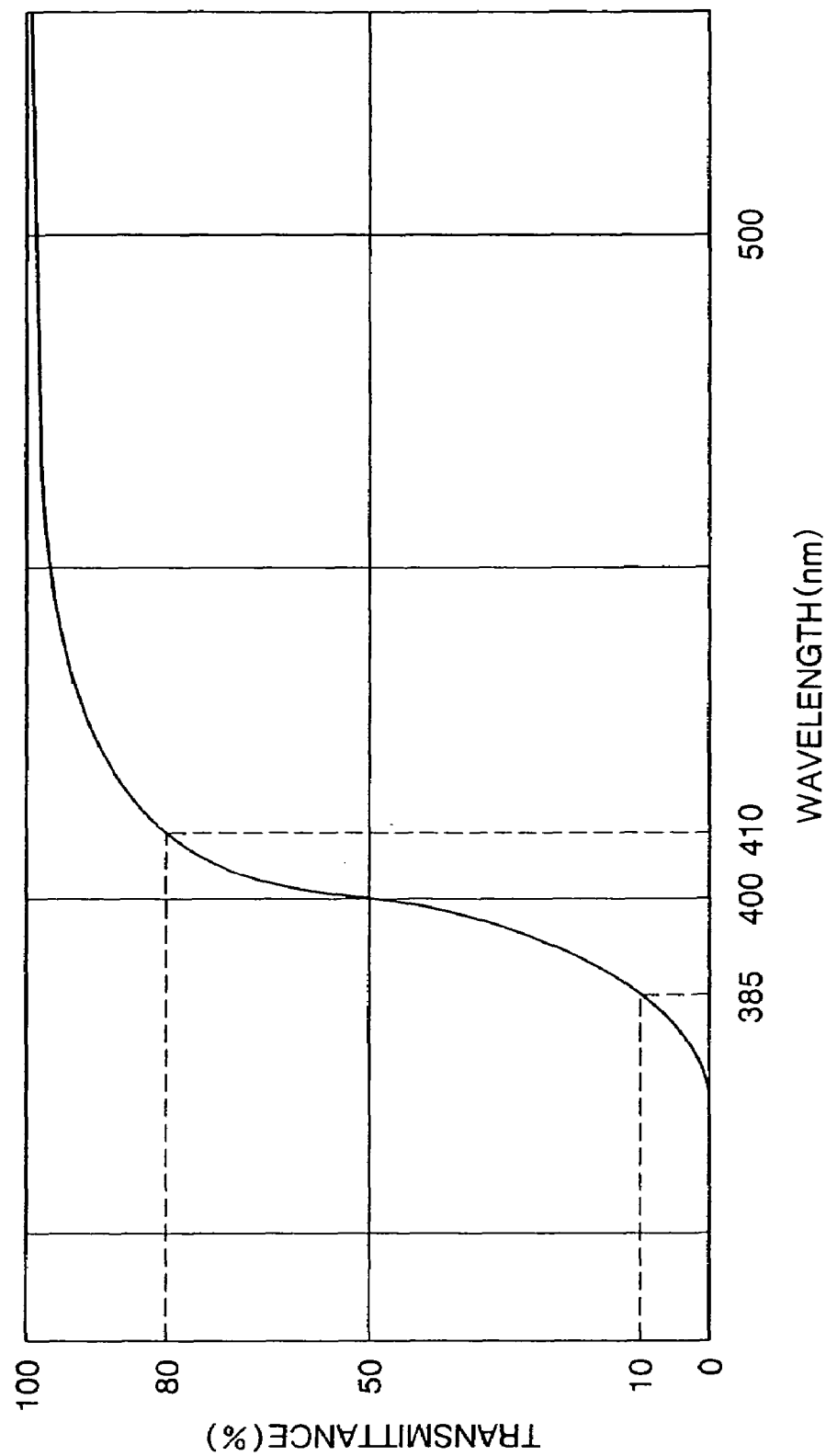
Figure 26:
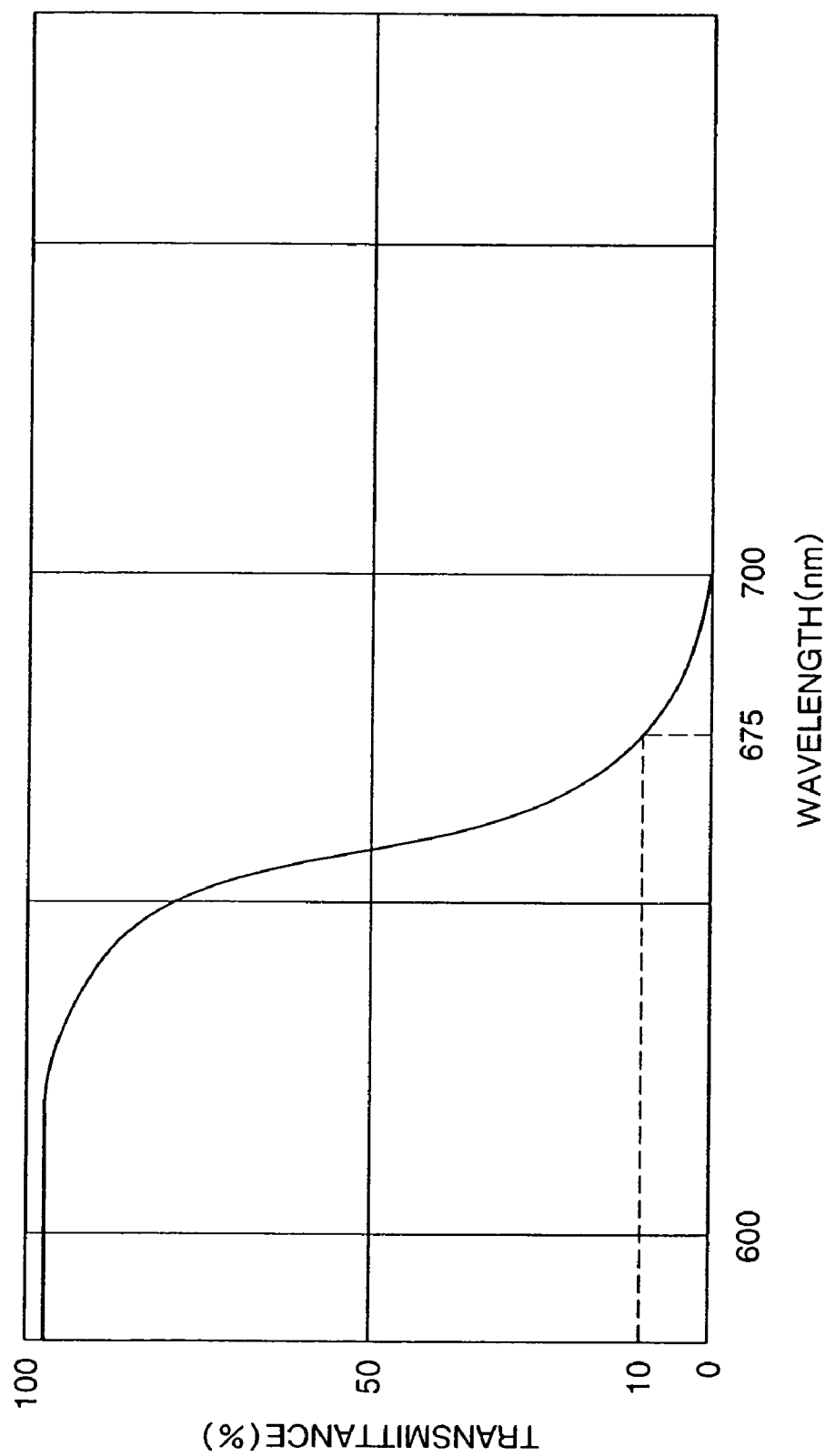
FIG. 26 graphically shows a spectral transmittance of the interference film IRC which is, with respect to long wavelength light, selectively substantially non-transparent, according to Example 4 of the first embodiment of the present invention.

A spectral transmittance of the absorption filter UVCF which is, with respect to short wavelength light, selectively substantially non-transparent is shown in FIG. 25. A spectral transmittance of the interference film IRC which is, with respect to long wavelength light, selectively substantially non-transparent is shown in FIG. 26.

Various values associated with Example 4 are listed in Table 4.

TABLE 4

(Specifications)

| focal length | wide-angle end | telephoto end |
|---|---|---|
| f | 9.17 | 69.07 |
| FNO | 2.9 | 4.4 |
| ω | 31.9 | 4.5 |

(Lens Data)

| surface number | radius of curvature | surface distance | nd | ν |
|---|---|---|---|---|
| 1 | 26.3278 | 1.700 | 1.74001 | 48.16 |
| 2 | 112.4351 | 1.300 | 1.84666 | 23.78 |
| 3 | 46.6040 | 4.100 | 1.78800 | 47.38 |
| 4 | −1133.2893 | 0.100 | | |
| 5 | 33.8557 | 3.150 | 1.49782 | 82.52 |
| 6 | 95.7487 | (D6) | | |
| 7 | 108.3076 | 1.200 | 1.80400 | 46.58 |
| 8 | 10.0068 | 4.300 | | |
| 9 | −29.0221 | 0.900 | 1.72916 | 54.66 |
| 10 | 21.5697 | 1.700 | 1.84666 | 23.78 |
| 11 | 36.0418 | 0.700 | | |
| 12 | 22.2130 | 2.100 | 1.84666 | 23.78 |
| 13 | 133.9390 | (D13) | | |
| 14 | ∞ | 0.500 | Aperture Stop S | |
| 15 | 19.0286 | 3.050 | 1.49782 | 82.52 |
| 16 | −26.3022 | 0.200 | | |
| 17 | 14.4696 | 4.900 | 1.75700 | 47.82 |
| 18 | 43.2842 | 0.750 | | |
| 19 | −27.1397 | 0.900 | 1.68893 | 31.09 |
| 20 | 15.2385 | (D20) | | |
| 21 | 28.7363 | 0.900 | 1.83481 | 42.72 |
| 22 | 10.1303 | 3.850 | 1.51823 | 58.96 |
| 23 | −21.2189 | (D23) | | |
| 24 | 27.6733 | 3.000 | 1.80400 | 46.58 |
| 25 | −78.3460 | 1.000 | 1.84666 | 23.78 |
| 26 | 103.6796 | (D26) | | |
| 27 | ∞ | 2.760 | 1.51633 | 64.22 LPF |
| 28 | ∞ | 2.470 | | |
| 29 | ∞ (IRC) | 0.500 | 1.51633 | 64.22 CG, UVCF |
| 30 | ∞ | (BF) | | |

(Variable Intervals upon Zooming)

| | W | T |
|---|---|---|
| f | 9.17 | 69.07 |
| D6 | 1.6978 | 30.9448 |
| D13 | 27.1095 | 2.5720 |
| D20 | 6.2411 | 1.4085 |
| D23 | 2.3722 | 24.4561 |
| D26 | 5.5636 | 5.5636 |
| BF | 1.0326 | 1.0328 |

TABLE 4-continued (Values for the conditional expressions)

| D = 3.83 | W |
| = 3.84 | T |
| P = 3.4 × 10$^{-3}$ | |
| Y = 10.9 | |
| P$_0$ = −46.5 | W |
| = −136 | T |
| (1) λ$_{V50}$ = 400 | |
| (2) λ$_{V80}$ − λ$_{V10}$ = 25 | |
| (6) λ$_{R10}$ = 675 | |

FIGS. 18 and 19 graphically show various aberrations of an objective optical system OB in the optical system according to Example 4 of the first embodiment in the wide-angle end state W and the telephoto end state T, respectively. Since Example 4 uses the same objective optical system OB as Example 3, various aberrations are the same as that of Example 3.

As is apparent from the respective graphs showing various aberrations, the optical system with a wavelength selecting device according to Example 4 shows very small monochromatic aberrations and has high optical performance.

FIGS. 20 and 21 graphically show lateral chromatic aberration relative to wavelength at image height of 4 mm in the wide-angle end state W and the telephoto end state T, respectively. Since Example 4 uses the same objective optical system OB as Example 3, lateral chromatic aberration is the same as that of Example 3. As shown in respective graphs, although lateral chromatic aberration becomes large in short wavelength side, chromatic aberration component of the wavelength shorter than 400 nm is removed by the wavelength selecting device SC, so that the same effect as lateral chromatic aberration is corrected is finally obtained. It is possible that the above-described low-pass filter LPF also has a function of the cover glass CG.

As described above, it is apparent that the optical system with a wavelength selecting device according to Example 4 has high optical performance.

EXAMPLE 5

Figure 27:
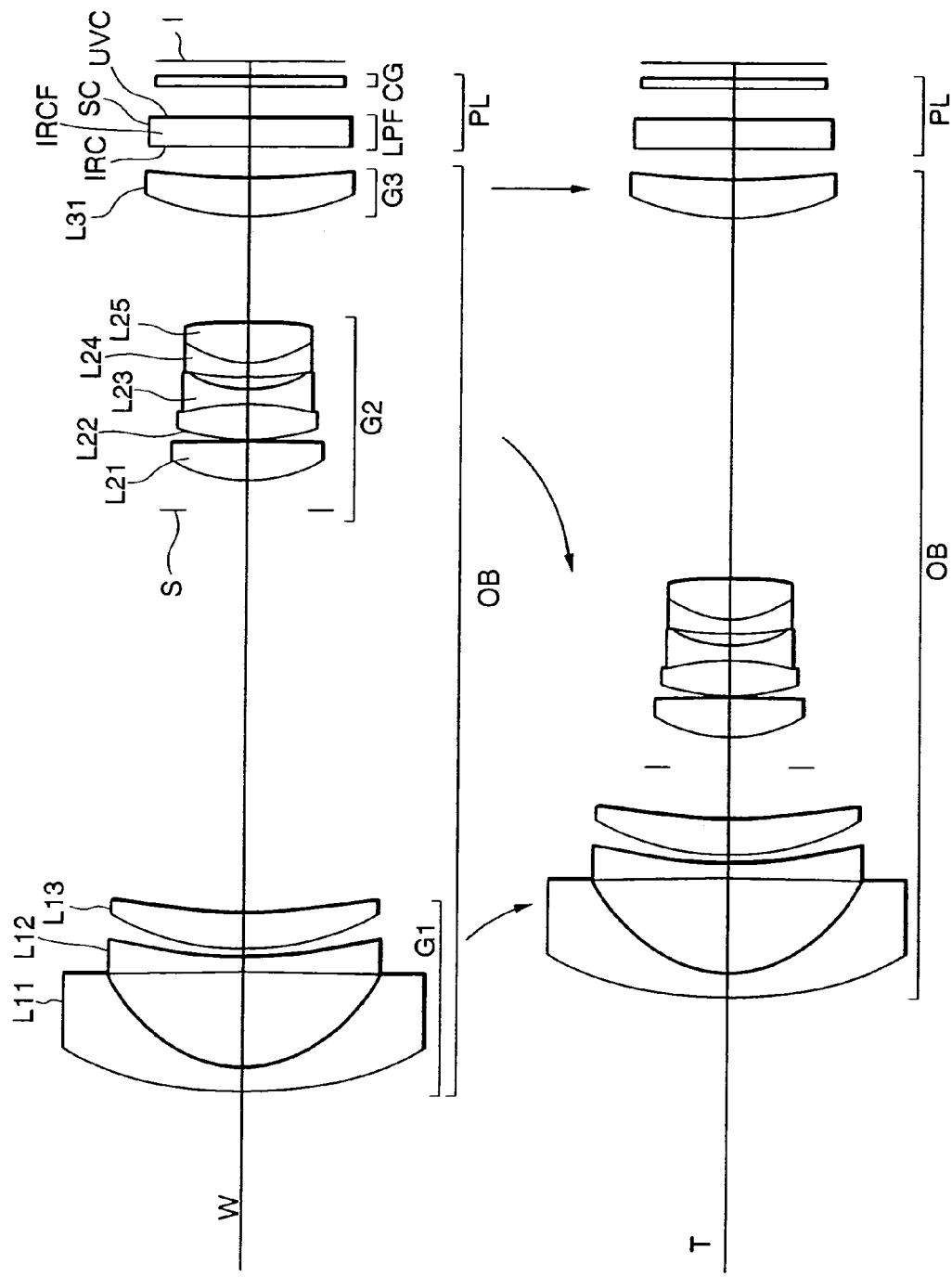
FIG. 27 is a sectional view showing the lens arrangement of an optical system according to Example 5 of the first embodiment of the present invention in a wide-angle end state W and in a telephoto end state T.

FIG. 27 is a sectional view showing the lens arrangement of an optical system according to Example 5 of the first embodiment of the present invention in a wide-angle end state W and a telephoto end state T.

The optical system with a wavelength selecting device according to Example 5 is composed of, in order from an object side along the optical axis, an objective optical system OB, a no-power optical group PL, and an imaging device I.

The objective optical system OB is composed, in order from the object along the optical axis, a first lens group G1, a second lens group G2 including an aperture stop S, and a third lens group G3.

The first lens group G1 having negative refractive power as a whole is composed of, in order from the object, a negative meniscus lens L11 having a convex surface facing to the object and an aspherical surface facing to an image, a double concave negative lens L12 having a stronger concave surface facing to the image, and a positive meniscus lens L13 having a convex surface facing to the object.

The second lens group G2 having positive refractive power as a whole is composed of, in order from object, an aperture stop S, a double convex positive lens L21 having a stronger convex surface facing to the object which is an aspherical surface, a cemented negative lens constructed by a double convex positive lens L22 cemented with a double concave negative lens L23, and a cemented positive lens constructed by a negative meniscus lens L24 having a convex surface facing to the object cemented with a double convex positive lens L25.

The third lens group G3 being the most image side optical element of the objective optical system OB having positive refractive power as a whole is composed of a positive meniscus lens L31 having a convex surface facing to the object which is an aspherical surface.

When the state of lens group positions varies from a wide-angle end state W to a telephoto end state T, the distance between the first lens group G1 and the second lens group G2 decreases and the third lens group G3 is substantially fixed relative to the image plane.

The no-power optical group PL arranged to the image side of the objective optical system OB is composed of, in order from the object, a low-pass filter LPF having a plane-parallel shape with no refractive power, and a cover glass CG for protecting the surface of the imaging device I.

The low-pass filter LPF is constructed integrally with an absorption filter IRCF which is, with respect to long wavelength light, selectively substantially non-transparent, and has a function of the absorption filter IRCF. Moreover, an interference film IRC which is, with respect to long wavelength light, selectively substantially non-transparent is formed on the object side surface of the low-pass filter LPF, and an interference film UVC which is, with respect to short wavelength light, selectively substantially non-transparent is formed on the image side surface of the low-pass filter LPF. The low-pass filter LPF having such a construction is the wavelength selecting device SC according to Example 5.

Figure 32:
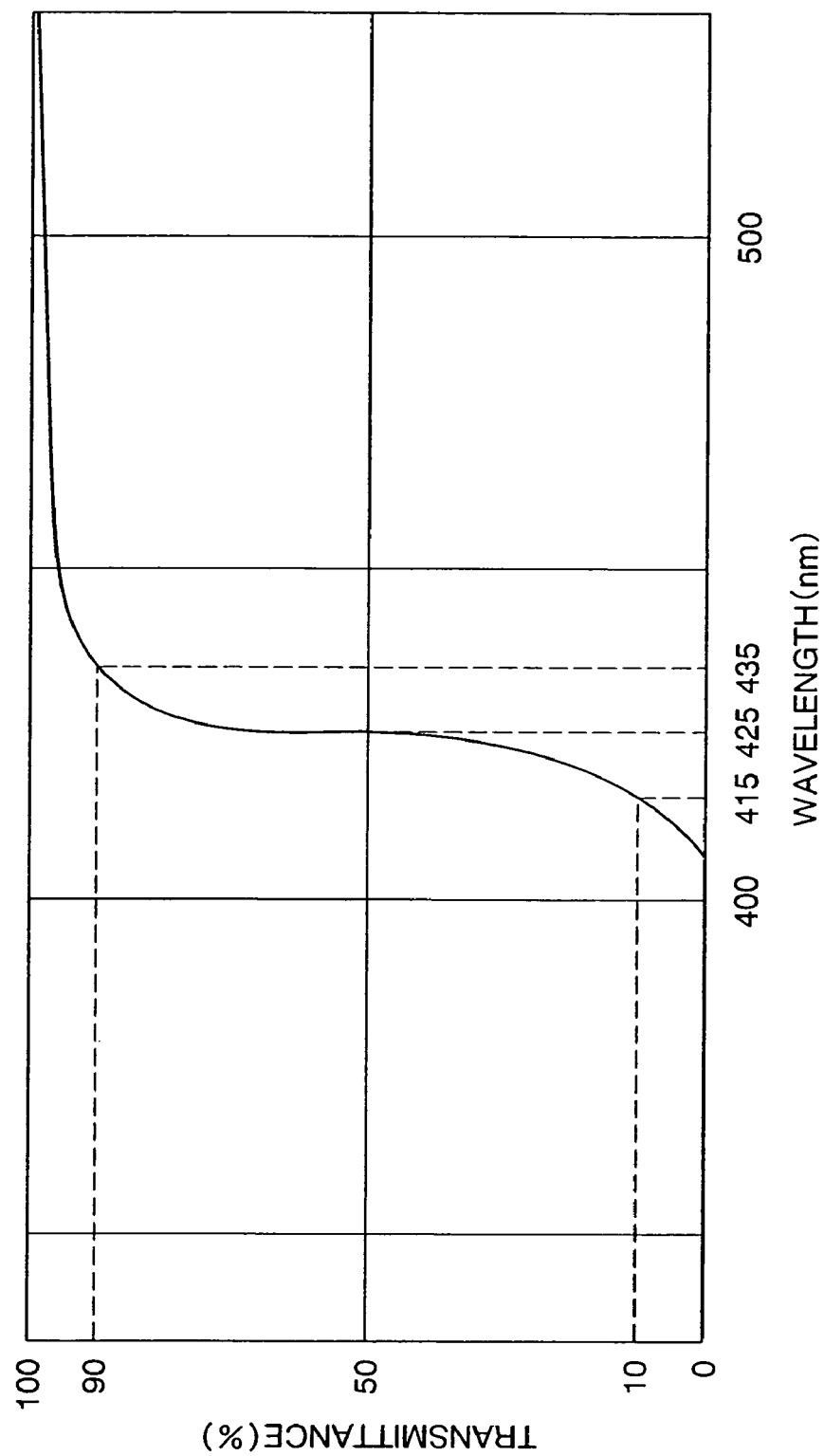
FIG. 32 graphically shows a spectral transmittance of the interference film UVC of the wavelength selecting device SC which is, with respect to short wavelength light, selectively substantially non-transparent, according to Example 5 of the first embodiment of the present invention.
Figure 33:
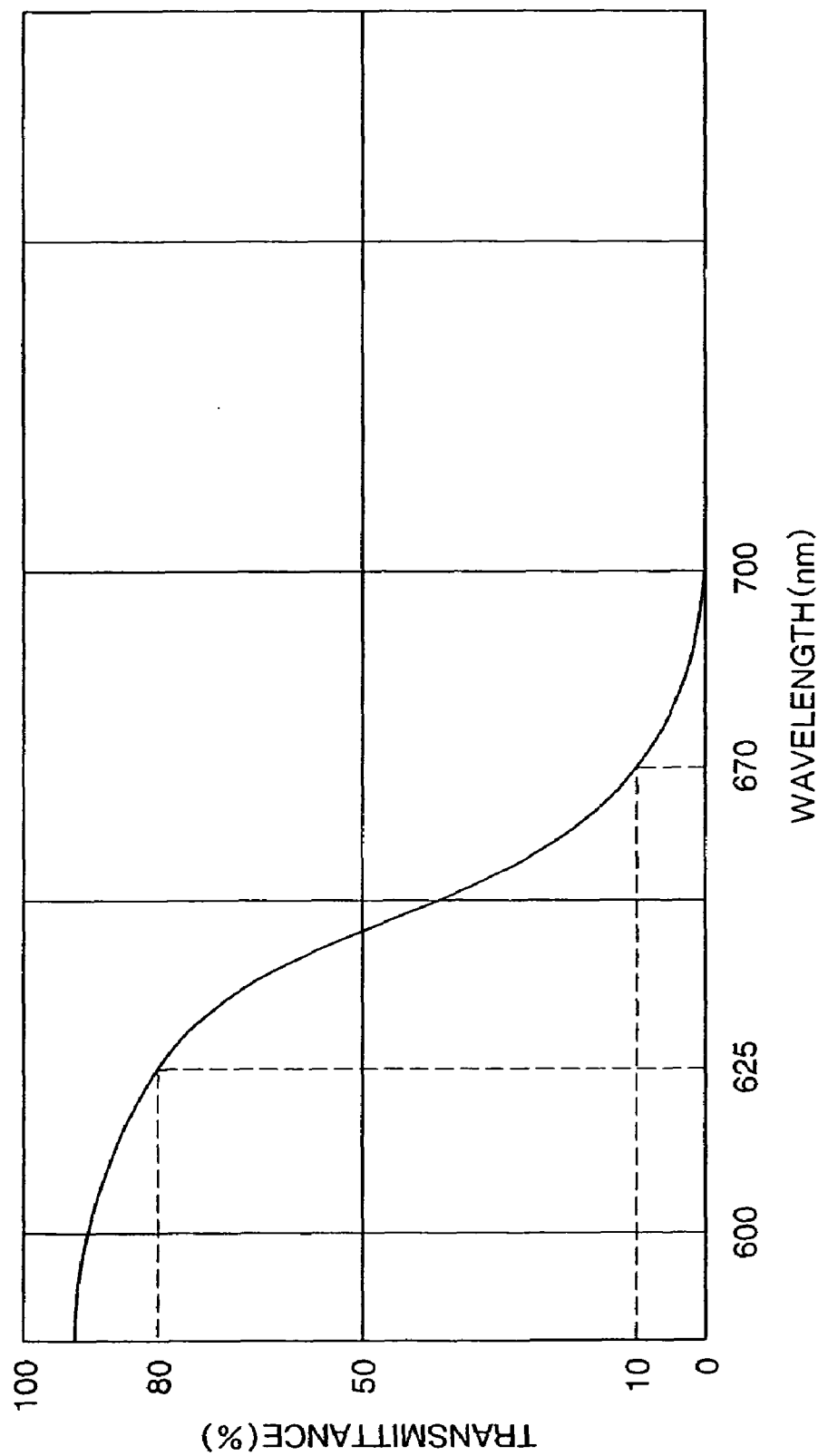
FIG. 33 graphically shows an overall spectral transmittance of the absorption filter IRCF and the interference film IRC which are, with respect to long wavelength light, selectively substantially non-transparent, according to Example 5 of the first embodiment of the present invention.

A spectral transmittance of the interference film UVC which is, with respect to short wavelength light, selectively substantially non-transparent is shown in FIG. 32. An overall spectral transmittance of the absorption filter IRCF and the interference film IRC which are, with respect to long wavelength light, selectively substantially non-transparent is shown in FIG. 33.

Various values associated with Example 5 are listed in Table 5.

TABLE 5

(Specifications)

| focal length | wide-angle end | telephoto end |
|---|---|---|
| f | 7.40 | 21.30 |
| FNO | 2.8 | 4.7 |
| ω | 37.4 | 14.4 |

(Lens Data)

| surface number | radius of curvature | surface distance | nd | ν |
|---|---|---|---|---|
| 1 | 26.0783 | 1.500 | 1.74014 | 49.18 |
| 2 | 7.6961 | 5.800 | | |
| 3 | −155.8785 | 0.900 | 1.58913 | 61.18 |
| 4 | 31.7824 | 0.550 | | |
| 5 | 16.8801 | 2.200 | 1.80518 | 25.43 |
| 6 | 44.0584 | (D6) | | |
| 7 | ∞ | 1.900 | Aperture Stop S | |
| 8 | 8.8511 | 2.450 | 1.69350 | 53.22 |
| 9 | −166.6376 | 0.100 | | |
| 10 | 13.4713 | 2.300 | 1.71300 | 53.85 |
| 11 | −13.4713 | 0.900 | 1.80440 | 39.59 |
| 12 | 6.8062 | 0.800 | | |
| 13 | 22.1392 | 0.900 | 1.83400 | 37.17 |

TABLE 5-continued

| 14 | 6.5885 | 2.450 | 1.60311 | 60.68 | |
| 15 | −34.6543 | (D15) | | | |
| 16 | 17.0899 | 2.400 | 1.58313 | 59.62 | |
| 17 | 46.4912 | 1.800 | | | |
| 18 | ∞ IRC | 1.800 | 1.45850 | 67.85 | LPF, IRCF |
| 19 | ∞ UVC | 2.100 | | | |
| 20 | ∞ | 0.500 | 1.51680 | 64.20 | CG |
| 21 | ∞ | (BF) | | | |

(Aspherical Data)

Surface Number 2

κ = 0.1000
C4 = +1.27310E−04
C6 = +1.34320E−06
C8 = −7.35590E−09
C10 = +1.30540E−10

Surface Number 8

κ = 1.0000
C4 = −1.13270E−04
C6 = −1.12000E−06
C8 = +1.65790E−08
C10 = −7.00210E−10

Surface Number 16

κ = 1.0000
C4 = −2.52820E−05
C6 = +1.92860E−06
C8 = −4.85170E−08
C10 = +5.50360E−10

(Variable Intervals upon Zooming)

| | W | T |
|---|---|---|
| f | 7.40 | 21.30 |
| D6 | 25.0716 | 3.0000 |
| D15 | 6.7504 | 22.6956 |
| BF | 1.0264 | 1.0188 |

(Values for the conditional expressions)

Figure 28:
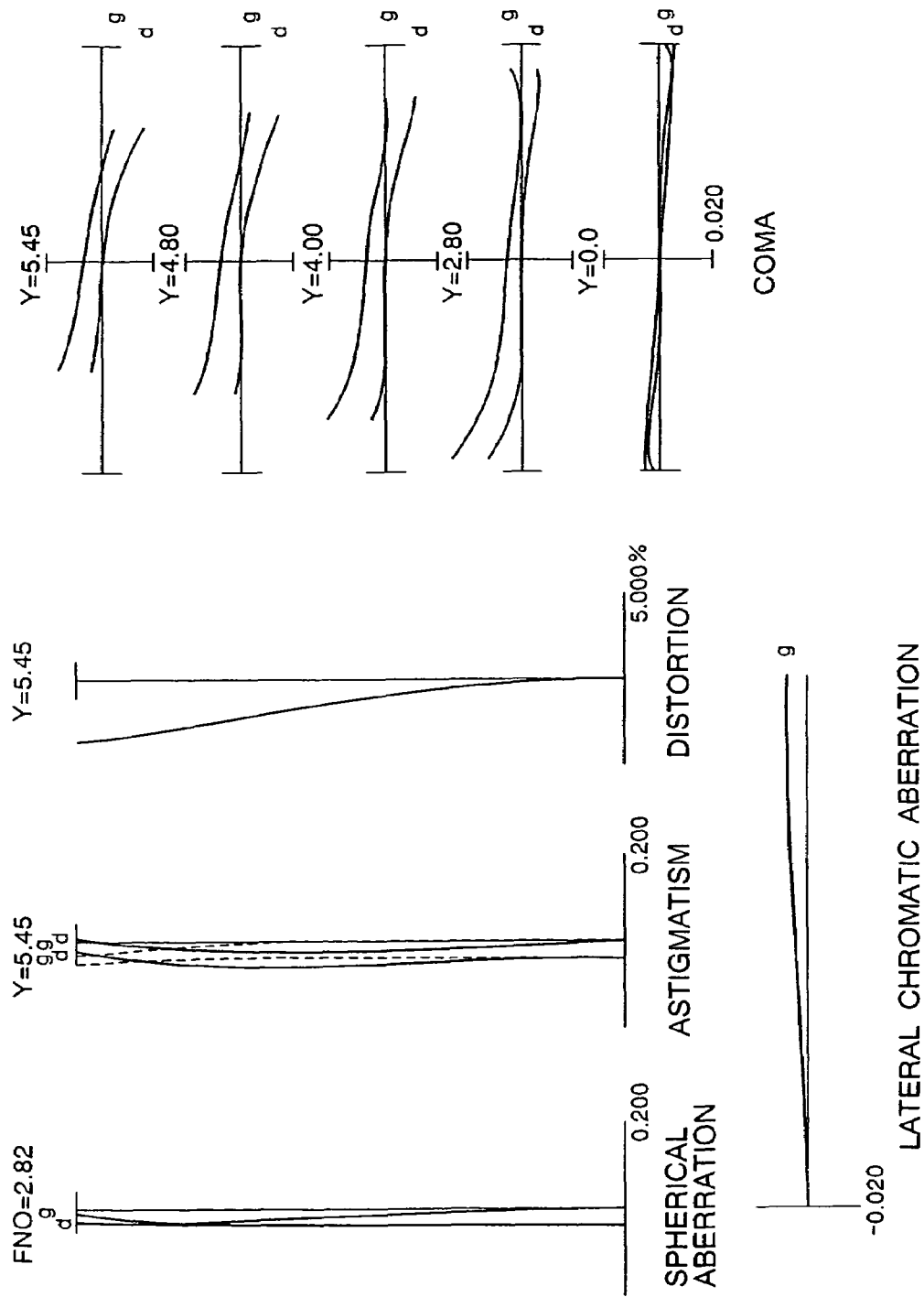
FIG. 28 graphically shows various aberrations of an objective optical system OB in the optical system according to Example 5 of the first embodiment in the wide-angle end state W.
Figure 29:
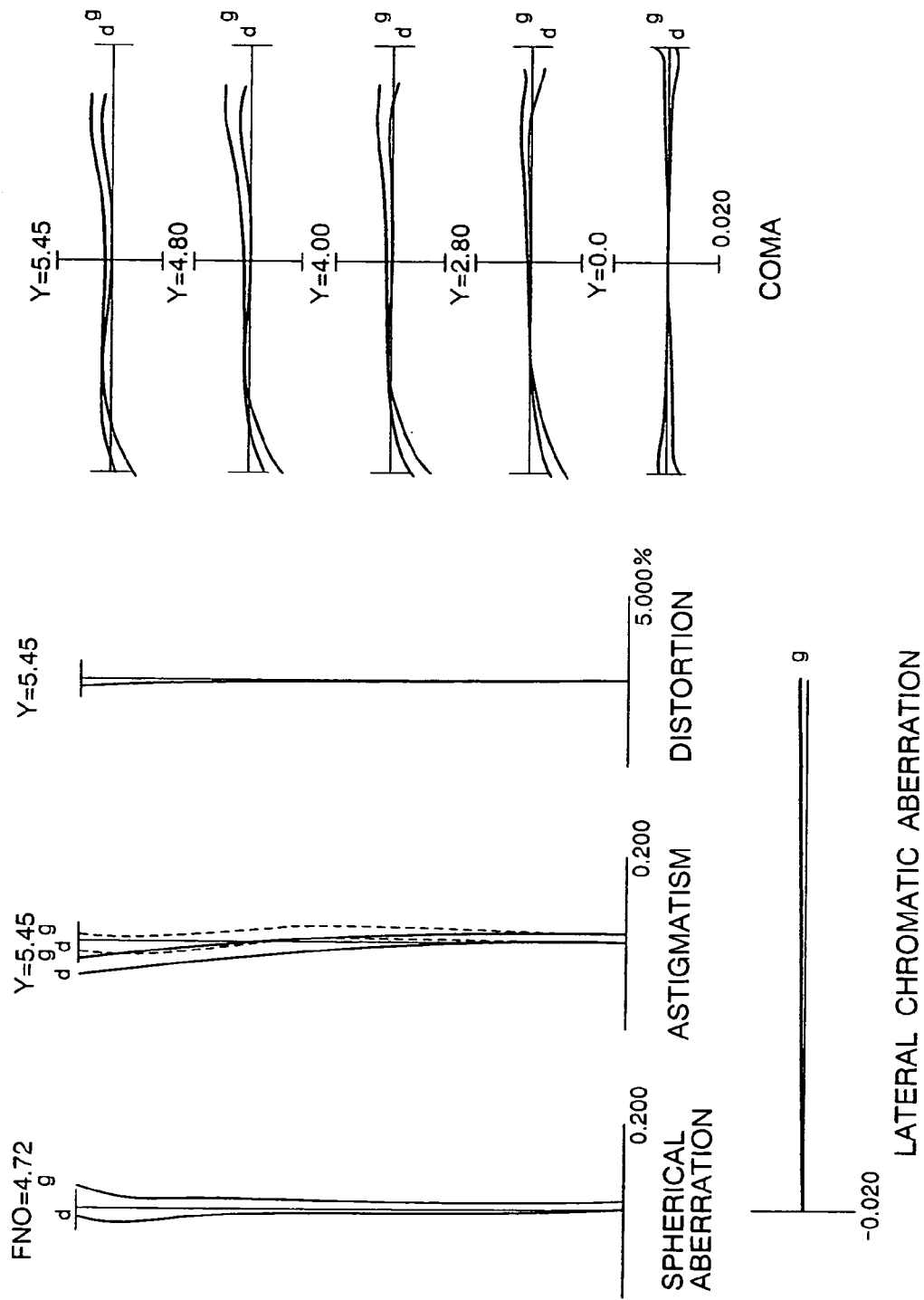
FIG. 29 graphically shows various aberrations of the objective optical system OB in the optical system according to Example 5 of the first embodiment in the telephoto end state T.

D = 3.46　　　　　W
　= 3.45　　　　　T
P = 3.4 × 10$^{-3}$
Y = 10.9
P$_0$ = −21.8　　　W
　= −85.0　　　　T
(1) $\lambda_{V50}$ = 425
(3) D/PY = 9.34 × 10$^1$　　W
　9.31 × 10$^1$　　　　　　T
(4) Y/P$_0$ = −0.50　　　　W
　= −0.12　　　　　　　　T
(5) $\lambda_{V90}$ − $\lambda_{V10}$ = 20
(6) $\lambda_{R10}$ = 670
(7) $\lambda_{R10}$ − $\lambda_{R80}$ = 45
(8) D$_L$/Y = 0.165
(9) D$_L$ = 1.80
(10) $\lambda_{V50}$D/PY = 3.97 × 10$^4$　　W
　3.96 × 10$^4$　　　　　　　　　T FIGS. 28 and 29 graphically show various aberrations of an objective optical system OB in the optical system according to Example 5 of the first embodiment in the wide-angle end state W and the telephoto end state T, respectively.

As is apparent from the respective graphs showing various aberrations, the optical system with a wavelength selecting device according to Example 5 shows very small monochromatic aberrations and has high optical performance.

Figure 30:
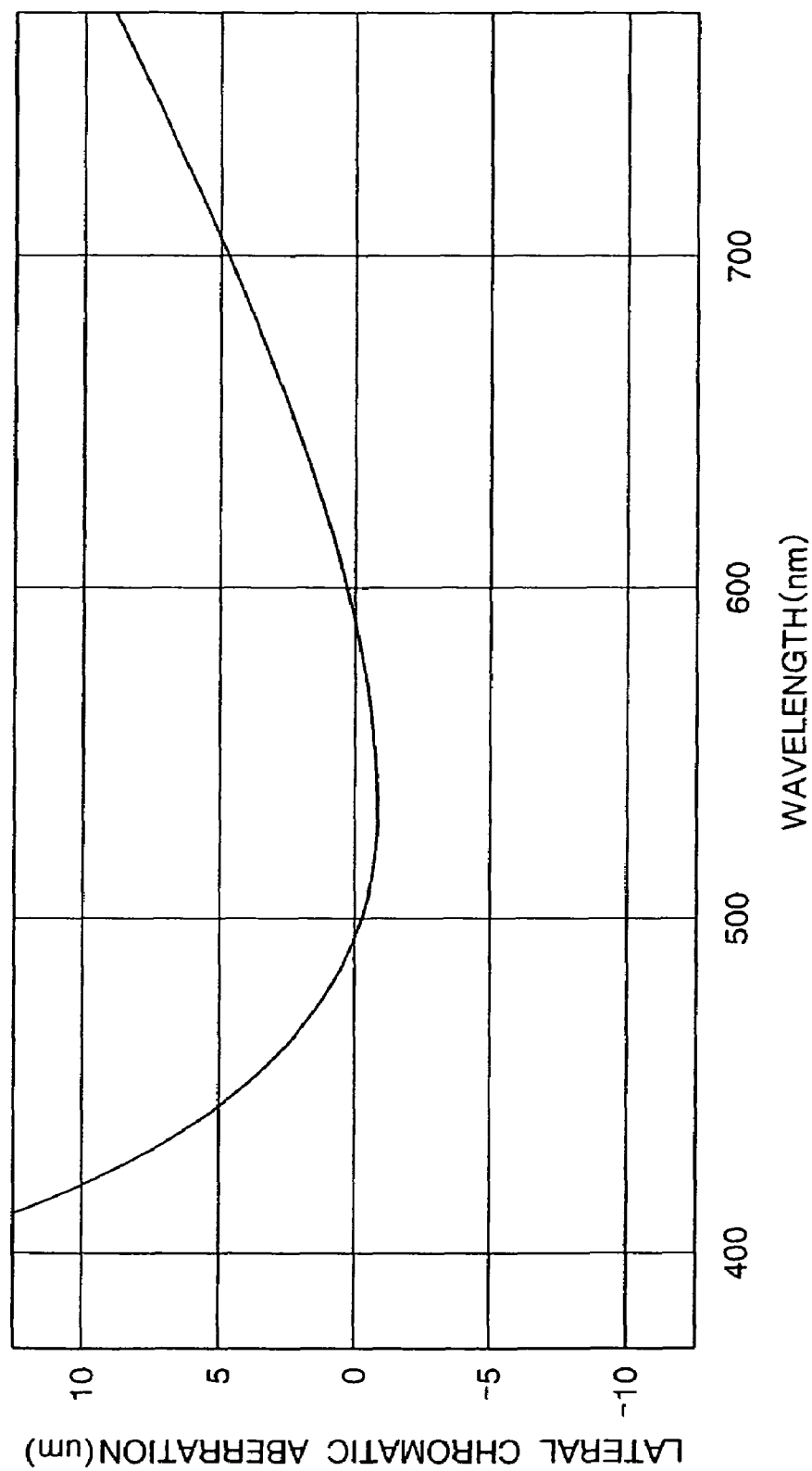
FIG. 30 graphically shows lateral chromatic aberration relative to wavelength at image height of 4 mm in the wide-angle end state W of the optical system according to Example 5 of the first embodiment.
Figure 31:
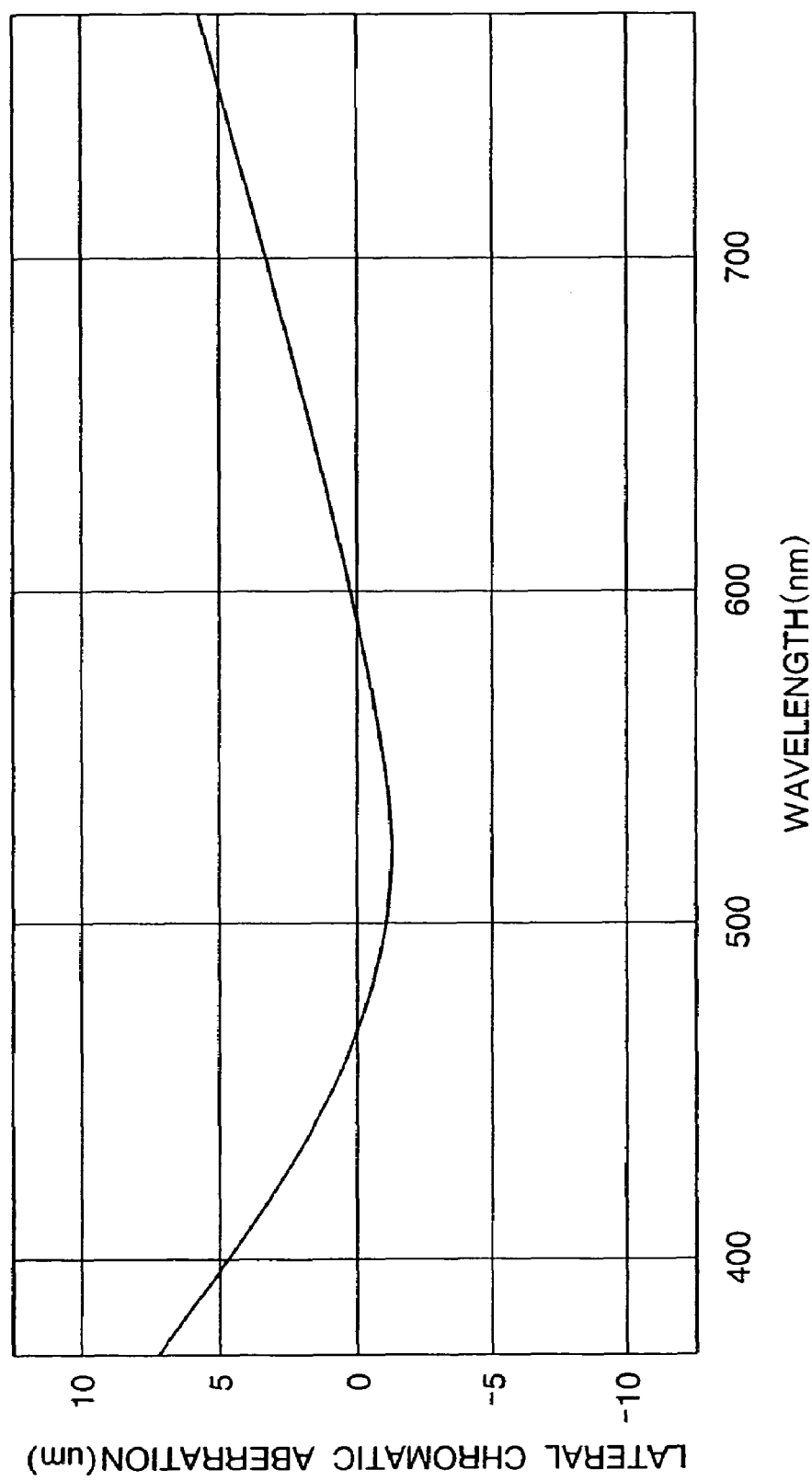
FIG. 31 graphically shows lateral chromatic aberration relative to wavelength at image height of 4 mm in the telephoto end state T of the optical system according to Example 5 of the first embodiment.

FIGS. 30 and 31 graphically show lateral chromatic aberration relative to wavelength at image height of 4 mm in the wide-angle end state W and the telephoto end state T, respectively. As shown in respective graphs, although lateral chromatic aberration becomes large in short wavelength side, chromatic aberration component of the wavelength shorter than 425 nm is removed by the wavelength selecting device SC, so that the same effect as lateral chromatic aberration is corrected is finally obtained. It is possible that the above-described low-pass filter LPF also has a function of the cover glass CG.

As described above, it is apparent that the optical system with a wavelength selecting device according to Example 5 has high optical performance.

Second Embodiment

Then, a second embodiment of the present invention is explained with reference to the accompanying drawings. An optical system according to the second embodiment of the present invention includes a plurality of lens elements and an optical member having wavelength selecting characteristic. The optical member is composed of an interference film formed on a lens surface of the lens elements and the conditional expressions explained below are satisfied.

The optical member having wavelength selecting characteristic is constructed, for example, by forming a plurality of layers by means of evaporation such as an anti-reflection multi-layer film. Various spectral characteristics can be given to the optical member (hereinafter called an interference filter) by adjusting interference condition with changing materials, construction, and a thickness of each layer.

As described above, since the interference filter is constructed by thin films, the thickness can be very thin relative to a conventional colored filter, so that the interference filter can be included in the optical system without making the optical system large. Moreover, since the interference film can be formed, instead of an anti-reflection film, on a lens surface where the anti-reflection film was formed, it is advantageous in costs.

However, since the interference film obtains its spectral characteristic by interference due to thin films, theoretically, variation in interference characteristic inevitably occurs whether the incident light is normal or oblique to the interference filter. Accordingly, the position where the interference film can be formed on the surface of the optical system is not arbitrary. In the optical system according to the second embodiment of the present invention, the following conditional expressions (11) through (13) are for finding a surface on which the interference film can be formed.

Conditional expression (11) defines an appropriate range of the ratio of the effective diameter $\Phi$ on which an interference filter is formed to its radius of curvature R:

$$0 < |\Phi/R| < 0.8 \tag{11}$$

where $\Phi$ denotes the effective diameter of the lens surface, and R denotes the radius of curvature of the lens surface.

Since the interference filter is constructed by forming thin films on the lens surface by means of evaporation, when the radius of curvature of the lens surface is small, the inclination of the lens surface becomes large on the periphery, so that the interference characteristic varies between the central portion and the periphery of the lens surface. When the ratio $|\Phi/R|$ exceeds the upper limit of conditional expression (11), the difference in the interference characteristic between the central portion and the periphery of the lens surface becomes conspicuous, so that it is undesirable. Moreover, in order to make the difference in the interference characteristic between the central portion and the periphery of the lens surface inconspicuous, it is preferable for the ratio to be near to the lower limit. Furthermore, it is preferable that the upper limit is set to 0.6.

Conditional expression (12) defines an appropriate range of an angle of the principal ray passing through the lens surface relative to the optical axis at the lens surface in the air side.

$$0° \leq |B| < 13° \tag{12}$$

where B denotes an angle of the principal ray passing through the lens surface relative to the optical axis at the lens surface in the air side.

When the value |B| exceeds the upper limit of the conditional expression (12), a small difference in the interference characteristic between the light coming to the central portion of an image frame passing through normal to the lens surface and the light coming to the periphery of the image frame passing through oblique to the lens surface results in unevenness of the effect of the interference filter and the tone of color, so that it is undesirable. Moreover, in the conditional expression (12), it is desirable that the value is near to the lower limit since the difference in the interference characteristic becomes smaller. Furthermore, it is preferable that the upper limit is set to 10°.

Conditional expression (13) defines an appropriate range of an angle of the rand ray relative to the optical axis at the lens surface in the air side.

$$0° \leq |C| < 18° \tag{13}$$

where C denotes an angle of the rand ray relative to the optical axis at the lens surface in the air side, and where the rand ray is a ray coming out from an on-axis object passing on the periphery of the aperture stop to form an image.

When the value |C| exceeds the upper limit of the conditional expression (13), the effect of the interference filter differs delicately between the rand ray passing through oblique to the lens surface and the on-axis ray passing through normal to the lens surface, so that the effect of the interference filter and the tone of color vary when changing the diameter of the aperture stop. It is undesirable.

Then, the spectral characteristics of the interference filter according to the second embodiment of the present invention is explained.

When an interference filter having an infrared-cut characteristic is formed by forming an interference film on a lens surface of an optical system by means of evaporation, it is desirable that the interference filter according to the second embodiment of the present invention has the following spectral characteristics: transmittance of light having the wavelength from 400 nm to 600 nm is 95% or more; that from 700 nm to 1000 nm (infrared) is 5% or less; and the half value wavelength of light which gives transmittance of 50% is from 630 nm to 670 nm. When transmittance of visible light having wavelength from 400 nm to 600 nm is low, ghost images and flare on the surface of the interference film are liable to be produced severely. When transmittance of visible light is uneven, color reproduction becomes worse. On the other hand, when transmittance of light having the wavelength from 700 nm to 1000 nm is high, the infrared-cut effect becomes low, so that color reproduction becomes worse. When the half value wavelength is longer than 670 nm, because of transmitted infrared light, color reproduction becomes worse, and when the half value wavelength is shorter than 630 nm, because the sensitivity to red light becomes relatively lower to result in bad color reproduction, so that it is undesirable.

When an interference filter having an ultraviolet-cut characteristic is formed by forming an interference film on a lens surface of an optical system by means of evaporation, it is desirable that the interference filter according to the second embodiment of the present invention has the following spectral characteristics: transmittance of light having the wavelength from 450 nm to 630 nm is 95% or more; that from 340 nm to 390 nm (ultraviolet) is 5% or less; and the half value wavelength of light which gives transmittance of 50% is from 410 nm to 430 nm. When transmittance of visible light having wavelength from 450 nm to 630 nm is low, ghost images and flare on the surface of the interference film are produced severely. When transmittance of visible light is uneven, color reproduction becomes worse. When transmittance of light having the wavelength from 340 nm to 390 nm is high, the ultraviolet-cut effect becomes low and chromatic aberration becomes conspicuous. When the half value wavelength is shorter than 410 nm, the ultraviolet-cut effect becomes low and chromatic aberration becomes conspicuous. When the half value wavelength is longer than 430 nm, because the sensitivity to violet and blue light becomes relatively lower to result in bad color reproduction, so that it is undesirable. In order to obtain both good color reproduction and removal of chromatic aberration, it is desirable that the ultraviolet-cut film has the steep rising of the spectral transmittance from ultraviolet to visible region.

When an interference filter having a characteristic of transmitting only visible light, and cutting an ultraviolet light and an infrared light is formed by forming an interference film on a lens surface of an optical system by means of evaporation, it is desirable that the interference filter according to the second embodiment of the present invention has both characteristics of the aforementioned infrared-cut filter and ultraviolet-cut filter. In other words, it is desirable that the interference filter has the following spectral characteristics: transmittance of light having the wavelength from 450 nm to 600 nm is 95% or more; that from 340 nm to 390 nm (ultraviolet) is 5% or less; the half value wavelength of light which gives transmittance of 50% is from 410 nm to 430 nm (violet to ultraviolet), transmittance of light having the wavelength from 700 nm to 1000 nm is 5% or less, and the half value wavelength of light which gives transmittance of 50% is from 630 nm to 670 nm.

Then, each example according to the second embodiment of the present invention is explained below.

EXAMPLE 6

Figure 34:
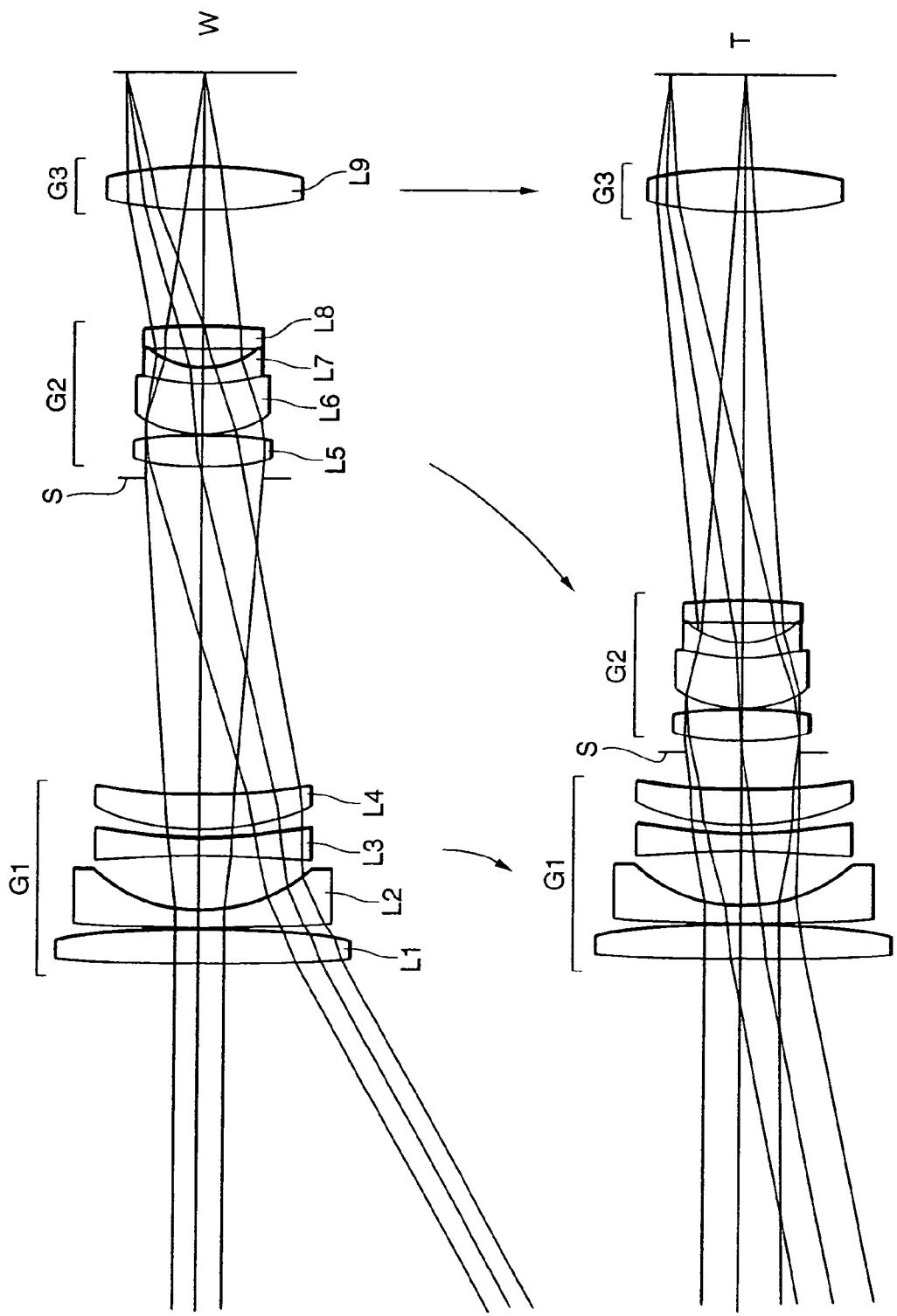
FIG. 34 is a diagram showing the optical path of an optical system according to Example 6 of a second embodiment of the present invention in a wide-angle end state W and in a telephoto end state T.

FIG. 34 is a diagram showing the optical path of an optical system according to Example 6 of a second embodiment of the present invention in a wide-angle end state W and in a telephoto end state T.

The optical system according to Example 6 of the second embodiment is a three-lens-group zoom lens composed of, in order from an object, a first negative lens group G1 having positive, negative, negative, and positive lens elements (L1 through L4), a second positive lens group G2 having a positive lens element L5, a cemented lens constructed by a positive lens element L6 cemented with a negative lens element L7, and a positive lens element L8, and a third positive lens group G3 having a positive lens element L9. Zooming is carried out by moving the first and second lens groups.

Various values associated with Example 6 are listed in Table 6. In Table 6, f denotes the focal length of the optical system, BF denotes the back focal length, FNO denotes an f-number, 2ω denotes the maximum angle of view, Y denotes an image height, R denotes a radius of curvature, d denotes a distance between optical surfaces, Φ denotes an effective diameter, nd denotes refractive index at d-line ($\lambda$=587.6 nm), and ν denotes Abbe number. Refractive index of the air (n=1.00000) is abbreviated.

TABLE 6

(Specifications)

|  | wide-angle end | telephoto end |
|---|---|---|
| f | 8.24 | 23.3 |
| BF: | 5.33 | |
| FNO | 2.89 | 5.20 |
| 2ω | 58.4 | 21.6 |
| Y: | 4.42 | |

(Lens Data)

| surface number | R | d | φ | ν | nd |
|---|---|---|---|---|---|
| 1) | 115.9747 | 2.0000 | 16.50 | 60.21 | 1.640000 |
| 2) | −68.9820 | 0.1000 | 15.40 | | |
| 3) | 100.0798 | 1.0000 | 14.10 | 42.97 | 1.835000 |
| 4) | 8.8788 | 3.2000 | 11.60 | | |
| 5) | −99.6193 | 1.0000 | 11.40 | 64.20 | 1.516800 |
| 6) | 26.1734 | 0.6000 | 11.20 | | |
| 7) | 14.2994 | 2.0000 | 11.50 | 23.78 | 1.846660 |
| 8) | 36.0022 | (D1) | 11.10 | | |
| 9> | 0.0000 | 0.7000 | 6.70 | | |
| 10) | 15.6122 | 1.8000 | 7.00 | 57.44 | 1.606020 |
| 11) | −31.6056 | 0.1000 | 6.90 | | |
| 12) | 6.5431 | 3.0000 | 6.70 | 55.52 | 1.677900 |
| 13) | 13.3710 | 0.9000 | 5.90 | 23.78 | 1.846660 |
| 14) | 4.7498 | 1.1000 | 5.50 | | |
| 15) | 579.5187 | 1.3000 | 5.60 | 60.21 | 1.640000 |
| 16) | −38.5526 | (D2) | 6.00 | | |
| 17) | 24.7220 | 2.6000 | 11.50 | 70.45 | 1.487490 |
| 18) | −22.2994 | (BF) | 11.50 | | |

(Aspherical Data)
Surface Number 10

κ = 1.6443
C2 = 0.00000E+00
C4 = −1.04300E−04
C6 = 3.26660E−07
C8 = −6.34410E−08
C10 = 1.02560E−09

(Variable Intervals upon Zooming)

|  | W | T |
|---|---|---|
| f | 8.24000 | 23.30000 |
| D1 | 18.66993 | 2.42097 |
| D2 | 6.81587 | 22.95625 |
| BF | 5.32665 | 5.32665 |

Where each value shown in (11) and (13) is a larger value comparing the value in the wide-angle end state with that in the telephoto end state.

| | | Conditional Expressions | | |
|---|---|---|---|---|
| | surface | (11) \|φ/R\| | (12) max\|B\| | (13) max\|C\| |
| L1 | N1 | 0.142 | 29.215 | 0.000 |
| | N2 | 0.223 | 36.478 | 1.895 |
| L2 | N1 | 0.141 | 36.478 | 1.895 |
| | N2 | 1.306 | 9.468 | 9.432 |
| L3 | N1 | 0.114 | 9.468 | 9.432 |
| | N2 | 0.428 | 6.238 | 13.618 |
| L4 | N1 | 0.804 | 6.238 | 13.618 |
| | N2 | 0.308 | 12.745 | 6.931 |

-continued

| surface | | Conditional Expressions | | |
| --- | --- | --- | --- | --- |
| | | (11) $|\phi/R|$ | (12) max$|B|$ | (13) max$|C|$ |
| L5 | N1 | 0.448 | 12.745 | 6.931 |
| | N2 | 0.218 | 11.922 | 6.752 |
| L6 | N1 | 1.024 | 11.922 | 6.752 |
| L7 | N2 | 0.441 | — | — |
| | N1 | 1.158 | 17.634 | 5.267 |
| L8 | N2 | 0.010 | 17.634 | 5.267 |
| | N1 | 0.156 | 16.178 | 7.432 |
| L9 | N2 | 0.465 | 16.178 | 7.432 |
| | N1 | 0.516 | 7.246 | 10.001 |

According to the above values for conditional expressions, the lens surface satisfying all three conditional expressions (11) through (13) are the following six surfaces; L3N1, L3N2, L4N2, L5N1, L5N2, and L9N2. The interference film can be applied to those surfaces to be an interference filter.

Among them, L3N2 surface is the most ideal one having relatively small values of both conditional expressions (11) and (12). When the interference filter is formed in the negative lens group having negative, negative, and positive lens elements, it is desirable to form an interference film on the second surface of the second negative lens element because the inclination of the principal ray becomes small by the two negative lens elements, and the radius of curvature is larger than that of the object side surface of the positive lens element located to the image side of the negative lens element.

When an interference filter is formed in the second lens group G2, the interference filter is desirably formed on the lens element L5. Among the surfaces L5N1 and L5N2, the surface L5N2, having smaller values of conditional expressions (11) and (12), is more preferable to form an interference filter.

The surface L9N2 of the lens element L9 in the third lens group G3, having smaller values of each conditional expression, is also suitable to form an interference filter. In an imaging device with a large number of pixels, a micro-lens array is arranged in front of the imaging device to effectively guide light to the device. Accordingly, in an optical system for a solid state imaging device, it is necessary to locate an exit pupil far from the image plane. Therefore, the value of conditional expression (12) becomes theoretically small in the vicinity of the third lens group G3, so that it is desirable to form the interference filter.

Incidentally, there are two kinds of interference filter to be formed, an infrared-cut filter and an ultraviolet-cut filer. Only one of them may be constructed by the interference filter according to the second embodiment of the present invention. On the other hand, for example, an infrared-cut filter may be formed on the L3N2 surface and an ultraviolet-cut filter may be formed on the L9N2 surface. It may be possible to realize a band pass filter for cutting both ultraviolet and infrared lights and transmitting only visible light by forming a well designed interference film on a single lens surface. This can be applied to any Example shown below.

In Example 6 of the second embodiment, an interference film is formed on the L3N2 surface to be an interference filter, so that satisfactory optical performance has been obtained.

EXAMPLE 7

Figure 35:
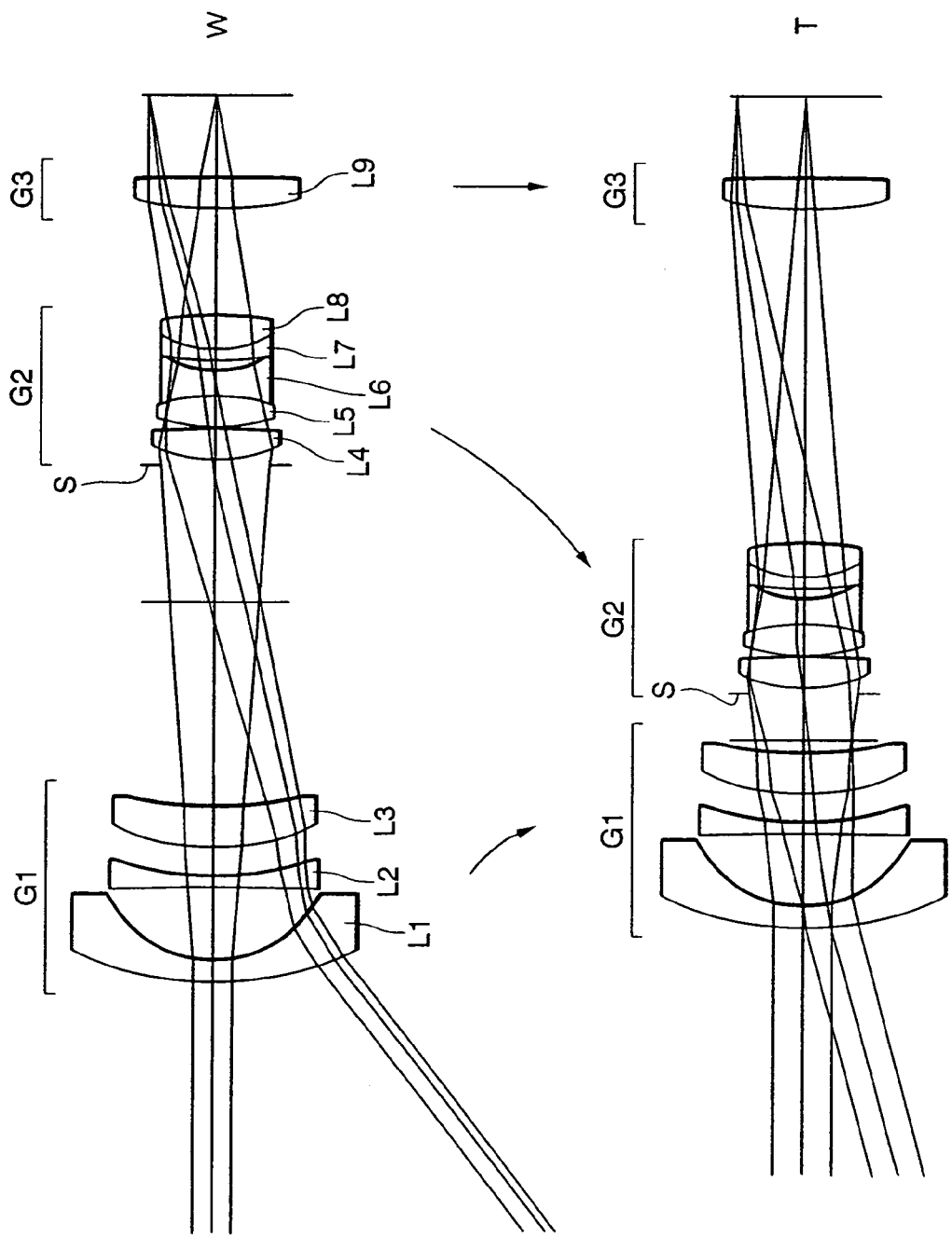
FIG. 35 is a diagram showing the optical path of an optical system according to Example 7 of the second embodiment of the present invention in a wide-angle end state W and in a telephoto end state T.

FIG. 35 is a diagram showing the optical path of an optical system according to Example 7 of the second embodiment of the present invention in a wide-angle end state W and in a telephoto end state T.

The optical system according to Example 7 of the second embodiment is a three-lens-group zoom lens composed of, in order from an object, a first negative lens group G1 having negative, negative, and positive lens elements (L1 through L3), a second positive lens group G2 having a positive lens element L4, a cemented lens constructed by a positive lens element L5 cemented with a negative lens element L6, and a cemented lens constructed by a negative lens element L7 cemented with a positive lens element L8, and a third positive lens group G3 having a positive lens element L9. Zooming is carried out by moving each lens group.

Various values associated with Example 7 are listed in Table 7.

TABLE 7

(Specifications)

| | wide-angle end | telephoto end |
| --- | --- | --- |
| f | 7.4 | 21.3 |
| BF | 6.61 | 6.57 |
| FNO | 2.76 | 4.89 |
| 2ω | 74.8 | 28.8 |
| Y: | 5.44 | |

(Lens Data)

| surface number | R | d | φ | ν | nd |
| --- | --- | --- | --- | --- | --- |
| 1) | 26.3278 | 1.7000 | 21.50 | 49.16 | 1.740011 |
| 2) | 8.1533 | 5.7500 | 16.10 | | |
| 3) | −174.3801 | 0.9000 | 15.80 | 70.24 | 1.487490 |
| 4) | 23.4928 | 2.4000 | 15.30 | | |
| 5) | 17.9444 | 3.2000 | 15.20 | 23.78 | 1.846660 |
| 6) | 33.9654 | (D1) | 14.20 | | |
| 7) | 0.0000 | (D2) | 7.40 | | |
| 8> | 0.0000 | 0.5000 | 8.60 | | |
| 9) | 10.3019 | 2.5500 | 8.80 | 55.18 | 1.665470 |
| 10) | −69.6160 | 0.1000 | 8.60 | | |
| 11) | 14.8088 | 2.5500 | 8.40 | 43.73 | 1.605620 |
| 12) | −14.8001 | 2.0000 | 7.90 | 34.96 | 1.801000 |
| 13) | 7.8543 | 0.9000 | 6.90 | | |
| 14) | 27.6364 | 0.9000 | 7.00 | 34.96 | 1.801000 |
| 15) | 8.6622 | 2.7000 | 7.40 | 58.75 | 1.612720 |
| 16) | −25.3313 | (D3) | 8.00 | | |
| 17) | 29.5916 | 2.3000 | 12.90 | 55.18 | 1.665470 |
| 18) | −258.5473 | (BF) | 12.70 | | |

(Aspherical Data)

Surface Number 2

κ = 0.1000
C2 = 0.00000E+00
C4 = 1.18060E−04
C6 = 7.93980E−07
C8 = −2.26350E−09
C10 = 7.95490E−11

Surface Number 9

κ = 1.0000
C2 = 0.00000E+00
C4 = −6.65950E−05
C6 = −3.23530E−07

TABLE 7-continued

C8 = 3.34640E−09
C10 = −1.01760E−10
Surface Number 17

κ = 1.0000
C2 = 0.00000E+00
C4 = −1.16570E−05
C6 = 1.10140E−06
C8 = −2.62900E−08
C10 = 2.73560E−10

(Variable Intervals upon Zooming)

|    | W        | T        |
|----|----------|----------|
| f  | 7.40001  | 21.29999 |
| D1 | 16.42380 | 1.20000  |
| D2 | 11.00000 | 3.67090  |
| D3 | 8.53100  | 26.86307 |
| BF | 6.61499  | 6.57299  |

Where each value shown in (11) and (13) is a larger value comparing the value in the wide-angle end state with that in the telephoto end state.

| | | Conditional Expressions | | |
|---|---|---|---|---|
| | surface | (11) $|\phi/R|$ | (12) max$|B|$ | (13) max$|C|$ |
| L1 | N1 | 0.817 | 37.426 | 0.000 |
|    | N2 | 1.975 | 12.506 | 7.842 |
| L2 | N1 | 0.091 | 12.506 | 7.842 |
|    | N2 | 0.651 | 6.120  | 12.033 |
| L3 | N1 | 0.847 | 6.120  | 12.033 |
|    | N2 | 0.418 | 12.864 | 7.204 |
| L4 | N1 | 0.854 | 12.864 | 7.204 |
|    | N2 | 0.124 | 12.169 | 14.870 |
| L5 | N1 | 0.567 | 12.169 | 14.870 |
| L6 | N1 | 0.534 | —      | —      |
|    | N2 | 0.878 | 18.053 | 3.262 |
| L7 | N1 | 0.253 | 18.053 | 3.262 |
| L8 | N1 | 0.854 | —      | —      |
|    | N2 | 0.316 | 14.913 | 8.353 |
| L9 | N1 | 0.436 | 14.913 | 8.353 |
|    | N2 | 0.049 | 8.226  | 10.429 |

According to the above values for conditional expressions, the lens surfaces satisfying all three conditional expressions (11) through (13) are the following six surfaces; L2N1, L2N2, L3N2, L4N2, L5N1, and L9N2. The interference film can be applied to those surfaces to be an interference filter.

Among them, L9N2 surface is the most ideal one having relatively small values both conditional expressions (11) and (12). In an imaging device with a large number of pixels, a micro-lens array is arranged in front of the imaging device to effectively guide light to the device. Accordingly, in an optical system for a solid state imaging device, it is necessary to locate an exit pupil far from the image plane. Therefore, the value of conditional expression (12) becomes theoretically small in the vicinity of the third lens group G3, so that it is desirable to form the interference filter.

When the interference filter is formed in the first negative lens group G1 having negative, negative, and positive lens elements, it is desirable to form an interference film on the second surface of the second negative lens element L2N2 because the inclination of the principal ray becomes small by the two negative lens elements, and the radius of curvature is larger than that of the object side surface of the positive lens element located to the image side of the negative lens element.

When an interference filter is formed in the second lens group G2, L4N2 surface or L5N1 surface can be thought to form the interference film. L4N2 surface having the smaller value of conditional expressions (11) is more preferable to form an interference filter.

In Example 7 of the second embodiment, an interference film is formed on the L9N2 surface to be an interference filter, so that satisfactory optical performance has been obtained.

EXAMPLE 8

Figure 36:
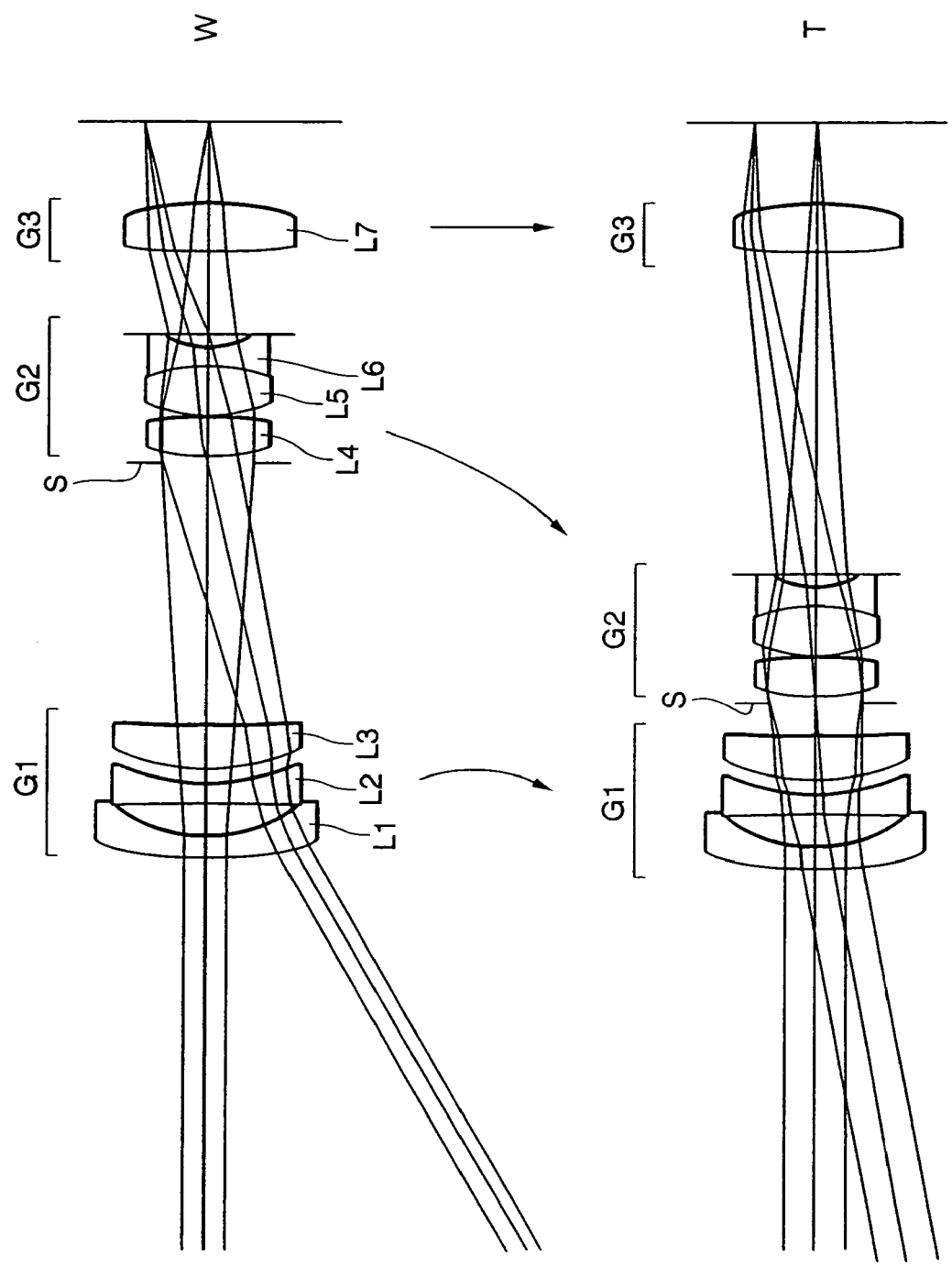
FIG. 36 is a diagram showing the optical path of an optical system according to Example 8 of the second embodiment of the present invention in a wide-angle end state W and in a telephoto end state T.

FIG. 36 is a diagram showing the optical path of an optical system according to Example 8 of the second embodiment of the present invention in a wide-angle end state W and in a telephoto end state T.

The optical system according to Example 8 of the second embodiment is a three-lens-group zoom lens composed of, in order from an object, a first negative lens group G1 having negative, negative, and positive lens elements (L1 through L3), a second positive lens group G2 having a positive lens element L4, a cemented lens constructed by a positive lens element L5 cemented with a negative lens element L6, and a third positive lens group G3 having a positive lens element L7. Zooming is carried out by moving the first and second lens groups.

Various values associated with Example 8 are listed in Table 8.

TABLE 8

(Specifications)

|   | wide-angle end | telephoto end |
|---|---|---|
| f | 5.95 | 16.9 |
| BF: | 4.18 | |
| FNO | 2.87 | 5.23 |
| 2ω | 60.0 | 21.6 |
| Y: | 3.25 | |

(Lens Data)

| surface number | R | d | φ | ν | nd |
|---|---|---|---|---|---|
| 1) | 19.1828 | 1.1000 | 10.21 | 37.17 | 1.834000 |
| 2) | 7.3466 | 1.7500 | 8.65 | | |
| 3) | −143.6780 | 1.0000 | 8.53 | 46.58 | 1.804000 |
| 4) | 10.5443 | 0.8000 | 8.14 | | |
| 5) | 10.4893 | 2.3000 | 8.40 | 25.43 | 1.805180 |
| 6) | 120.8022 | (D1) | 8.07 | | |
| 7> | 0.0000 | 0.4000 | 4.80 | | |
| 8) | 9.6920 | 2.0000 | 5.08 | 59.62 | 1.583130 |
| 9) | −22.1432 | 0.1000 | 5.25 | | |
| 10) | 7.4756 | 2.5500 | 5.27 | 46.58 | 1.804000 |
| 11) | −9.4517 | 0.9000 | 4.72 | 30.13 | 1.698950 |
| 12) | 3.8988 | 0.7400 | 4.06 | | |
| 13) | 0.0000 | (D2) | 4.10 | | |
| 14) | 25.7030 | 2.5000 | 7.72 | 59.62 | 1.583130 |
| 15) | −13.6090 | (Bf) | 7.81 | | |

(Aspherical Data)

Surface Number 8

κ = −0.9643
C2 = 0.00000E+00
C4 = −4.44320E−05
C6 = −1.03700E−05
C8 = 1.33750E−06
C10 = −8.95360E−08

TABLE 8-continued

Surface Number 14

κ = 16.8196
C2 = 0.00000E+00
C4 = −4.51730E−04
C6 = 2.27170E−05
C8 = −1.52580E−06
C10 = 3.30560E−08

(Variable Intervals upon Zooming)

|   | W | T |
|---|---|---|
| f | 5.95000 | 16.90000 |
| D1 | 13.52331 | 1.84416 |
| D2 | 4.31088 | 16.75795 |
| BF | 4.17616 | 4.17616 |

(Values for the conditional expressions)

Where each value shown in (11) and (13) is a larger value comparing the value in the wide-angle end state with that in the telephoto end state.

| | | Conditional Expressions | | |
|---|---|---|---|---|
| | surface | (11) $|\phi/R|$ | (12) max$|B|$ | (13) max$|C|$ |
| L1 | N1 | 0.532 | 29.979 | 0.000 |
|    | N2 | 1.177 | 15.227 | 6.499 |
| L2 | N1 | 0.059 | 15.227 | 6.499 |
|    | N2 | 0.772 | 5.636 | 15.692 |
| L3 | N1 | 0.801 | 5.636 | 15.692 |
|    | N2 | 0.067 | 12.980 | 6.682 |
| L4 | N1 | 0.524 | 12.980 | 6.682 |
|    | N2 | 0.237 | 12.068 | 7.470 |
| L5 | N1 | 0.705 | 12.068 | 7.470 |
| L6 | N1 | 0.499 | — | — |
|    | N2 | 1.041 | 17.293 | 7.000 |
| L7 | N1 | 0.300 | 17.293 | 7.000 |
|    | N2 | 0.574 | 7.787 | 10.056 |

According to the above values for conditional expressions, the lens surface satisfying all three conditional expressions (11) through (13) are the following six surfaces; L2N2, L3N2, L4N1, L4N2, L5N1, and L7N2. The interference film can be applied to those surfaces to be an interference filter.

Among them, L4N2 surface is the most ideal one having relatively small values of conditional expression (11). When the interference filter is formed in the second lens group G2, it is desirable to form interference film on the object side surface of the positive lens located to the most object side of the second lens group G2 to be an interference filter.

When the interference filter is formed in the first negative lens group G1 having negative, negative, and positive lens elements, it is desirable to form an interference film on the second surface of the second negative lens element L2N2 because the inclination of the principal ray becomes small by the two negative lens elements, and the radius of curvature is larger than that of the object side surface of the positive lens element located to the image side of the negative lens element.

When the interference filter is formed in the third positive lens group G3, it is preferable to form the interference filter on the most image side surface. In an imaging device with a large number of pixels, a micro-lens array is arranged in front of the imaging device to effectively guide light to the device. Accordingly, in an optical system for a solid state imaging device, it is necessary to locate an exit pupil far from the image plane. Therefore, the value of conditional expression (12) becomes theoretically small in the vicinity of the third lens group G3, so that it is desirable to form the interference filter.

In Example 8 of the second embodiment, an interference film is formed on the L4N2 surface to be an interference filter, so that satisfactory optical performance has been obtained.

EXAMPLE 9

Figure 37:
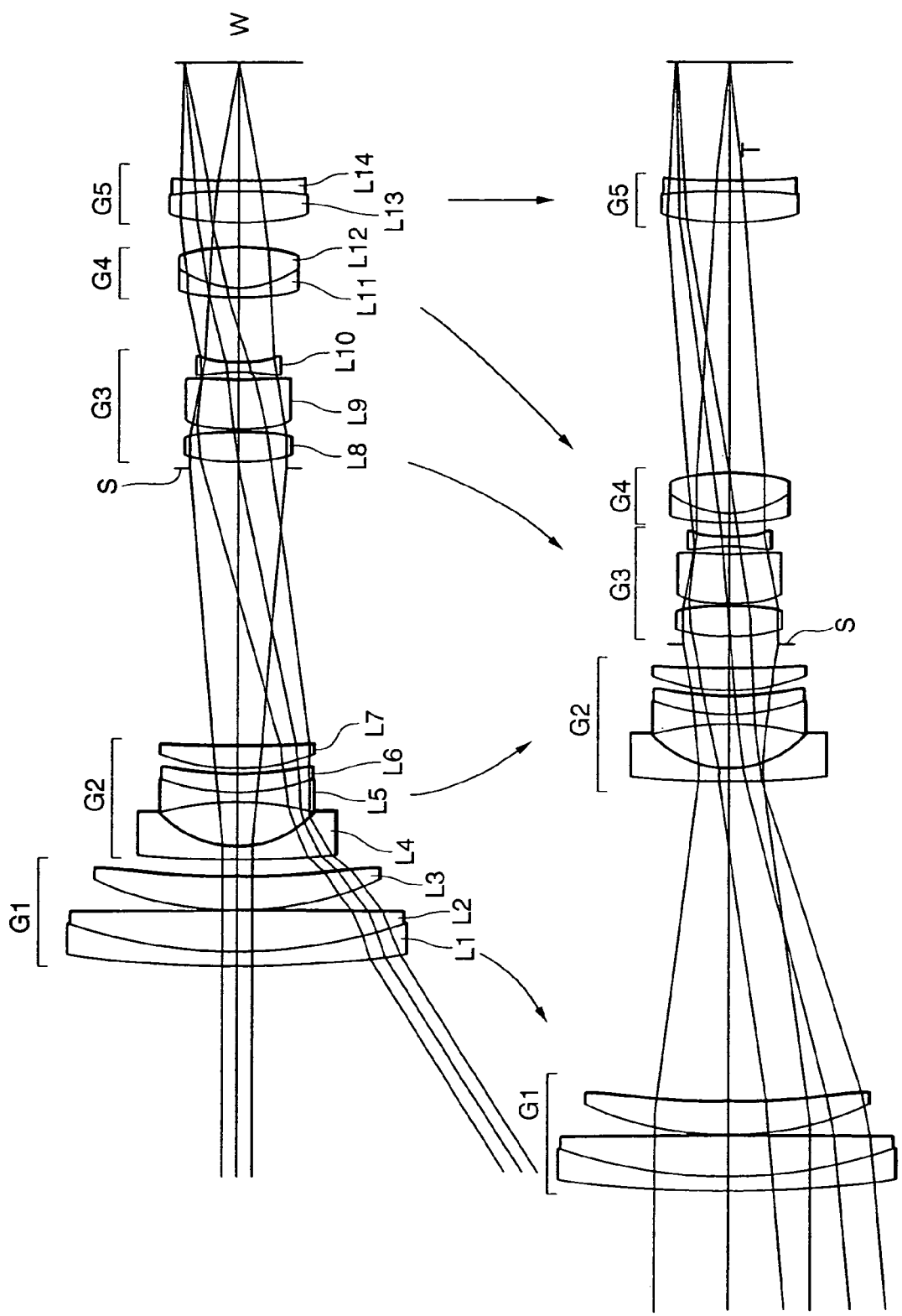
FIG. 37 is a diagram showing the optical path of an optical system according to Example 9 of the second embodiment of the present invention in a wide-angle end state W and in a telephoto end state T.

FIG. 37 is a diagram showing the optical path of an optical system according to Example 9 of the second embodiment of the present invention in a wide-angle end state W and in a telephoto end state T.

The optical system according to Example 9 of the second embodiment is a five-lens-group zoom lens composed of, in order from an object, a first positive lens group G1 having a cemented positive lens constructed by a negative lens element L1 cemented with a positive lens element L2 and a positive lens element L3, a second negative lens group G2 having a negative lens element L4, a cemented negative lens constructed by a negative lens element L5 cemented with a positive lens element L6 and a positive lens element L7, a third positive lens group G3 having two positive lens elements L8 and L9 and a negative lens element L10, a fourth positive lens group G4 having a cemented positive lens constructed by a negative lens element L11 cemented with a positive lens element L12, and a fifth positive lens group G5 having a cemented positive lens constructed by a positive lens element L13 cemented with a negative lens element L14. Zooming is carried out by moving each lens group.

Various values associated with Example 9 are listed in Table 9.

TABLE 9

(Specifications)

| | wide-angle end | telephoto end |
|---|---|---|
| f | 9.17 | 69.07 |
| BF: | 11.22 | |
| FNO | 2.90 | 4.45 |
| 2ω | 63.8 | 9.0 |
| Y: | 5.44 | |

(Lens Data)

| surface number | R | d | φ | ν | nd |
|---|---|---|---|---|---|
| 1) | 112.4351 | 1.3000 | 30.69 | 23.78 | 1.846660 |
| 2) | 46.6040 | 4.1000 | 28.79 | 47.38 | 1.788000 |
| 3) | −1133.2893 | 0.1000 | 27.74 | | |
| 4) | 33.8557 | 3.1500 | 26.00 | 82.52 | 1.497820 |
| 5) | 95.7487 | (D1) | 25.29 | | |
| 6) | 108.3076 | 1.2000 | 18.08 | 46.58 | 1.804000 |
| 7) | 10.0068 | 4.3000 | 14.16 | | |
| 8) | −29.0221 | 0.9000 | 13.94 | 54.66 | 1.729160 |
| 9) | 21.5697 | 1.7000 | 13.85 | 23.78 | 1.846660 |
| 10) | 36.0418 | 0.7000 | 13.76 | | |
| 11) | 22.2130 | 2.1000 | 14.00 | 23.78 | 1.846660 |
| 12) | 133.9390 | (D2) | 13.78 | | |
| 13> | 0.0000 | 0.5000 | 9.20 | | |
| 14) | 19.0286 | 3.0500 | 9.51 | 82.52 | 1.497820 |
| 15) | −26.3022 | 0.2000 | 9.52 | | |
| 16) | 14.4696 | 4.9000 | 9.28 | 47.82 | 1.757000 |
| 17) | 43.2842 | 0.7500 | 7.62 | | |
| 18) | −27.1397 | 0.9000 | 7.44 | 31.09 | 1.688930 |
| 19) | 15.2385 | (D3) | 7.40 | | |
| 20) | 28.7363 | 0.9000 | 9.92 | 42.72 | 1.834810 |
| 21) | 10.1303 | 3.8500 | 10.02 | 58.96 | 1.518230 |

TABLE 9-continued

| | | | | | |
|---|---|---|---|---|---|
| 22) | −21.2189 | (D4) | 10.61 | | |
| 23) | 27.6733 | 3.0000 | 12.51 | 46.58 | 1.804000 |
| 24) | −78.3460 | 1.0000 | 12.26 | 23.78 | 1.846660 |
| 25) | 103.6796 | (BF) | 12.10 | | |

(Variable Intervals upon Zooming)

| | W | T |
|---|---|---|
| f | 9.16776 | 69.06805 |
| D1 | 1.69782 | 30.94475 |
| D2 | 27.10947 | 2.57196 |
| D3 | 6.24109 | 1.40850 |
| D4 | 2.37220 | 24.45608 |
| BF | 11.21612 | 11.21631 |

(Values for the conditional expressions)

Where each value shown in (11) and (13) is a larger value comparing the value in the wide-angle end state with that in the telephoto end state.

| | | Conditional Expressions | | |
|---|---|---|---|---|
| | surface | (11) $|\phi/R|$ | (12) max$|B|$ | (13) max$|C|$ |
| L1 | N1 | 0.273 | 31.877 | 0.000 |
| L2 | N1 | 0.618 | — | — |
| | N2 | 0.024 | 39.176 | 3.097 |
| L3 | N1 | 0.768 | 39.176 | 3.097 |
| | N2 | 0.264 | 47.484 | 7.381 |
| L4 | N1 | 0.167 | 47.484 | 7.381 |
| | N2 | 1.415 | 15.921 | 6.551 |
| L5 | N1 | 0.480 | 15.921 | 6.551 |
| L6 | N1 | 0.642 | — | — |
| | N2 | 0.382 | 6.658 | 16.125 |
| L7 | N1 | 0.630 | 6.658 | 16.125 |
| | N2 | 0.103 | 11.396 | 7.878 |
| L8 | N1 | 0.500 | 11.396 | 7.878 |
| | N2 | 0.362 | 10.682 | 7.299 |
| L9 | N1 | 0.641 | 10.682 | 7.299 |
| | N2 | 0.176 | 10.019 | 17.495 |
| L10 | N1 | 0.274 | 10.019 | 17.495 |
| | N2 | 0.486 | 15.039 | 3.431 |
| L11 | N1 | 0.345 | 15.039 | 3.431 |
| L12 | N1 | 0.989 | — | — |
| | N2 | 0.500 | 10.850 | 6.960 |
| L13 | N1 | 0.452 | 10.850 | 6.960 |
| L14 | N1 | 0.156 | — | — |
| | N2 | 0.117 | 5.763 | 9.948 |

According to the above values for conditional expressions, the lens surface satisfying all three conditional expressions (11) through (13) are the following nine surfaces; L6N2, L7N1, L7N2, L8N1, L8N2, L9N1, L12N2, L13N1 and L14N2. The interference film can be applied to those surfaces to be an interference filter.

Among them, L14N2 surface is the most ideal one having relatively small values both conditional expressions (11) and (12). In an imaging device with a large number of pixels, a micro-lens array is arranged in front of the imaging device to effectively guide light to the device. Accordingly, in an optical system for a solid state imaging device, it is necessary to locate an exit pupil far from the image plane. Therefore, the value of conditional expression (12) becomes theoretically small in the vicinity of the image plane, so that it is desirable to form the interference filter.

In the first positive lens group G1, any one of lens surfaces makes a large incident angle or exit angle of the principal ray relative to the normal of each surface, so that any one of surfaces is undesirable to form the interference filter.

When the interference filter is formed in the second negative lens group G2 having negative, negative, and positive lens construction, it is desirable to form an interference film on the image side surface of the cemented negative lens L6N2 because the inclination of the principal ray becomes small by the two negative lens construction, and the radius of curvature is larger than that of the object side surface of the positive lens element located to the image side of the cemented negative lens.

When the interference filter is formed in the third positive lens group G3, surfaces of L8N1, L8N2, and L9N1 are qualified. However, because of small values of conditional expressions (11) through (12), it is desirable to form the interference filter on the L8N2 surface.

When the interference filter is formed in the fourth positive lens group G4, it is preferable to form on the L12N2 surface. However, in comparison with the L8N2 surface in the third lens group G3 over each conditional expressions, the L8N2 surface is more preferable because values of conditional expressions (11) and (12) are smaller.

In Example 9 of the second embodiment, an interference film is formed on the L14N2 surface to be an interference filter, so that satisfactory optical performance has been obtained.

In Examples described above, although the interference film is formed by means of evaporation, the method to form interference film is not limited to this method, and any method such as sputtering, chemical-vapor deposition (CVD), and spin coating may be preferably applied.

It is needless to say that the present invention is not to limited to the above-described Examples, and can be applied to the optical system for video cameras and interchangeable lenses for single-lens-reflex digital still cameras showing signs of coming into wide use recently.

There are two kinds of color filter systems in an imaging device. One is an imaging device with a primary color system that has blue (B), green (G), and red (R) color filters. The other is a complimentary color system that has yellow, cyan, and magenta (sometimes, green filter exists in addition to the three filters). The imaging device with the complimentary color system generates B, G, and R color signals by color conversion from the three (or four) colors. In the process of color conversion, a particular color is liable to become conspicuous. Therefore, when the first and second embodiments of the present invention is applied to an imaging device with a complimentary color system, which chromatic aberration is more conspicuous than that with a primary color system, the effect is more striking.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical system with a wavelength selecting device comprising, in order from an object along an optical axis of the optical system:
   an objective optical system composed of first optical elements having refractive power and an aperture stop;
   a no-power optical group composed of second optical elements having no refractive power; and
   an imaging device;
   one of the second optical elements integrally including a light transmittance portion, an absorption portion, and a reflective portion;

the light transmittance portion substantially transmitting light over a predetermined wavelength range;

the absorption portion being substantially non-transparent with respect to light of longer wavelength above $\lambda_{R10}$ by use of an absorption filter; and the reflective portion being substantially non-transparent with respect to light of shorter wavelength below $\lambda_{V50}$ by use of an interference film, wherein the following conditional expressions are satisfied:

$$410 \leq \lambda_{V50} < 430$$

$$650 < \lambda_{R10} < 750$$

where $\lambda_{V50}$ denotes a wavelength in nm of shorter wavelength light for which transmittance of the one second optical element is 50% and $\lambda_{R10}$ denotes a wavelength in nm of longer wavelength light for which transmittance of the one second optical element is 10%, wherein the one second optical element has a function of cutting off a higher spatial frequency than a resolution limit of the imaging device, and wherein the following conditional expressions are satisfied:

$$D_L/Y < 0.2$$

$$D_L > 0.5$$

where $D_L$ denotes a thickness in mm along the optical axis of the one second optical element having the function of cutting off a higher spatial frequency than the resolution limit of the imaging device, and Y denotes a diagonal length in mm of the imaging device.

2. The optical system with a wavelength selecting device according to claim 1, wherein the one second optical element includes an absorption portion which absorbs shorter wavelength light and is substantially non-transparent with respect thereto; and wherein the following conditional expression is satisfied:

$$10 < \lambda_{V80} - \lambda_{V10} < 40$$

where $\lambda_{V10}$ denotes a wavelength in nm of shorter wavelength light for which transmittance of the one second optical element is 10%, and $\lambda_{V80}$ denotes a wavelength in nm of shorter wavelength light for which transmittance of the one second optical element is 80%.

3. An optical system with a wavelength selecting device comprising, in order from an object along the optical axis of the optical system:

an objective optical system composed of first optical elements having refractive power and an aperture stop;

a no-power optical group composed of second optical elements having no refractive power; and an imaging device;

one of the second optical elements including a light transmittance portion, an absorption portion, and a reflective portion;

the light transmittance portion substantially transmitting light over a predetermined wavelength range;

the absorption portion being substantially non-transparent with respect to light of longer wavelength above $\lambda_{R10}$ by use of an absorption filter; and the reflective portion being substantially non-transparent with respect to light of shorter wavelength below $\lambda_{V50}$ by use of an interference film, wherein the following conditional expressions are satisfied:

$$410 \leq \lambda_{V50} < 430$$

$$650 < \lambda_{R10} < 750$$

where $\lambda_{V50}$ denotes a wavelength in nm of shorter wavelength light for which transmittance of the one second optical element is 50% and $\lambda_{R10}$ denotes a wavelength in nm of longer wavelength light for which transmittance of the one second optical element is 10%, wherein the one second optical element has a function of cutting off a higher spatial frequency than a resolution limit of the imaging device, and wherein the following conditional expressions are satisfied:

$$D_L/Y < 0.2$$

$$D_L > 0.5$$

where $D_L$ denotes a thickness in mm along the optical axis of the one second optical element having the function of cutting off a higher spatial frequency than the resolution limit of the imaging device, and Y denotes a diagonal length in mm of the imaging device.

4. The optical system with a wavelength selecting device according to claim 3, wherein a most image side optical element of the objective optical system has positive refractive power.

5. The optical system with a wavelength selecting device according to claim 2, wherein the one second optical element substantially transmits only visible light.

6. The optical system with a wavelength selecting device according to claim 5, wherein the one second optical element has a function for protecting a surface of the imaging device.

7. The optical system with a wavelength selecting device according to claim 1, wherein the one second optical element includes an interference filter which is, with respect to the shorter wavelength light, selectively substantially non-transparent by use of an interference film formed on a surface of an optical member in the no-power optical group; and wherein the following conditional expression is satisfied:

$$D/PY < 1.1 \times 10^2$$

where D denotes an air-reduced optical path length in mm from a position of the interference film to the imaging device, P denotes a pitch in mm of a pixel of the imaging device measured in the shortest direction, and Y denotes a diagonal length in mm of the imaging device.

8. The optical system with a wavelength selecting device according to claim 7, wherein the following conditional expression is satisfied:

$$|Y/P_0| < 0.55$$

where $P_0$ denotes a position of the exit pupil of the objective optical system measured from a most object side optical surface of the no-power optical group in mm which is positive in an image direction.

9. The optical system with a wavelength selecting device according to claim 8, wherein the following conditional expression is satisfied:

$$5 < \lambda_{V90} - \lambda_{V10} \leq 40$$

where $\lambda_{V10}$ denotes the wavelength in nm of shorter wavelength light for which transmittance of the one second optical element is 10%, and $\lambda_{V90}$ denotes the wavelength in nm of shorter wavelength light for which transmittance of the one second optical element is 90%.

10. The optical system with a wavelength selecting device according to claim 7, wherein the following conditional expression is satisfied:

$$5 < \lambda_{V90} - \lambda_{V10} \leq 40$$

where $\lambda_{V10}$ denotes the wavelength in nm of shorter wavelength light for which transmittance of the one second optical element is 10%, and $\lambda_{V90}$ denotes the wavelength in nm of shorter wavelength light for which transmittance of the one second optical element is 90%.

11. The optical system with a wavelength selecting device according to claim 10, wherein the one second optical element substantially transmits only visible light.

12. The optical system with a wavelength selecting device according to claim 11, wherein the following conditional expression is satisfied:

$$5 < \lambda_{R10} - \lambda_{R80} < 60$$

where $\lambda_{R80}$ denotes the wavelength in nm of longer wavelength light for which transmittance of the one second optical element is 80%.

13. The optical system with a wavelength selecting device according to claim 1, wherein the following conditional expression is satisfied:

$$5 < \lambda_{R10} - \lambda_{R80} < 60$$

where $\lambda_{R80}$ denotes the wavelength in nm of longer wavelength light for which transmittance of the one second optical element is 80%.

14. The optical system with a wavelength selecting device according to claim 1, wherein the following conditional expression is satisfied:

$$\lambda_{V50} D/PY < 4.5 \times 10^4$$

where D denotes an air-reduced optical path length in mm from a position of the interference film to the imaging device, and P denotes a pitch in mm of a pixel of the imaging device measured in the shortest direction.

15. The optical system with a wavelength selecting device according to claim 14, wherein the following conditional expression is satisfied:

$$|Y/P_0| < 0.55$$

where $P_0$ denotes a position of an exit pupil of the objective optical system measured from a most object side optical surface of the no-power optical group in mm which is positive in an image direction.

16. The optical system with a wavelength selecting device according to claim 3, wherein the following conditional expression is satisfied:

$$\lambda_{V50} D/PY < 4.5 \times 10^4$$

where D denotes an air converted optical path length in mm from a position of the interference film to the imaging device, P denotes a pitch in mm of a pixel of the imaging device measured in the shortest direction, and Y denotes a diagonal length in mm of the imaging device.

17. The optical system with a wavelength selecting device according to claim 3, wherein the following conditional expression is satisfied:

$$|Y/P_0| < 0.55$$

where Y denotes a diagonal length in mm of the imaging device, and $P_0$ denotes a position of an exit pupil of the objective optical system measured from a most object side optical surface of the no-power optical group in mm which is positive in an image direction.

18. The optical system with a wavelength selecting device according to claim 3, wherein the following conditional expression is satisfied:

$$5 < \lambda_{V90} - \lambda_{V10} \leq 40$$

where $\lambda_{V10}$ denotes the wavelength in nm of shorter wavelength light for which transmittance of the one second optical element is 10%, and $\lambda_{V90}$ denotes the wavelength in nm of shorter wavelength light for which transmittance of the one second optical element is 90%.

19. The optical system with a wavelength selecting device according to claim 3, wherein the one second optical element substantially transmits only visible light.

20. The optical system with a wavelength selecting device according to claim 19, wherein the following conditional expression is satisfied:

$$5 < \lambda_{R10} - \lambda_{R80} < 60$$

where $\lambda_{R80}$ denotes the wavelength in nm of longer wavelength light for which transmittance of the one second optical element is 80%.

21. The optical system with a wavelength selecting device according to claim 19, wherein the following conditional expressions are satisfied:

$$D_L/Y < 0.2$$

$$D_L < 0.5$$

where $D_L$ denotes a thickness in mm along the optical axis of the one second optical element having the function of cutting off a higher spatial frequency than the resolution limit of the imaging device, and Y denotes a diagonal length in mm of the imaging device.

22. The optical system with a wavelength selecting device according to claim 19, wherein the one second optical element has a function for protecting a surface of the imaging device.

23. The optical system with a wavelength selecting device according to claim 3, wherein the following conditional expression is satisfied:

$$5 < \lambda_{R10} - \lambda_{R80} < 60$$

where $\lambda_{R80}$ denotes the wavelength in nm of longer wavelength light for which transmittance of the one second optical element is 80%.

24. The optical system with a wavelength selecting device according to claim 3, wherein the one second optical element has a function for protecting a surface of the imaging device.

25. The optical system with a wavelength selecting device according to claim 1, wherein the following conditional expression is satisfied:

$$670 \leq \lambda_{R10} < 750$$

26. The optical system with a wavelength selecting device according to claim 3, wherein the following conditional expression is satisfied:

$$670 \leq \lambda_{R10} < 750$$

27. A method of constructing an optical system with a wavelength selecting device, said method comprising providing, in order from an object along an optical axis of the optical system:

an objective optical system composed of first optical elements having refractive power and an aperture stop;

a no-power optical group composed of second optical elements having no refractive power; and an imaging device;

one of the second optical elements integrally including a light transmittance portion, an absorption portion, and a reflective portion;

the light transmittance portion substantially transmitting light over a predetermined wavelength range;

the absorption portion being substantially non-transparent with respect to light of longer wavelength above $\lambda_{R10}$ by use of an absorption filter; and the reflective portion being substantially non-transparent with respect to light of shorter wavelength below $\lambda_{V50}$ by use of an interference film, wherein the following conditional expressions are satisfied:

$$410 \leq \lambda_{V50} < 430$$

$$650 < \lambda_{R10} < 750$$

where $\lambda_{V50}$ denotes a wavelength in nm of shorter wavelength light for which transmittance of the one second optical element is 50% and $\lambda_{R10}$ denotes a wavelength in nm of longer wavelength light for which transmittance of the one second optical element is 10%, wherein the one second optical element includes an interference filter which is, with respect to the shorter wavelength light, selectively substantially non-transparent by use of an interference film formed on a surface of an optical member in the no-power optical group, and wherein the following conditional expression is satisfied:

$$D/PY < 1.1 \times 10^2$$

where D denotes an air-reduced optical path length in mm from a position of the interference film to the imaging device, P denotes a pitch in mm of a pixel of the imaging device measured in the shortest direction, and Y denotes a diagonal length in mm of the imaging device.

28. The method according to claim 27, wherein the one second optical element includes an absorption portion which absorbs shorter wavelength light and is substantially non-transparent with respect thereto; and wherein the following conditional expression is satisfied:

$$10 < \lambda_{V80} - \lambda_{V10} < 40$$

where $\lambda_{V10}$ denotes a wavelength in nm of shorter wavelength light for which transmittance of the one second optical element is 10%, and $\lambda_{V80}$ denotes a wavelength in nm of shorter wavelength light for which transmittance of the one second optical element is 80%.

29. The method according to claim 27, wherein the following conditional expression is satisfied:

$$5 < \lambda_{V90} - \lambda_{V10} \leq 40$$

where $\lambda_{V10}$ denotes the wavelength in nm of shorter wavelength light for which transmittance of the one second optical element is 10%, and $\lambda_{V90}$ denotes the wavelength in nm of shorter wavelength light for which transmittance of the one second optical element is 90%.

30. The method according to claim 27, wherein the following conditional expression is satisfied:

$$5 < \lambda_{R10} - \lambda_{R80} < 60$$

where $\lambda_{R80}$ denotes the wavelength in nm of longer wavelength light for which transmittance of the one second optical element is 80%.

* * * * *

UNITED STATES PATENT AND TRADEMARK OFFICE
Certificate

Patent No. 7,826,143 B2                                  Patented: November 2, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Akihiko Obama, Sakura (JP); and Kouichi Ohshita, Tokyo (JP).

Signed and Sealed this Twenty-fifth Day of February 2014.

*RICKY MACK*
*Supervisory Patent Examiner*
*Art Unit 2872*
*Technology Center 2800*